United States Patent
Matsubara et al.

(10) Patent No.: US 6,244,247 B1
(45) Date of Patent: Jun. 12, 2001

(54) IGNITION DEVICE FOR INTERNAL COMBUSTION ENGINES

(75) Inventors: Yoshihiro Matsubara; Akio Kokubu; Kazumasa Yoshida; Tetsusi Suzuki, all of Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 09/180,928

(22) PCT Filed: May 16, 1997

(86) PCT No.: PCT/JP97/01653

§ 371 Date: Jan. 25, 1999

§ 102(e) Date: Jan. 25, 1999

(87) PCT Pub. No.: WO97/43544

PCT Pub. Date: Nov. 20, 1997

(30) Foreign Application Priority Data

May 16, 1996 (JP) .................................... 8-121252

(51) Int. Cl.[7] ................. F02D 43/04; F02P 9/00
(52) U.S. Cl. .................... 123/305; 123/169 CL; 123/179.5; 123/625; 313/131 R
(58) Field of Search ................. 123/305, 625, 123/637, 169 CL, 179.5, 198 A, 169 MG; 313/130, 131 R

(56) References Cited

U.S. PATENT DOCUMENTS

| | | | |
|---|---|---|---|
| 2,957,099 | * 10/1960 | Dutterer | 313/131 R |
| 4,341,195 | * 7/1982 | Nishio et al. | 123/598 |
| 4,480,620 | * 11/1984 | Tange et al. | 123/305 |
| 4,495,924 | 1/1985 | Ueno et al. | 123/478 |
| 4,947,810 | * 8/1990 | Gillbrand et al. | 123/179.5 |
| 5,060,035 | 10/1991 | Nishimura et al. | 357/23.7 |
| 5,207,058 | 5/1993 | Sasaki et al. | 60/284 |

FOREIGN PATENT DOCUMENTS

| | | |
|---|---|---|
| 0 305 349 | 3/1989 | (EP) . |
| 2 255 372 | 11/1992 | (GB) . |
| 55-109763 | 8/1980 | (JP) . |
| 55-112871 | * 9/1980 | (JP) . |
| 58-178835 | 10/1983 | (JP) . |
| 60-201077 | 10/1985 | (JP) . |
| 61-061971 | 3/1986 | (JP) . |
| 62-135669 | 6/1987 | (JP) . |
| 62-223469 | 10/1987 | (JP) . |
| 63-202874 | 8/1988 | (JP) . |
| 3-129777 | 12/1991 | (JP) . |
| 4-183922 | 6/1992 | (JP) . |
| 7-22153 | 1/1995 | (JP) . |

* cited by examiner

Primary Examiner—Andrew M. Dolinar
(74) Attorney, Agent, or Firm—Sughrue, Mion, Zinn, Macpeak & Seas, PLLC

(57) ABSTRACT

In an internal combustion engine, an engine control device 40 judges based on a cooling water temperature of an engine in what state the engine is. When judged that the engine is in a cold state, the engine control device 40 produces an ignition signal to feed it to an igniter 6b so as to spark spark plugs 7 which are individually placed in cylinders at an exhaust stroke or expansion stroke.

12 Claims, 38 Drawing Sheets

(a)

(b)

IGNITION DEVICE FOR INTERNAL COMBUSTION ENGINES

FIELD OF THE INVENTION

The present invention relates to an ignition device for use in an internal combustion engine, and particularly concerns to an ignition device which establishes spark discharges in a spark plug except for the time when the air-fuel mixture is normally ignited to facilitate the self-cleaning action due to the spark discharges so as to burningly remove the carbon fouling of the spark plug.

BACKGROUND OF THE INVENTION

In an ignition device, an engine control device is generally provided to produce an ignition signal to feed it to an igniter so as to cause spark discharges in the spark plug at a predetermined ignition time during a compression stroke based on an electrical signal which is generated to detect which stroke each of cylinders occupies by means of a sensor such as, for example, cam position sensor.

In an in-cylinder fuel injection type engine, one of the features of this engine is that fuel is injected through the compression stroke (referred to as "compression stroke injection" hereinafter) to contribute to low fuel consumption. In order to implement the compression stroke injection, it is necessary to determine a fuel injection timing close to a predetermined ignition time during a compression stroke so as to ignite the air-fuel mixture staying around the spark plug exposed to a combustion chamber as shown by laid-open Japanese Patent Application Nos. 58-178835 and 4-183922.

However, due to the compression stroke injection, the carbon fouling is likely to occur in the spark plug because the fuel is injected near at the predetermined ignition timing time while the cylinder temperature is yet to be risen to a satisfactory degree.

Additionally, the spark plug usually has an ability to burningly remove or fall off the carbon deposit piled on an insulator by means of self-cleaning action due to the spark discharges so as to prevent the insulation resistance (in terms of M Ω) from unfavorably dropping.

However, the self-cleaning action does not work enough to expel the carbon fouling particularly at the time of starting, cold starting, immediately after cold starting or running along streets in cold region areas. When allowing the carbon fouling to deposit on the insulator, the insulation resistance (in terms of M Ω) drops as shown in FIG. 38 to deteriorate the engine condition so as to invite engine stall, unfavorable idling, poor driveability or starting failure.

Therefore, it is one of the objects of the invention to provide an ignition device which is capable of maintaining a good self-cleaning action when the spark plug is likely to be smoldered at the time of starting the engine, or especially cold starting the engine.

DISCLOSURE OF THE INVENTION

First Aspect of the Invention

According to the invention, there is provided an ignition device which causes at least once spark discharge in a spark plug and having a state distinction means provided to judge whether an engine is in a cold or normal state, comprising: means provided to establish at least once the spark discharge in the spark plug at the time of igniting an air-fuel mixture and at the time of except for igniting the air-fuel mixture when said state distinction means judges that the engine is in the cold state.

The spark plug is placed in an internal combustion engine and electrically connected to a secondary coil of an ignition coil. A primary coil of the ignition coil is, for example, connected to an igniter and further connected to an engine control device which generates an ignition signal to the igniter.

By on-off actuating an electric current flowing through the primary coil based on the ignition signal generated from the engine control device, it is possible to control the timing in which the spark plug produces spark discharges.

With the use of e.g., a stroke distinction means provided to detect which stroke a specified cylinder occupies, it is possible to judge which timing the spark plug is to produce the spark discharges in order to ignite the air-fuel mixture.

Operation and Advantages of the First Aspect of the Invention

When the state distinction means judges that the engine is in the cool state upon cold starting the engine or running the engine along the streets in cold region areas,it allows the spark plug to produce at least once the spark discharge at the time except for igniting the air-fuel mixture.

Namely, by increasing the fuel component against the aerial component, it is possible to stabilize the starting condition upon cold starting the engine or running the engine along the streets in cold region areas in which the air-fuel mixture is hard to vaporize quickly. In this instance, the carbon deposit is likely to pile on the insulator due to an incomplete combustion when increasing the fuel component against the aerial component. However, it is possible to burningly remove or fall off the carbon deposit by producing the spark discharges at the time when the spark discharges have no affect on the ignition against the air-fuel mixture, thus improving the self-cleaning action due to the spark discharges in the spark plug. This makes it possible, to avoid the progress of the carbon fouling with relatively high insulation resistance (in the context of M Ω) generally maintained so as to dissolve the unfavorable condition upon starting the engine in the cold state.

When judged that the engine is in the normal state in which the engine is warmed up, the spark discharges occur in the spark plug at the time only when the air-fuel mixture is to be ignited. This returns the timing of establishing the spark discharges to the normal condition so as to insure a good spark erosion resistant property with the spark plug.

Second Aspect of the Invention

According to the invention, the ignition device has means to establish at least once the spark discharge in the spark plug at the time of igniting the air-fuel mixture and during a period length from a time of igniting the air-fuel mixture to a time of beginning to inject the fuel.

Operation and Advantages of the Second Aspect of the Invention

Namely, by increasing the fuel component against the aerial component, it is possible to stabilize the starting condition upon cold starting the engine or running the engine along the streets in cold region areas in which the air-fuel mixture is hard to vaporize quickly. In this instance, the carbon deposit is likely to pile on the insulator due to an incomplete combustion when increasing the fuel component against the aerial component. However, it is possible to burningly remove or fall off the carbon deposit by producing at least once the spark discharge at the time when the spark discharges have no affect on the ignition against the air-fuel mixture, thus improving the self-cleaning action due to the spark discharges in the spark plug. This makes it possible to avoid the progress of the carbon fouling with relatively high insulation resistance (M Ω) generally maintained so as to dissolve the unfavorable condition upon operating the engine in the cold state.

Particularly in the internal combustion engine in which the fuel is directly injected into the combustion chamber, the establishment of the spark discharges has a forthright influence on igniting the air-fuel mixture upon starting to inject the fuel. For this reason, the timing length which has no influence on igniting the air-fuel mixture is during the period from the time of igniting the air-fuel mixture to the time of beginning to inject the fuel.

When having warmed up the engine, the state distinction means judges that the engine is in the normal state. In this instance, the spark discharge occurs at least once in the spark plug at the time only when the air-fuel mixture is ignited. This returns the timing of establishing the spark discharges to the normal condition so as to insure the good spark erosion resistant property with the spark plug.

Third Aspect of the Invention

According to the invention, the ignition device further has a starting distinction means provided to judge whether said engine is in a starting state or having-started state and having a means provided to establish at least once the spark discharge in the spark plug at the time of igniting the air-fuel mixture and during a period length from a time of igniting the air-fuel mixture to a time of beginning to inject fuel when said starting distinction means judges that said engine is in said starting state.

Operation and Advantages of Third Aspect of the Invention

When the start distinction means judges that the engine is in the starting state with the cold condition, it establishes the spark discharge at least once during the period length from the time of igniting the air-fuel mixture to the end of the exhaust stroke.

Namely, by increasing the fuel component against the aerial component, it is possible to ameliorate the starting condition upon cold starting the engine in which the air-fuel mixture is hard to vaporize quickly. In this instance, the carbon deposit is likely to pile on the insulator due to an incomplete combustion when increasing the fuel component against the aerial component. However, it is possible to burningly remove or fall off the carbon deposit by producing at least once the spark discharge at the time when the spark discharges have no affect on the ignition against the air-fuel mixture, thus improving the self-cleaning action due to the spark discharges in the spark plug. This makes it possible to avoid the progress of the carbon fouling with relatively high insulation resistance (in terms of M Ω) generally maintained so as to dissolve the unfavorable condition upon operating the engine in the cold state.

Particularly, in the internal combustion engine in which the fuel is directly injected into the combustion chamber, the establishment of the spark discharges has a forthright influence on igniting the air-fuel mixture upon starting to inject the fuel. For this reason, the timing length which has no influence on igniting the air-fuel mixture is during the period from the time of igniting the air-fuel mixture to the time of beginning to inject the fuel.

When having warmed up the engine, the state distinction means judges that the engine is in the normal state. In this instance, the spark discharge occurs at least once in the spark plug at the time only when the air-fuel mixture is fired. This returns the timing of establishing the spark discharges to the normal condition so as to insure the good spark erosion resistant property with the spark plug.

Fourth Aspect of the Invention

According to the invention, the ignition device further has a fuel injection control device which determines a timing of an injector which directly injects the fuel into a combustion chamber and having means provided to establish the spark discharge at least once in the spark plug at the time of igniting the air-fuel mixture and during a period length from a time of igniting the air-fuel mixture to a time of beginning to inject fuel when said injector injects the fuel through an air-intake stroke by means of said fuel injection control device.

By way of illustration, a stroke distinction means detects the air-intake stroke to inject the fuel by means of the fuel injection control device.

Operation and Advantages of the Fourth Aspect of the Invention

In the internal combustion engine in which the fuel is directly injected into the combustion chamber while carrying out an air-intake stroke injection in the cold state, the spark discharge is established at least once even during the period length from the time of igniting the air-fuel mixture to the time of beginning to inject the fuel into the combustion chamber.

By increasing the fuel component against the aerial component when carrying out an air-intake stroke injection which imposes some degrees of load on the engine, it is possible to ameliorate the starting condition upon cold starting the engine, after cold starting the engine or running along the streets in the cold region areas in which the air-fuel mixture is hard to vaporize quickly. In this instance, the carbon deposit is likely to pile on the insulator due to an incomplete combustion when increasing the fuel component against the aerial component. However, it is possible to burningly remove or fall off the carbon deposit by producing the spark discharge at least once at the time when the spark discharges have no affect on the ignition against the air-fuel mixture, thus improving the self-cleaning action due to the spark discharges in the spark plug. This makes it possible to avoid the progress of the carbon fouling with relatively high insulation resistance (in terms of M Ω) generally maintained so as to dissolve the unfavorable condition upon operating the engine in the cold state.

When finished to warm up the engine, the state distinction means judges that the engine is in the normal state. In this instance, the spark discharge occurs at least once in the spark plug at the time only when the air-fuel mixture is to be ignited. This returns the timing of establishing the spark discharges to the normal condition so as to insure the good spark erosion resistant property with the spark plug.

Fifth Aspect of the Invention

According to the invention, the ignition device causes spark discharges in the spark plug and having a fuel injection control device which determines a timing of an injector which directly injects the fuel into a combustion chamber and having means provided to establish the spark discharge at least once in a spark plug at the time of igniting the air-fuel mixture and during a period length from a time of igniting the air-fuel mixture to a time of beginning to inject the fuel when the injector injects the fuel at least through a compression stroke by means of the fuel injection control device.

Operation and Advantages of the Fifth Aspect of the Invention

In the internal combustion engine in which the fuel is directly injected into the combustion chamber while at least carrying out a compression stroke injection in the cold state, the spark discharge is established at least once at the time of igniting the air-fuel mixture and at least once even during the period length from the time of igniting the air-fuel mixture to the time of beginning to inject the fuel into the combustion chamber.

When carrying out the compression stroke injection at least, the fuel is injected at a time close to the ignition timing with the cylinder temperature not risen satisfactorily. This leads to increasing the carbon deposit on the insulator. In order to facilitate the self cleaning action, it is possible to burningly remove or fall off the carbon deposit by establishing the spark discharges through a specified stroke which has no affect on igniting the air-fuel mixture.

This makes it possible to avoid the progress of the carbon fouling with relatively high insulation resistance (in terms of M Ω) generally maintained so as to dissolve the unfavorable condition upon at least holding the compression stroke injection.

It is to be noted that by increasing the fuel component against the aerial component, it is possible to ameliorate the starting condition upon cold starting the engine, after cold starting the engine or running along the streets in the cold region areas in which the air-fuel mixture is hard to vaporize quickly. In this instance, the carbon deposit is likely to pile on the insulator due to an incomplete combustion when increasing the fuel component against the aerial component.

However, it is possible to burningly remove or fall off the carbon deposit by producing the spark discharge at least once at the time when the spark discharges have no influence on the ignition against the air-fuel mixture, thus further improving the self-cleaning action due to the spark discharges in the spark plug.

With the increase of the load imposed on the engine, the air-intake stroke injection leads to uniform distribution of the air-fuel mixture. This avoids the air-fuel mixture from being thickly concentrated around the spark plug which is exposed to the combustion chamber. In this instance, the spark discharge is established at least once at the time only when the air-fuel mixture is to be ignited.

This returns the timing of the spark discharges to the normal condition so as to avoid the spark erosion resistance from inadvertently dropping.

Sixth Aspect of the Invention

According to the invention, the ignition device further has means to establish at least once the spark discharge in the spark plug at the time of igniting the air-fuel mixture and at least once during a period length from a beginning of the air-intake strike to a beginning of injecting the fuel.

Operation and Advantages of the Sixth Aspect of the Invention

In the internal combustion engine in which the fuel is directly injected into the combustion chamber while carrying out the air-intake stroke injection or at least carrying out the compression stroke injection in the cold state, the spark discharge is established at least once during the period length from the time of the air-intake stroke to the time of beginning to inject the fuel into the combustion chamber.

When carrying out the air-intake stroke injection which imposes some degrees of load on the engine, by increasing the fuel component against the aerial component, it is possible to ameliorate the starting condition upon cold starting the engine, after cold starting the engine or running along the streets in the cold region areas in which the air-fuel mixture is hard to vaporize quickly.

When at least carrying out the compression stroke injection, the fuel is injected at a time close to the ignition timing with the cylinder temperature not risen satisfactorily. This leads to an increase of the carbon deposit piled on the insulator.

Under the above situation, an increased fuel component signifies an increase of the carbon deposit because of the incomplete combustion.

In addition, it is feared that an oxygen component within the combustion chamber is consumed during the expansion or exhaust stroke after igniting the air-fuel mixture.

With this in mind, it is important to produce the spark discharge at least once during the period length from the air-intake stroke to the beginning of the fuel injection. Because that period length has no influence on igniting the air-fuel mixture with the oxygen-rich gas swirling around the spark plug. This makes it easy to burningly remove or fall off the carbon deposit to facilitate the self-cleaning action.

With these procedures thus carried out, it is possible to avoid the progress of the carbon fouling with relatively high insulation resistance (in terms of M Ω) generally maintained so as to dissolve the unfavorable condition upon cold starting the engine.

Upon having warmed up the engine, the state distinction means judges that the engine is in the normal state in which the spark discharge occurs at least once at the time only when the air-fuel mixture is to be ignited.

This returns the timing of the spark discharges to the normal condition so as to avoid the spark erosion resistance from inadvertently dropping.

Seventh Aspect of the Invention

According to the invention, the ignition device further has means provided to establish at least once the spark discharge in the spark plug at the time of igniting the air-fuel mixture and during a period length from a time of igniting the air-fuel mixture to an end of an exhaust stroke.

By way of illustration, the end of the exhaust stroke is detected with the use of a stroke distinction means.

Operation and Advantages of the Seventh Aspect of the Invention

When the state distinction means judges that the engine is in the cold state (after cold starting the engine or running along the streets in the cold region areas), the spark discharge is established at least once in the spark plug during the period length from the time of igniting the air-fuel mixture to the end of the exhaust stroke.

Namely, by increasing the fuel component against the aerial component, it is possible to ameliorate the starting condition upon cold starting the engine, after cold starting the engine or running along the streets in the cold region areas in which the air-fuel mixture is hard to vaporize quickly.

In this instance, the increased fuel component signifies the increase of the carbon deposit due to the incomplete combustion.

The air-intake stroke followed by the exhaust stroke usually introduces the air-fuel mixture into the combustion chamber. When the spark discharge is established at least once in the spark plug at the beginning of the air-intake stroke, it is feared that the air-fuel mixture would be introduced into the combustion chamber while burning the air-fuel mixture. This results in losing the driving power that can be inherently achieved by the engine.

In view of this, it is important to produce the spark discharge at least once during the period length from the time of igniting the air-fuel mixture to the end of the exhaust stroke, which has no affect on igniting the air-fuel mixture. This makes it possible to burningly remove or fall off the carbon deposit to facilitate the self-cleaning action.

With these procedures thus attained, it is possible to avoid the progress of the carbon fouling with relatively high insulation resistance (in terms of M Ω) generally maintained so as to dissolve the unfavorable condition upon cold starting the engine.

When the engine is warmed up, and the state distinction means judges that the engine is in the normal state, the spark discharge occurs at least once at the time only when the air-fuel mixture is to be ignited.

This returns the timing of the spark discharges to the normal condition to avoid the spark erosion resistance from inadvertently dropping.

Eighth Aspect of the Invention

According to the invention, the ignition device further has a start distinction means to judge whether said engine is in a starting state or having-started state and having a means provided to establish at least once the spark discharge in the spark plug at the time of igniting the air-fuel mixture and during a period length from a time of igniting the air-fuel mixture to the end of the exhaust stroke when said start distinction means judges that the engine is in the starting state.

Whether the engine is in the starting state or having-started state is judged by detecting, for example, a revolution (rpm) of the engine.

Operation and Advantages of the Eighth Aspect of the Invention

When the start distinction means judges that the engine is in the starting condition with the cold state, the spark discharge is established at least once in the spark plug during the period length from the time of igniting the air-fuel mixture to the end of the exhaust stroke.

Namely, by increasing the fuel component against the aerial component, it is possible to ameliorate the starting condition upon cold starting the engine in which the air-fuel mixture is hard to vaporize quickly.

In this instance, the increased fuel component signifies the increase of the carbon deposit owing to the incomplete combustion.

The end of the exhaust stroke follows the air-intake stroke which usually introduces the air-fuel mixture into the combustion chamber. When the spark discharge is established at least once in the spark plug at the beginning of the air-intake stroke, the inherent driving power of the engine would be lost with the result that the air-fuel mixture is introduced into the combustion chamber while burning the air-fuel mixture.

In view of the above, it is important to produce the spark discharge at least once during the period length from the time of igniting the air-fuel mixture to the end of the exhaust stroke, which has no affect on igniting the air-fuel mixture. This makes it possible to burningly remove or fall off the carbon deposit to facilitate the self-cleaning action.

With these procedures thus obtained, it is possible to avoid the progress of the carbon fouling with relatively high insulation resistance (in terms of M Ω) generally maintained so as to dissolve the unfavorable condition upon cold starting the engine.

Once the engine has started, the starting distinction means judges that the engine is in the having-started state, the spark discharge occurs at least once at the time only when the air-fuel mixture is to be ignited.

This returns the timing of the spark discharges to the normal condition so as to avoid the spark erosion resistance from inadvertently dropping.

Ninth Aspect of the Invention

According to the invention, the ignition device has means to establish the spark discharges plural times at the time of except for igniting the air-fuel mixture.

Operation and Advantages of the Ninth Aspect of the Invention

With the spark discharges established a plurality of times at the time except for igniting the air-fuel mixture, it is possible to further facilitate the self-cleaning action in the cold state.

Tenth Aspect of the Invention

According to the invention, the state distinction means judges based on cooling water temperature of the engine whether the engine is in the cold state or normal state.

Operation and Advantages of the Tenth Aspect of the Invention

It is possible for the state distinction means to judge whether the engine is in the cold state or normal state because the cooling water temperature of the engine is low when the engine is in the cold state, and the cooling water temperature becomes higher as approaching the normal state. This makes it possible to precisely judge with a simple structure whether the engine is in the cold state or normal state.

Eleventh Aspect of the Invention

According to the invention, a spark plug has a cylindrical metal shell; an insulator fixedly provided within said metal shell; the insulator having an axial bore in which a center electrode is fixedly placed; a ground electrode provided to form a spark gap with a front end of the center electrode; the spark gap extending at least partially to a front end surface of the insulator so as to form a semi-creeping discharge type spark plug.

Operation and Advantages of the Eleventh Aspect of the Invention

Under the circumstances that the semi-creeping discharge type spark plug is subjected to the insulation resistance reduction due to the carbon fouling, it is possible to avoid the drop of the insulation resistance (in terms of M Ω) so as to dissolve the unfavorable condition upon cold starting the engine.

Twelfth Aspect of the Invention

According to the invention, a semi-creeping discharge type spark plug has three or more ground electrodes.

Operation and Advantages of the Twelfth Aspect of the Invention

In the ignition device used for the semi-creeping discharge type spark plug, it is possible to uniformly remove the carbon deposit on the insulator owing to the self-cleaning action by dispersively disposing the three or more ground electrodes in the case in which the spark discharge is established at least once in the spark plug at the time except for when the air-fuel mixture is to be ignited.

Thirteenth Aspect of the Invention

According to the invention, the semi-creeping discharge type spark plug is provided in which a front end surface of the center electrode extends beyond a front end surface of the insulator by 0.5 mm or less, otherwise the front end surface of the center electrode retract behind the front end surface of the insulator by 0.5 mm or less.

Operation and Advantages of the Thirteenth Aspect of the Invention

In the ignition device used for the semi-creeping discharge type spark plug in which the front end surface of the center electrode is substantially in flush with that of the insulator, it is possible to avoid the drop of the insulation resistance while keeping the engine in good condition by establishing the spark discharge at least once at the time except for when the air-fuel mixture is to be ignited.

Fourteenth Aspect of the Invention

According to the invention, the spark plug has a cylindrical metal shell; an insulator fixedly provided within the metal shell; the insulator having an axial bore in which a center electrode is fixedly placed; an annular-shaped ground electrode provided in integral with the metal shell so as to face a front end of the center electrode; at least once spark discharge creeping along a front end surface of the insulator across a spark gap which is formed between the center electrode and ground electrode so as to form a full-creeping discharge type spark plug.

Operation and Advantages of the Fourteenth Aspect of the Invention

In the ignition device used for the full creeping discharge type spark plug in which the annular-shaped ground electrode is provided in integral with the metal shell to creep the spark discharge at least once along the front end surface of the insulator across the center and ground electrode, it is possible to avoid the drop of the insulation resistance while keeping the engine in good condition by establishing the spark discharges at the time except for when the air-fuel mixture is to be ignited.

Fifteenth Aspect of the Invention

According to the invention, a method is provided to establish at least once the spark discharge in the spark plug even at the time except for igniting the air-fuel mixture when the engine is in the cold state.

Operation and Advantages of the Fifteenth Aspect of the Invention

When the engine is in the cold state (after cold starting the engine or running along the streets in the cold region areas), the spark discharge is established at least once in the spark plug at the time except for when usually igniting the air-fuel mixture.

Namely, by increasing the fuel component against the aerial component, it is possible to ameliorate the starting condition upon cold starting the engine, after cold starting the engine or running along the streets in the cold region areas in which the air-fuel mixture is hard to vaporize quickly.

In this instance, the increased fuel component signifies the increase of the carbon deposit due to the incomplete combustion.

With this in mind, it is important to produce the spark discharge at least once during the period length which has no affect on igniting the air-fuel mixture. This makes it possible to burningly remove or fall off the carbon deposit to facilitate the self-cleaning action.

This arrangement avoids the progress of the carbon fouling with relatively high insulation resistance (in terms of M Ω) generally maintained so as to dissolve the unfavorable condition upon cold starting the engine.

When the engine is warmed up to be in the normal state, the spark discharge occurs at least once at the time only when the air-fuel mixture is to be ignited.

This returns the timing of the spark discharges to the normal condition so as to avoid the spark erosion resistance from inadvertently dropping.

Sixteenth Aspect of the Invention

According to the invention, a method is provided to establish at least once the spark discharge during a time from a beginning of an air-intake stroke to a beginning of injecting fuel when injecting the fuel directly into the combustion chamber at least through the compression stroke, otherwise when directly injecting the fuel into the combustion chamber through an air-intake stroke with the engine kept in the cold state.

Operation and Advantages of the Sixteenth Aspect of the Invention

In the internal combustion engine in which the fuel is injected directly into the combustion chamber while carrying out the air-intake stroke injection or at least carrying out the compression stroke injection in the cold state, the spark discharge is established at least once during the period length from the time of the air-intake stroke to the time of beginning to inject the fuel into the combustion chamber.

Even when carrying out the air-intake stroke injection which imposes some degrees of load on the engine, with the increase of the fuel component against the aerial component, it is possible to ameliorate the starting condition upon cold starting the engine, after cold starting the engine or running along the streets in the cold region areas in which the air-fuel mixture is hard to vaporize quickly.

Upon carrying out the compression stroke injection at least, the fuel is injected at a time close to the ignition timing with the cylinder temperature not risen satisfactorily. This leads to an increase of the carbon deposit piled on the insulator.

In this instance, the increased fuel component signifies the increase of the carbon deposit placed on the insulator due to the incomplete combustion.

In addition, it is feared that the oxygen component within the combustion chamber is consumed during the expansion or exhaust stroke after igniting the air-fuel mixture.

In order to obviate the above apprehension, it is important to produce the spark discharge at least once during the period length from the air-intake stroke to the beginning of the fuel injection. This is because that period length has no affect on igniting the air-fuel mixture with the oxygen-rich gas staying around the spark plug. This makes it easy to burningly remove or fall off the carbon deposit to facilitate the self-cleaning action.

With these procedures thus carried out, it is possible to avoid the progress of the carbon fouling with relatively high insulation resistance (in terms of M Ω) generally maintained so as to dissolve the unfavorable condition upon cold starting the engine.

When the engine is warmed up, the state distinction means judges that the engine is in the normal state in which the spark discharge occurs at least once at the time only when the air-fuel mixture is to be ignited.

This returns the timing of the spark discharges to the normal condition so as to avoid the spark erosion resistance from inadvertently dropping.

DESCRIPTION OF NUMERALS

7—spark plug
8—injector
41a—water temperature detecting member (state distinction means)
41b—starting state distinction means
41e—fuel injection pulse width/injection starting timing calculation·determination means (fuel injection control device)
771—metal shell
772—insulator
773—center electrode
774—ground electrode
7711—front end surface
7721—axial bore
7723—front end surface of insulator
7741—firing surface
7811—ground electrode
A, B—semi-creeping discharge type spark plug (spark plug)
C—full creeping discharge type spark plug (spark plug)

BEST MODES FOR CARRYING OUT THE INVENTION

[First Embodiment of the Invention]

Figure 17:
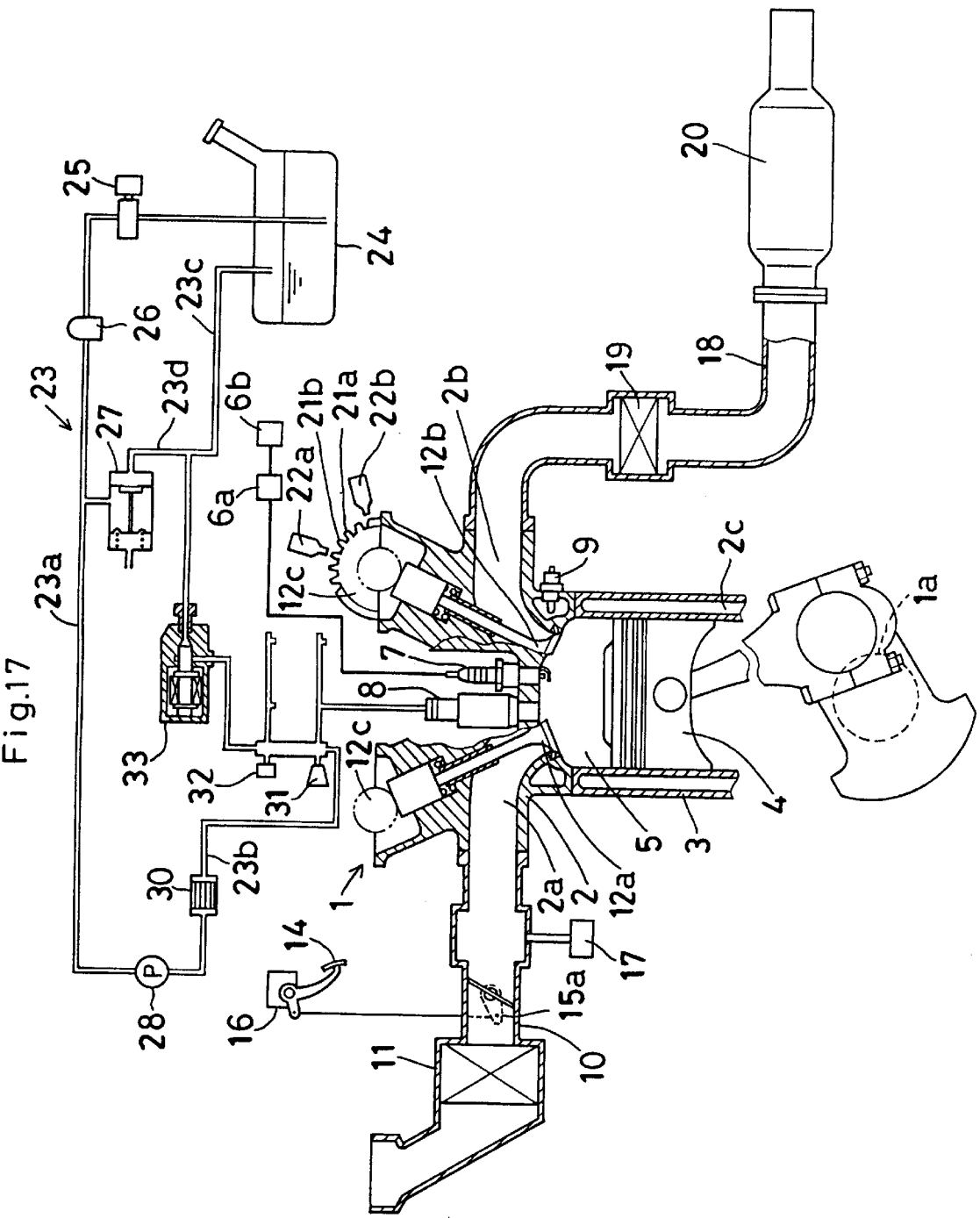
FIG. 17 is an entire schematic view of an in-cylinder injection type engine.

Referring to FIG. 17 which shows an entire schematic view of a fuel supply system of an in-cylinder injection type engine as one example of a multi-cylindered internal combustion engine, the in-cylinder injection type engine 1 (referred to merely as "engine" hereinafter) represents a four-cylce, four-cylindered internal combustion engine which uses gasoline as a vaporized fuel.

With the component parts of a cylinder head 2, cylinder block 3 and a piston 4, a combustion chamber 5 is provided. To the combustion chamber 5, a spark plug 7, an injector 8, an air-intake valve 12a and an exhaust valve 12b are extended respectively. The spark plug 7 is electrically connected one-on-one to each of the secondary terminals of secondary coils of four ignition coils by way of a high tension cord.

The spark plug 7 is represented by a semi-creeping discharge type spark plug (A,B) and a full creeping discharge type spark plug (C) as described hereinafter.

Figure 16:
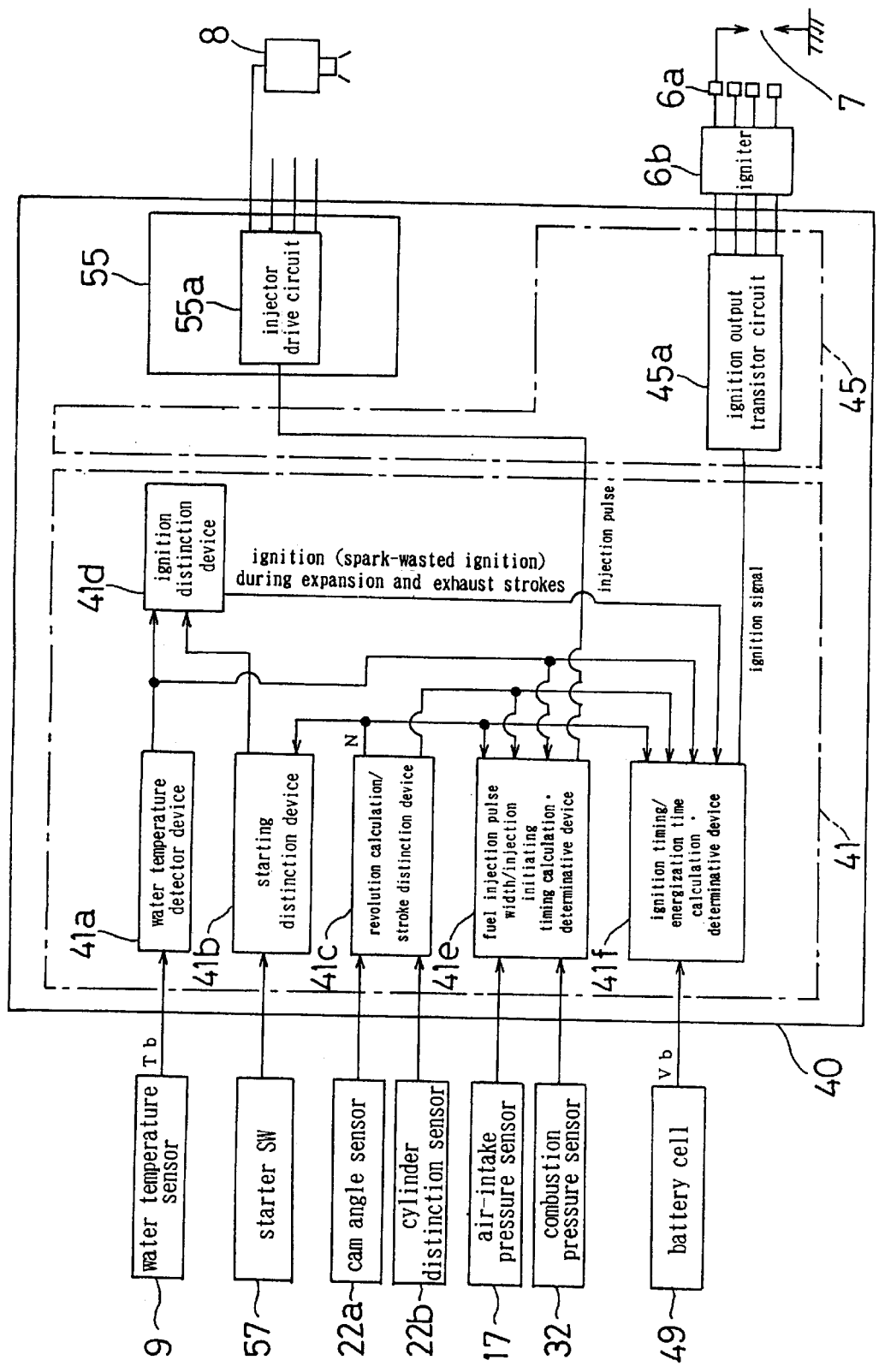
FIG. 16 is a functional block diagram of the ignition device.

The number of the ignition coils 6a of a voltage step-up device is the same as that of cylinders (four) of the engine which has a distributorless ignition system. The ignition coil 6a has a primary coil and a secondary coil which are in turn wound several hundreds times and tens thousands times on a laminated silicon steel core, and finally encapsulated into a casing with a synthetic resin. A terminal of the primary coil is connected to a terminal of the secondary coil and further connected to a positive terminal of a battery cell. As shown in FIG. 16, the terminal of the primary coil is connected to the igniter 6b and further connected to an ignition output transistor circuit 45a.

The ignition output transistor circuit 45a induces a high voltage (25~30 kV) in the secondary coil of the ignition coil 6a based on an ignition signal of an engine control device 40.

Reverting to FIG. 17, the cylinder head 2 has an air-intake port 2a, an exhaust port 2b and a cooling water passage 2c, to which a water temperature sensor 9 is extended.

The air-intake port 2a is communicated with an air-intake pipe 10 of which upper reach has an air cleaner 11. In a halfway of the suction pipe 10, a throttle valve 15a is provided which is driven by a gas pedal 14. The gas pedal 14 has an opening degree detecting sensor 16 to detect an opening degree of the throttle valve 15a. A pressure within the suction pipe 10 is detected by means of an air-intake pressure sensor 17.

The exhaust port 2b is communicated with an exhaust pipe 18 in which a catalyst converter 19 is provided to pass exhaust emission gas through a muffler 20 formed at a lower reach thereof.

Figure 18:
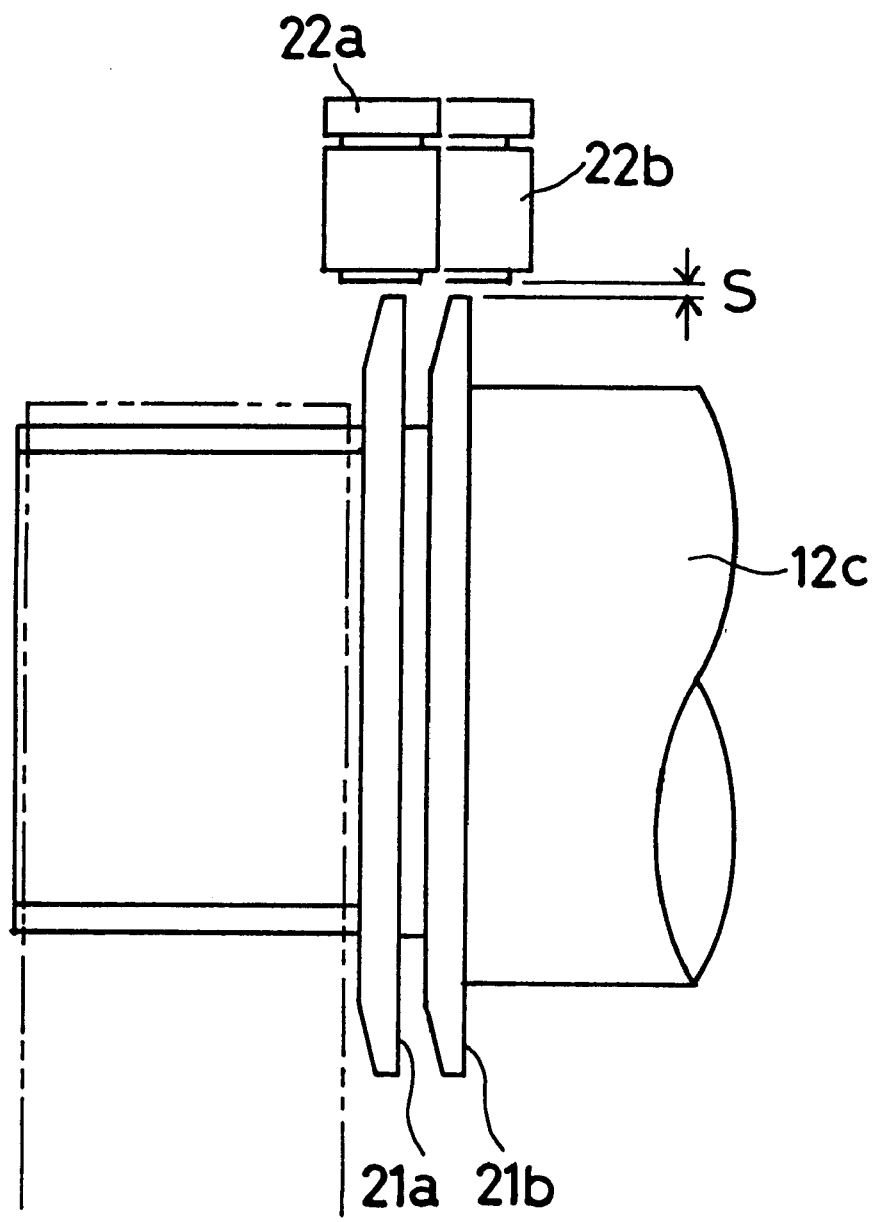
FIG. 18 is a side elevational view of a cam angle detecting cam rotor and a cylinder distinction cam rotor connected to a cam shaft shown with a sensor provided therewith.

On an upper portion of the air-intake valve 12a or the exhaust valve 12b, a camshaft 12c is provided which is arranged to revolve once by means of a timing belt and the like when a crankshaft 1a revolves twice. The camshaft 12c provided on either the air-intake valve 12a or the exhaust valve 12b has a cam angle detecting cam rotor 21a and a cylinder distinction cam rotor 21b are provided with a predetermined length spaced therebetween as shown in FIG. 18.

At an outer periphery of the cam angle detecting cam rotor 21a and a cylinder distinction cam rotor 21b, a cam angle sensor 22a (e.g., electromagnetic pickup sensor) and a cylinder distinction sensor 22b are fixedly provided on the cylinder head 2 with a certain distance (S) spaced.

Figure 19:
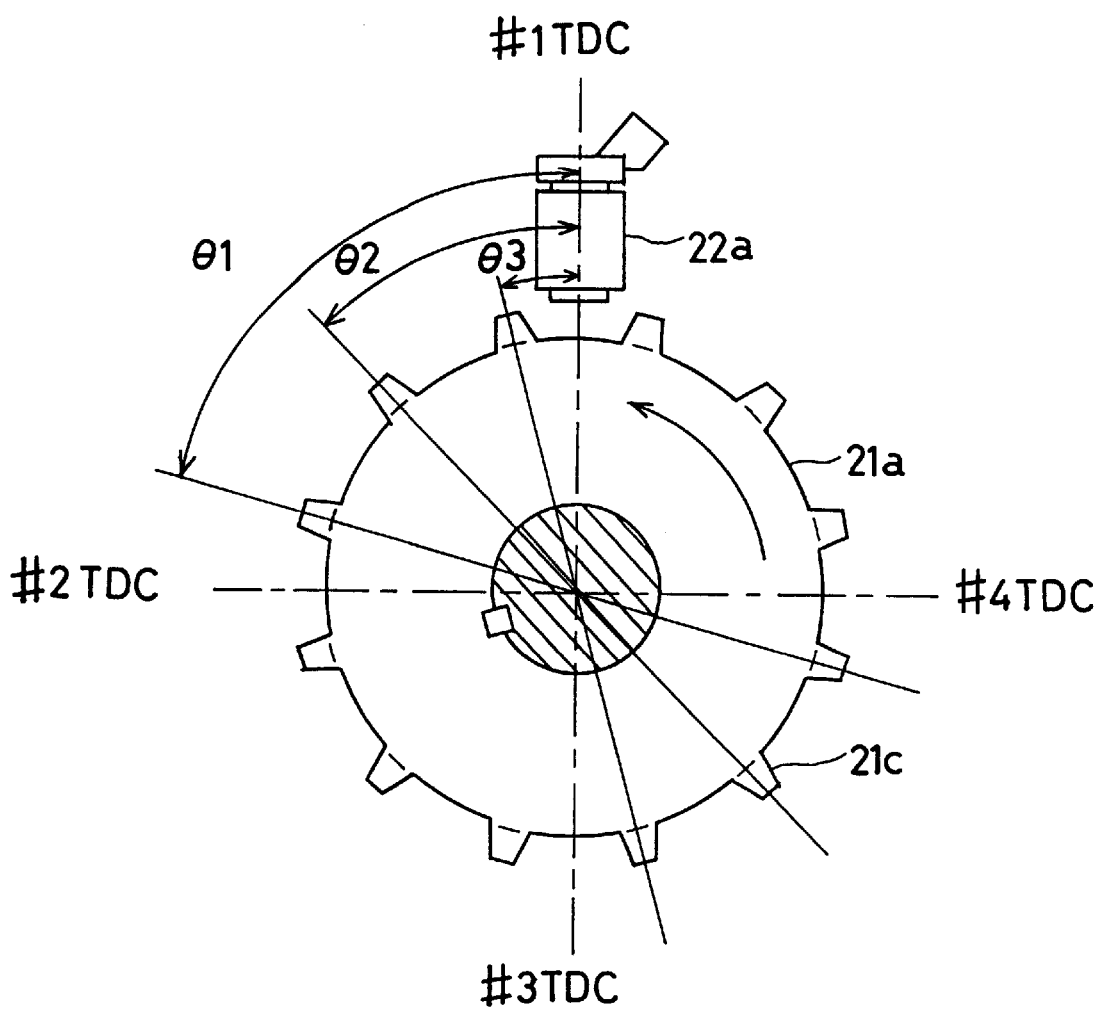
FIG. 19 is a plan view of the cam angle detecting cam rotor and a cam angle sensor provided with the cam rotor.

As shown in FIG. 19, the cam angle detecting cam rotor 21a has a plurality of cam angle detecting teeth 21c.

In the engine 1, the air-fuel mixture is burned at regular intervals and ignited in the order of cylinder #1→#4→#3→#2. A top dead center of a compression stroke (referred to merely as "TDC" hereinafter) of each cylinder corresponds to 90° in terms of the cam angle.

Each of the cam angle detecting teeth 21c positions ate $\theta$ 1~$\theta$ 3 before top dead center of the compression stroke (referred to merely as "BTDC" hereinafter) of each cylinder. By way of example, $\theta$ 1, $\theta$ 2 and $\theta$ 3 in turn corresponds to 75°, 45° and 15° in the context of BTDC cam angle. Namely, the cam angle detecting teeth 21c are circularly arranged to position at regular intervals (30°) with TDC of each cylinder interposed therebetween.

Figure 20:
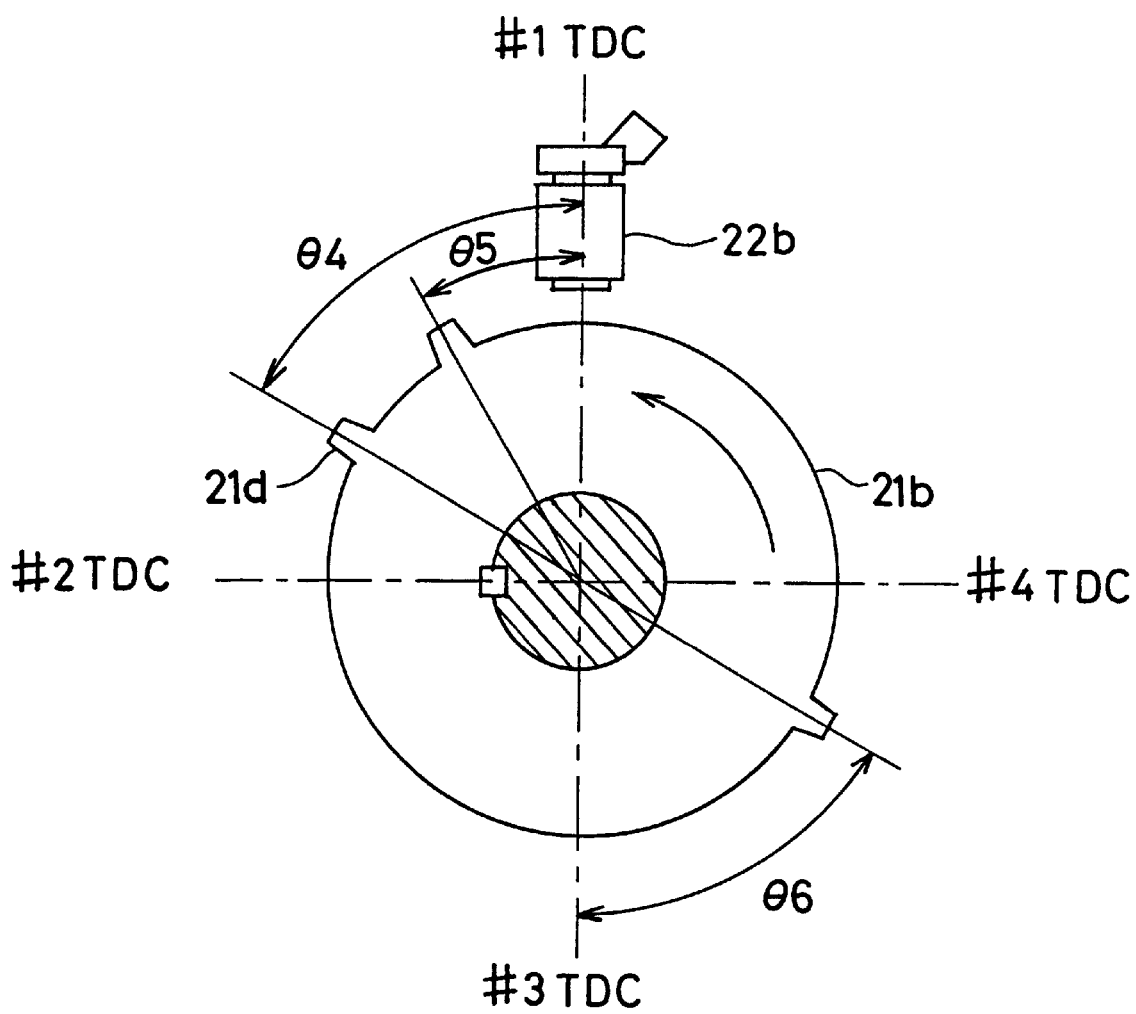
FIG. 20 is a plan view of the cylinder distinction cam rotor and a cylinder distinction sensor provided with the cam rotor.

As shown in FIG. 20, cylinder distinction teeth 21d are provided on an outer periphery of the cylinder distinction cam rotor 21b. The number of the cylinder distinction teeth 21d is three, two of which are placed in turn on the position of BTDC $\theta$ 4 and $\theta$ 5 of a cylinder #1. The rest of the cylinder distinction teeth 21d are placed on the position of BTDC $\theta$ 6 of a cylinder #3.

In the cylinder distinction teeth 21d, $\theta$ 4, $\theta$ 5 and $\theta$ 6 in turn corresponds 60°, 30° and 60° in terms of BTDC cam angle. The distance (S) is e.g., 0.8±0.4 (mm) when each of the cam angle detecting teeth 21c faces the cam angle sensor 22a and each of the cylinder distinction teeth 21d faces the cylinder distinction sensor 22b.

As shown in FIG. 18, the cam angle sensor 22a forms a certain interposal angle against the cylinder distinction sensor 22b. However, for the sake of convenience, these two sensors 22a are depicted in FIGS. 19, 20 with the top dead center of the cam angle detecting cam rotor 21a and that of the cylinder distinction cam rotor 21b corresponded each other.

By way of illustration, the cam angle detecting teeth 21c of the cam angle detecting cam rotor 21a passes in the proximity of the cam angle sensor 22a so as to generate a cam angle sensor output (referred to as "cam pulse" hereinafter) in association with the rotational movement of the cam shaft 12c. This holds true in the case of an output generated from a cylinder distinction sensor 22b.

Figure 23:
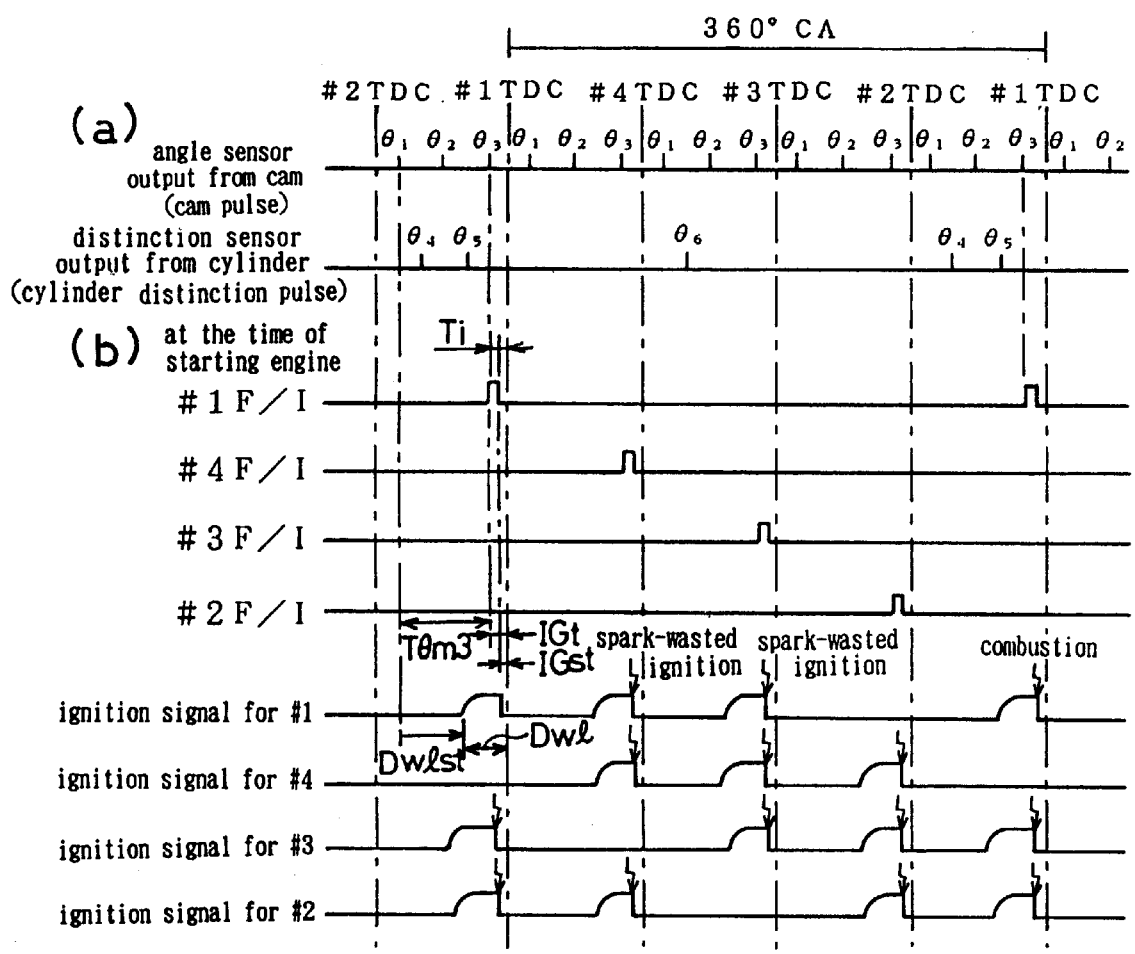
FIG. 23 is a timing chart showing an ignition and fuel injection procedures when starting the engine.
Figure 24:
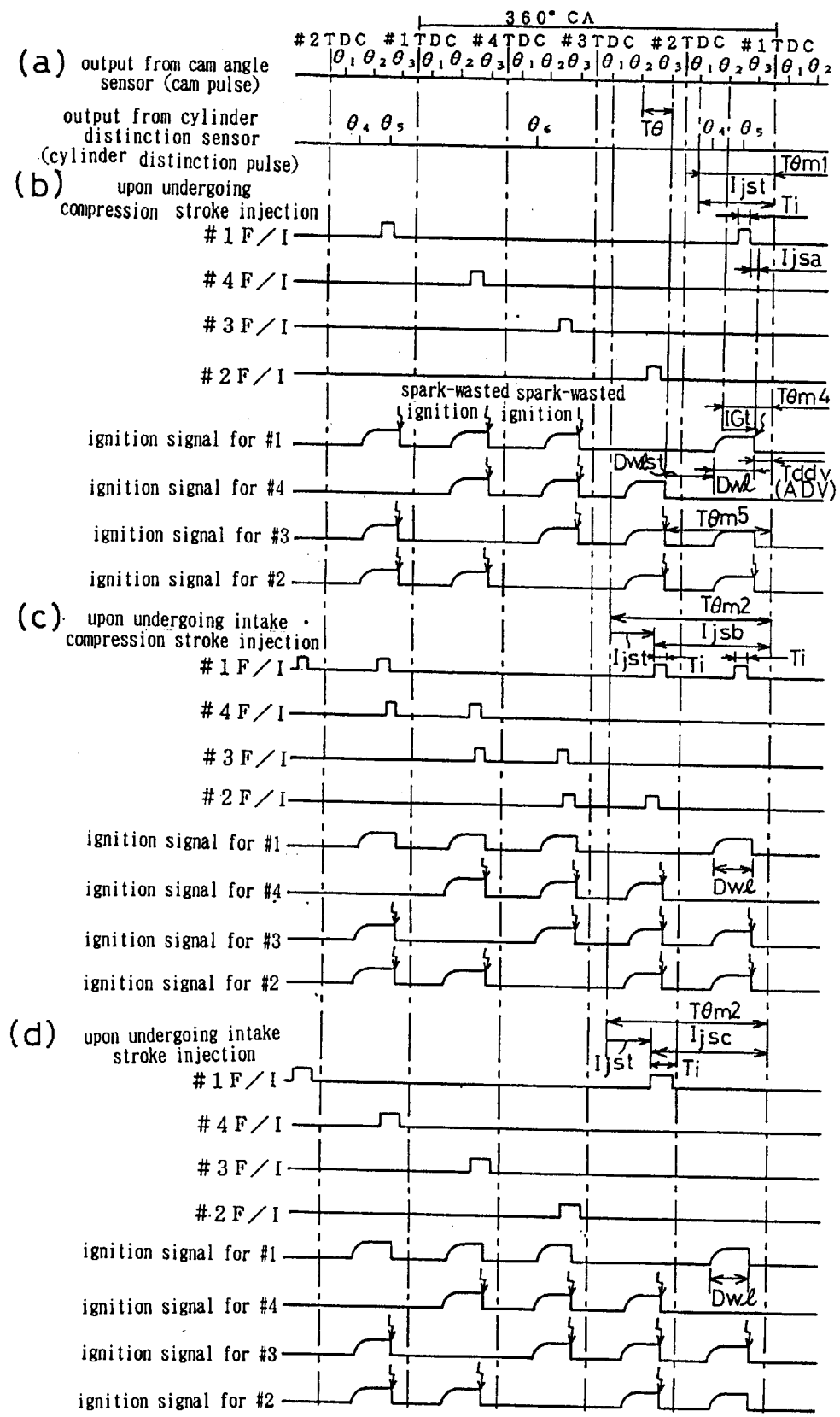
FIG. 24 is a timing chart showing an ignition and fuel injection procedures after starting the engine.

The outputs each generated from the cam angle sensor 22a and the cylinder distinction sensor 22b is expounded in reference to flow charts each shown in FIGS. 23 and 24.

As regards a detection timing of the cam pulse and the cylinder distinction pulse, a cylinder distinction pulse of BTDC $\theta$ 4 ($\theta$ 4 pulse) of the cylinder #1 is detected between a cam pulse of BTDC $\theta$ 1 ($\theta$ 1 pulse) and a cam pulse of BTDC $\theta$ 2 ($\theta$ 2 pulse) of the cylinder #1, and a cylinder distinction pulse of BTDC $\theta$ 5 ($\theta$ 5 pulse) of the cylinder #1 is detected between a cam pulse of BTDC $\theta$ 2 ($\theta$ 2 pulse) and a cam pulse of BTDC $\theta$ 3 ($\theta$ 3 pulse) of the cylinder #1.

In addition, a cylinder distinction pulse of BTDC $\theta$ 6 ($\theta$ 6 pulse) of the cylinder #3 is detected between the $\theta$ 1 pulse and $\theta$ 2 pulse of the cylinder #3.

Consequently, the cam pulse detected after recognizing the $\theta$ 4 pulse and $\theta$ 5 pulse by the cylinder distinction sensor 22b is determined to be the $\theta$ 3 pulse of the cylinder #1.

When the cylinder distinction pulse is not detected between the $\theta$ 2 pulse and $\theta$ 3 pulse after recognizing the $\theta$ 6 pulse by the cylinder distinction sensor 22b, it is determined that the $\theta$ 3 pulse is derived from BTDC $\theta$ 3 of the cylinder #3.

With these procedures, it is possible to perceive which stroke each of the cylinders occupies by the functions of the cam angle detecting cam rotor 21a, the cylinder distinction cam rotor 21b, the cam angle sensor 22a and the cylinder distinction sensor 22b.

A timing chart in FIG. 23 shows a starting-time fuel injection and ignition signal when the condition that spark discharges are ineffectively wasted (spark-wasted ignition) is met as described hereinafter. A timing chart in FIG. 24 shows a having-started fuel injection and ignition signal when the condition that spark discharges are ineffectively wasted (spark-wasted ignition) is met as also described hereinafter.

The $\theta$ 1 pulse serves as a reference cam angle of a dwell initiating timing timer when starting the engine, and also acts as a reference cam angle of a fuel injection initiating timing timer after starting the engine. The $\theta$ 2 pulse serves as a reference cam angle of a having-started ignition timing timer start when having started the engine.

The $\theta$ 3 pulse serves as a reference cam angle of a fuel injection initiating timer and ignition timing timer start when starting the engine, and also acts as a reference cam angle of a dwell initiating timing timer start after starting the engine.

It is to be noted that in a two-cycle, four-cylindered engine, the cylinder distinction cam rotor 21b may serves as a crank rotor attached to a crankshaft with the cylinder distinction sensor 22b opposed against the crank rotor.

Returning to FIG. 17 which shows a structure of a fuel injection system, a fuel bus line 23 of a fuel supply system has in its half way a fuel pump 28, and a lower reach of which has an electromagnetic pressure regulator 33. An upper reach of the fuel pump 28 of the fuel bus line 23 forms a delivery line 23a which passes the fuel from a fuel reservoir 24. Between the lower reach of the fuel pump 28 and the electromagnetic pressure regulator 33, a supply line 23b is provided to pressurize the fuel to send it to the injector 8 via the delivery line 23a. A lower reach of the electromagnetic pressure regulator 33 forms a low pressure return line 23c.

The electromagnetic pressure regulator 33 has a normally open type valve, an opening degree of which is operated by means of a duty control or an electronic control. For using the duty control, the duty ratio is predetermined to be 0~100%, and the valve is fully closed at the duty ratio ≧80%. For using the alternative electronic control, the opening degree of the valve progressively decreases with the increase of electrical current supplied to the electromagnetic pressure regulator 33.

The electromagnetic pressure regulator 33 is capable of maintaining the fuel pressure of the fuel supply line 23b and precisely measuring an amount of the fuel supplied to the combustion chamber 5 by adjusting the valve-opening time length of the injector 8.

The delivery line 23a is in communication with the return line 23c by way of a fuel bypass passage 23d which has a diaphragm type pressure regulator 27 to adjust the fuel pressure within the delivery line 23a.

By way of the delivery line 23a, a feed pump 25 sends the fuel within the reservoir 24 to supply it to the fuel pump 28 through a strainer 26 with the fuel pressure adjusted by the diaphragm type pressure regulator 27.

The fuel bus line 23 forms a line pressure holding type high pressure injection system, and the fuel supplied by the delivery line 23a is pressurized by the fuel pump 28 in the fuel supply line 23b. The pressurized fuel is adjusted to have a higher pressure by the electromagnetic type pressure regulator 33, and then supplied to the injector 8 in each of the cylinders by way of a fuel supply line strainer 30, a pulse pressure buffering accumulator 31 and a fuel supply passage in which a fuel pressure sensor 32 is placed.

The fuel pump 28 forms an engine-driven type plunger pump and having an inlet and outlet to which a check valve is provided respectively. Before starting the engine, the fuel pump 28 allows the passage of the fuel from the delivery line 23a.

Figure 15:
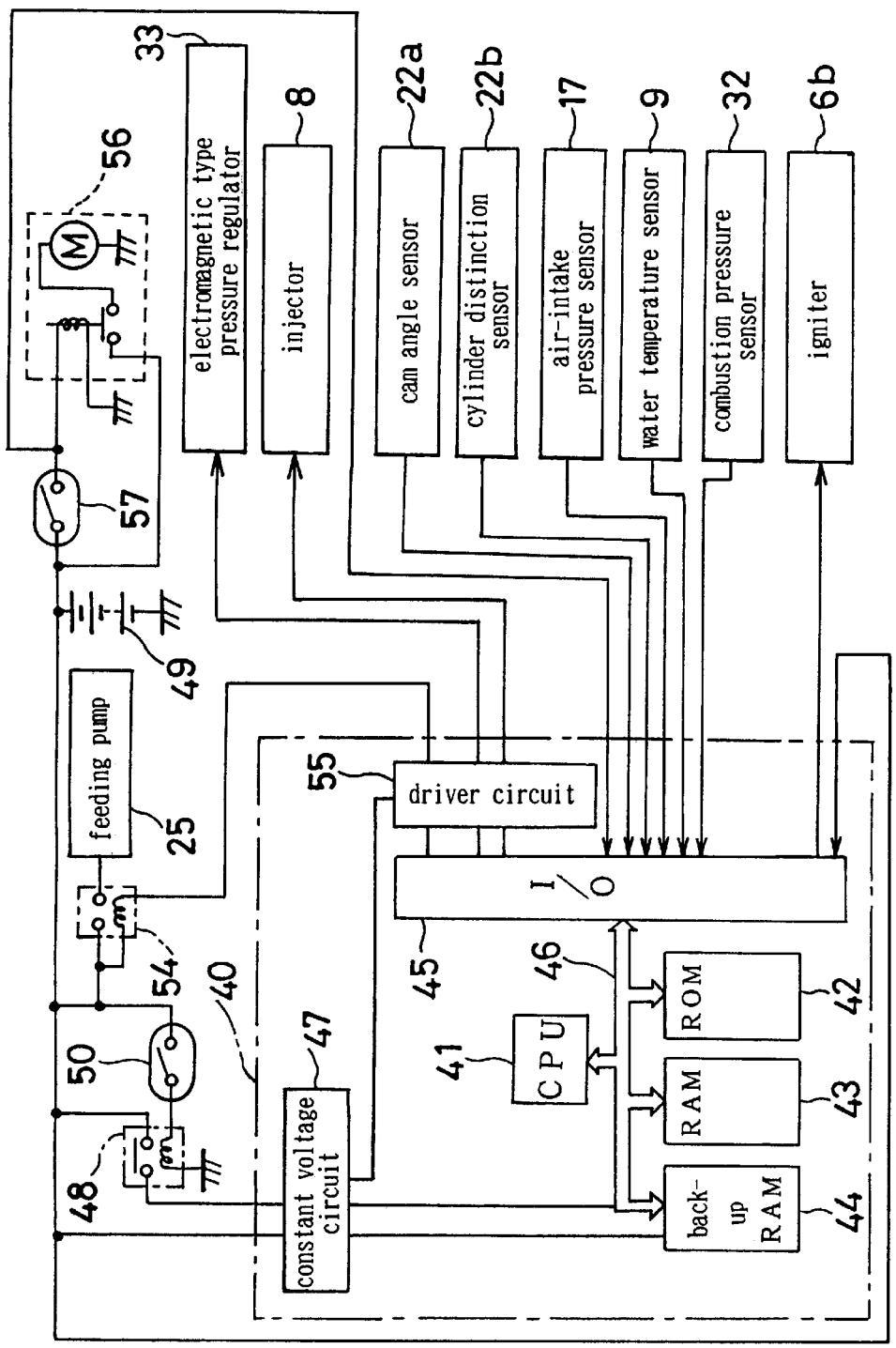
FIG. 15 is an electrical connecting diagram of an ignition device.

In FIG. 15 which depicts an entire schematic structure of the ignition device which includes an engine control device 40, the engine control device 40 has a built-in type constant voltage circuit 47 and is incorporated into a microcomputer in which a CPU 41, ROM 42, RAM 43, back-up RAM 44 and I/O interface 45 are interconnected via a bus line 46.

The constant voltage circuit 47 is connected to a battery cell 49 via a contact of the ECU relay 48, a relay coil of which is connected to the battery cell 49 by way of an ignition switch 50.

Upon turning on the ignition switch 50, the ECU relay 48 opens its contact to energize the constant voltage circuit 47 to stabilize the voltage of the battery cell 49 which is supplied to each of the component parts of the engine control device 40.

The back-up RAM 44 is connected to the battery cell 49 via the constant voltage circuit 47 so as to always supply the back-up voltage irrespective of whether the the ignition switch 50 is turned on or off.

The battery cell 49 is connected to the feed pump 25 via a relay contact of a feed pump relay 54.

The battery cell 49 is also connected to an electric motor which is attached to a starter 56 by way of a contact of a magnet switch, and connected to an electromagnetic coil of the magnet switch via a starter switch 57.

The I/O interface 45 has an input port connected to the battery cell 49 so as to monitor the voltage level of the battery cell 49. The input port is further connected to the cam angle sensor 22a, the cylinder distinction sensor 22b, the air-intake pressure sensor 17, the water temperature sensor 9, the fuel pressure sensor 32 and the starter switch 57.

The I/O interface 45 has an output port connected to the igniter 6b which energizes the ignition coil 6a, and further connected to the relay coil of the feed pump relay 54 which is energized by the battery cell 49 via a drive circuit 55. The output port is additionally connected to the electromagnetic coil of the injector 8 and the electromagnetic coil of the pressure regulator 33.

In FIG. 16 which shows a block diagram to implement the fuel injection control and the ignition timing control of the engine control device 40, the CPU 41 has a water temperature detector device 41a, a starting distinction device 41b, a revolution calculation/stroke distinction device 41c, an ignition distinction device 41d, a fuel injection pulse width/injection initiating timing calculation·predeterminative device 41e and an ignition timing/energization time calculation·predeterminative device 41f.

The water temperature detector device 41a which serves as a state distinction means converts the voltage level of the water temperature sensor 9 by means of a A/D converter. If necessary, the voltage level of the water temperature sensor 9 is leveled off to determine the temperature (Tb) of the cooling water so as to form the state distinction means.

The starting distinction device 41b judges whether the starter switch 57 is on or off, and whether the engine is in a starting state or having-started state by means of the revolution (N) of the engine.

When the starter switch 57 is turned on and the revolution (N) is lower than a predetermined one (N≦Nst), the starting distinction device 41b judges that the engine is in the starting state.

In the revolution calculation/stroke distinction device 41c, the revolution (N) of the engine is detected based on an interval time length of the cam pulse of the cam angle sensor 22a. By comparing the cam pulse with the detection timing of the cylinder distinction pulse recognized by the cylinder distinction sensor 22b, it is possible to detect the reference cam angle at the time of ignition and which stroke each of the cylinders occupies.

In the ignition distinction device 41d, when the starting distinction device 41b judges that the engine is in the having-started state, and the device 41d monitors whether or not the cooling water temperature (Tb) reaches less than a predetermined value (Tc) which is a reference to establish "spark-wasted ignition" between the predetermined ignition timing of igniting the air-fuel mixture and the subsequent fuel injection initiating timing, it is judged that the requirement of establishing "spark-wasted ignition" is satisfied at Tb≦Tc. The requirement of establishing "spark-wasted ignition" is also met when the starting distinction device 41b judges that the engine is in the starting state.

When the ignition distinction device 41d judges that the requirement of the expansion stroke or exhaust stroke ignition is met, the device 41d commands the ignition timing/energization time calculation·predeterminative device 41f to produce the spark-wasted ignition in the corresponding cylinders.

Figure 32:
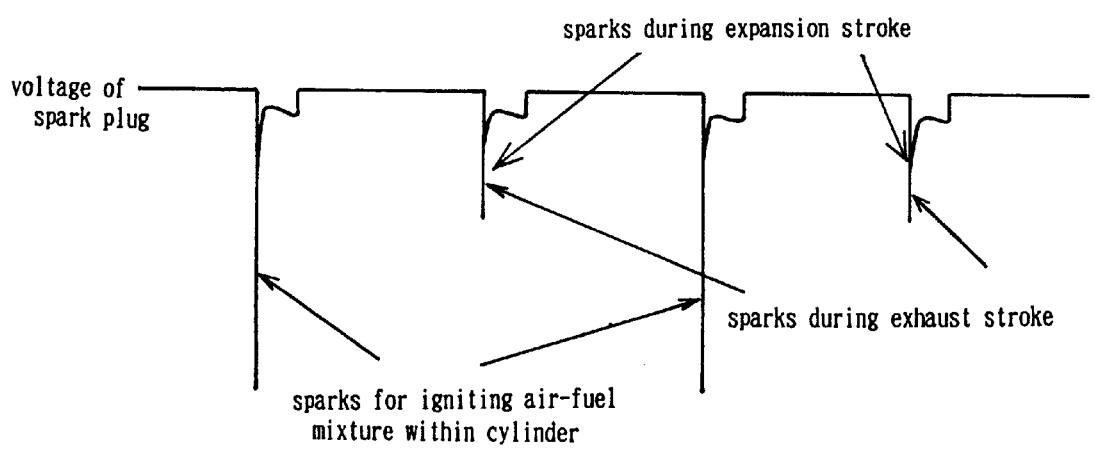
FIG. 32 is a graphical representation showing a timing of voltage across a spark plug applied by an ignition device when the engine is in a cold state.

In this instance, when commanded to establish the spark-wasted ignition by the ignition distinction device 41d, the ignition signal is generated to the corresponding cylinders in which the ineffectually wasted spark discharges are produced at the expansion stroke and exhaust stroke as shown in FIG. 32. With the result of the spark-wasted ignition (ineffectually wasted spark discharges) thus produced, it is possible to facilitate the self-cleaning action so as to dissolve the unfavorable starting when the engine is in the cold state.

In the fuel injection pulse width/injection initiating timing calculation·predeterminative device 41e, the fuel injection pulse width (Ti) and the injection initiating timing are calculated in each of the cylinders. The injection pulse width (Ti) is predetermined by adjusting a starting-time fuel injection quantity (GFst) or having-started fuel injection quantity (GF) with an ineffectual injection time (Ts) and a fuel pressure coefficient (Ks) calculated based on the fuel pressure (Ps) detected by the fuel pressure sensor 32. The fuel injection pulse width/injection initiating timing calculation-predeterminative device 41e serves as a fuel injection control means.

The starting-time fuel injection quantity (GFst) is predetermined based on the cooling water temperature (Tb) detected by the water temperature detector device 41a, and the post-starting fuel injection quantity (GF) is predetermined based on the revolution (N) of the engine and the pressure (α) of the air-intake manifold 10 detected by the air-intake pressure sensor 17, so as to set (GFst) and (GF) in the fuel injection timer of the corresponding cylinders in which the air-fuel mixture is to be ignited.

At the time of starting the engine, the fuel injection pulse width (Ti) is fed to an injector circuit 55a of the drive circuit 55 with θ 3 pulse as a trigger pulse.

In this situation, it is possible to insure an optimal fuel injection timing in proportion to the load imposed on the engine by rendering the injection timing variable in accordance with the fuel injection quantity (GF) which is arranged herein to correspond to the load imposed on the engine. Upon operating the engine with a low load, the compression stroke injection is adopted (laminar combustion). The air-intake-compression stroke injection is adopted when running the engine with a middle load, and the air-intake stroke injection is adopted when running the engine with a high load (uniformly mixed combustion).

With respect to the present fuel injection system adopted herein, the air-intake stroke injection system enables us to inject the fuel through the air-intake stroke so as to ignite the uniformly mixed air-fuel mixture within the cylinder. This system is suitable for operating the engine with the high load because the aerial component is effectively utilized.

Figure 21:
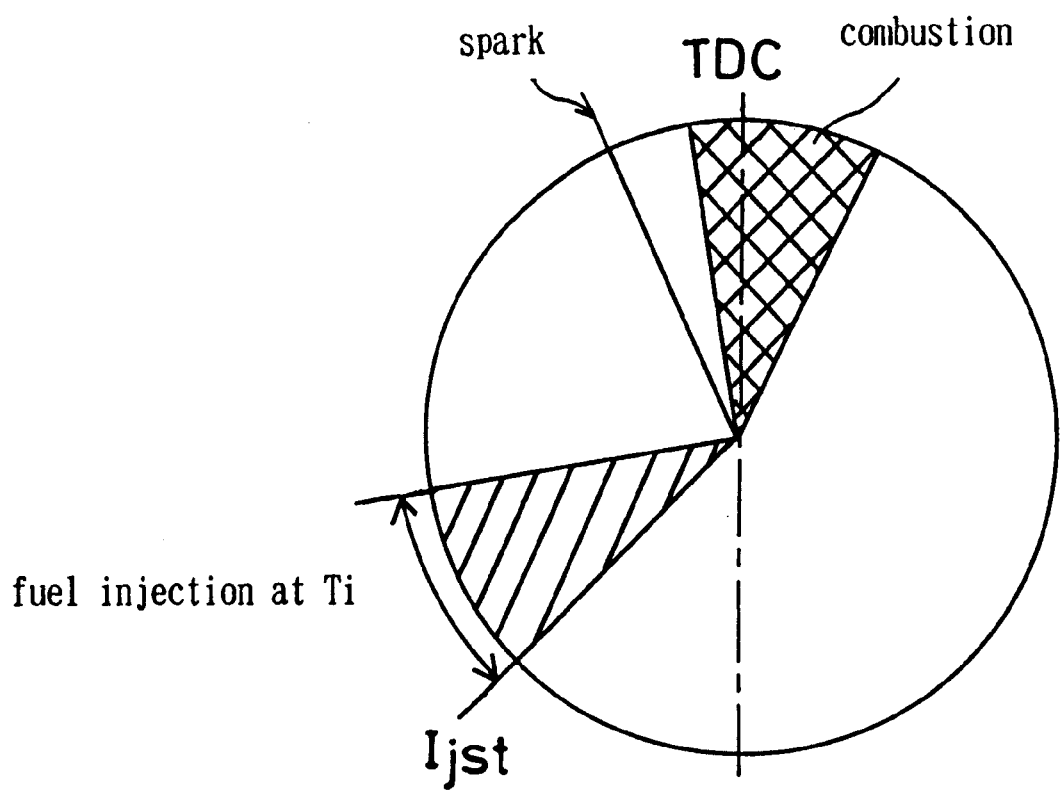
FIG. 21 is a diagram showing an ignition timing and fuel injection timing based on an air-intake stroke injection system.

With reference to FIG. 21 which depicts a fuel ignition v.s. ignition timing diagram, it is described as to how the air-fuel mixture is formed and burned in the air-intake stroke injection system.

Firstly, the injection initiating timing (Ijst in FIG. 21) is predetermined at an earlier time period after the exhaust valve 12b is closed. The earlier is the injection initiating timing, the more is it convenient for igniting the air-fuel mixture. However, it is necessary that the injection initiating timing is predetermined at least after the exhaust valve 12b is closed when taking into consideration that the fuel would be leaked outside if the fuel injection is initiated before the exhaust valve 12b is closed.

Then, with the upward movement of the piston 4, it is possible to uniformly mix the aerial component with the fuel component and ignite the air-fuel mixture at the predetermined ignition timing. This makes it possible to burn the air-fuel mixture in a manner in which flames are disseminated across the combustion chamber 5.

While, in the compression stroke injection system, the fuel injection starts through the compression stroke, and finishes the fuel injection procedure immediately before igniting the air-fuel mixture so as to burn the rear marginal surface area of the vaporized fuel. This system uses the aerial component only staying around the vaporized fuel. For this reason, it is possible to insure a stable combustion with an extremely low amount of the fuel as compared to the amount of the aerial component initially loaded into the combustion chamber. This is the reason that the compression stroke injection system is suitable when running the engine with the low load.

Figure 22:
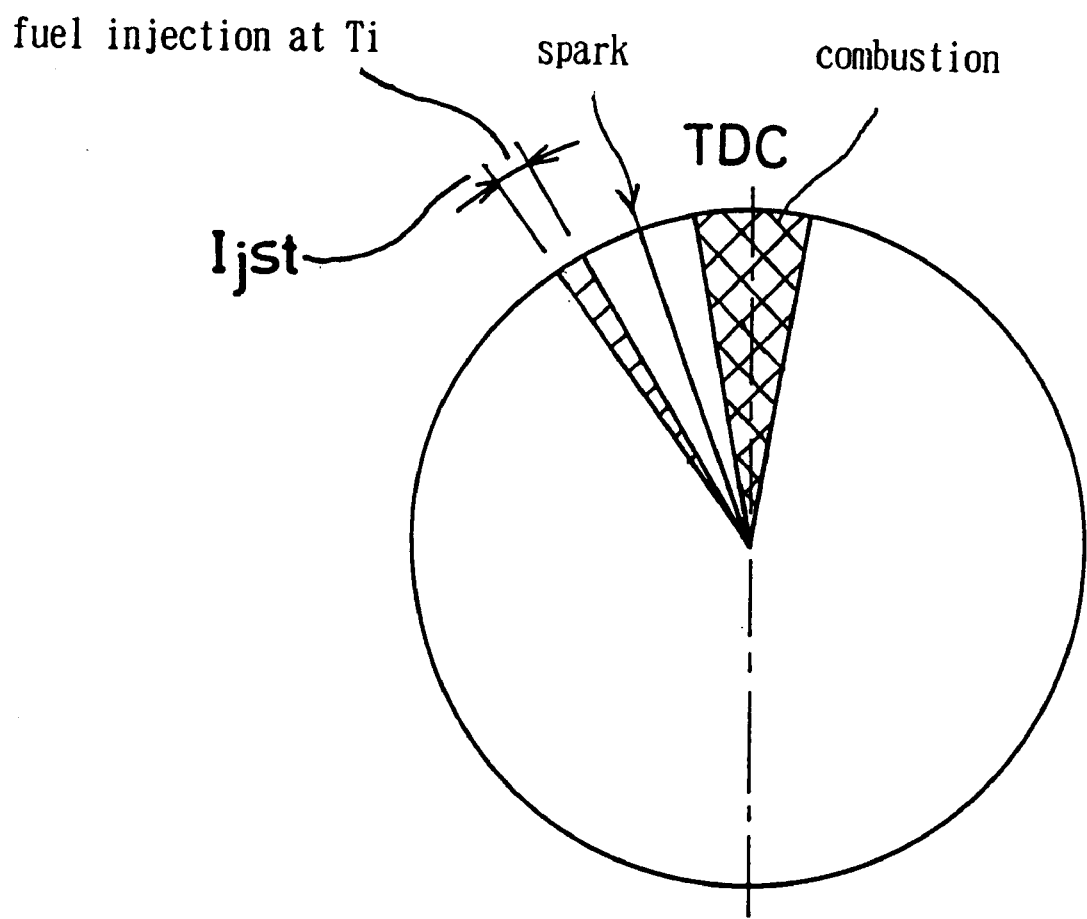
FIG. 22 is a diagram showing an ignition timing and fuel injection timing based on a compression stroke injection system.

With reference to FIG. 22 which depicts a fuel ignition v.s. ignition timing diagram, it is described as to how the air-fuel mixture is formed and burned in the compression stroke injection system.

In the first place, the injection initiating timing (Ijst) is predetermined so that the fuel injection finishes immediately before the ignition. During the injection procedure, the injected fuel introduces the aerial component into the fuel to form a thickly concentrated air-fuel mixture in the proximity of the spark plug 7 while forming a thin air-fuel mixture therearound in a laminar manner. Upon igniting the thickly concentrated air-fuel mixture, the flames disseminated across the combustion chamber so that the thin air-fuel mixture is burned around the thickly concentrated air-fuel mixture.

As regards the air-intake-compression stroke injection system, a thickly concentrated air-fuel mixture is formed in the proximity of the spark plug 7 while admixing the fuel component with the aerial component in some degree by separately injecting the fuel twice through the air-intake stroke and the compression stroke. By igniting the thickly concentrated air-fuel mixture, it makes sure to positively burn the air-fuel mixture to utilize the aerial component more than the laminar combustion system does. This is a reason why the air-intake-compression stroke injection system is suitable for the middle load operation.

In the ignition timing/energization time calculation-predeterminative device 41f, the ignition timing and the energization period length are calculated in each of the cylinders at the time of starting the engine and after starting the engine.

The starting-time ignition timing is calculated by adding the predetermined ignition time period to the fuel injection pulse width with the θ 3 pulse as the reference cam angle.

The having-started ignition timing is predetermined in each fuel injection system based on the revolution (N) of the engine and the fuel injection quality (GF). This ignition timing is set not only in the ignition timer of the cylinder undergoing the compression stroke (referred to as "combustion-oriented cylinder" hereinafter) in which the air-fuel mixture is ignited with the θ 2 pulse as the reference cam angle, as well as the ignition timer of the cylinder undergoing the expansion and exhaust stroke (referred to as "spark-oriented cylinder including the "combustion-oriented cylinder" hereinafter) in which ignition is implemented to facilitate the self-cleaning action.

The energization time period length is predetermined based on the voltage level Vb of the battery cell. Upon detecting the θ 1 pulse, the dwell initiating timing timer starts, and thereafter the ignition timing timer starts upon detecting the θ 3 pulse.

As a result, during the time period length from the termination of the dwell initiating timing timer to the expiration of the ignition timing timer, the ignition signal is fed to the igniter 6b via the ignition output transistor circuit 45a of the I/O interface 45, so as to energize the primary coil of the ignition coil 6a in the spark-oriented cylinder.

When the clock counting action of the ignition timing timer has ended, the spark discharges are induced in the spark plug 7 in the spark-oriented cylinder.

Upon detecting the θ 3 pulse after starting the engine, the dwell initiating timer starts its clock action, and thereafter, the ignition timing timer starts when the θ 2 pulse is detected.

As a result, during the time period length from the termination of the dwell initiating timing timer to the expiration of the ignition timing timer, the ignition signal is fed to the igniter 6b via the ignition output transistor circuit 45a of the I/O interface 45, so as to energize the primary coil of the ignition coil 6a in the spark-oriented cylinder.

When the counting clock action of the ignition timing timer has finished, the spark discharges are induced in the spark plug 7 in the spark-oriented cylinder.

Figure 33:
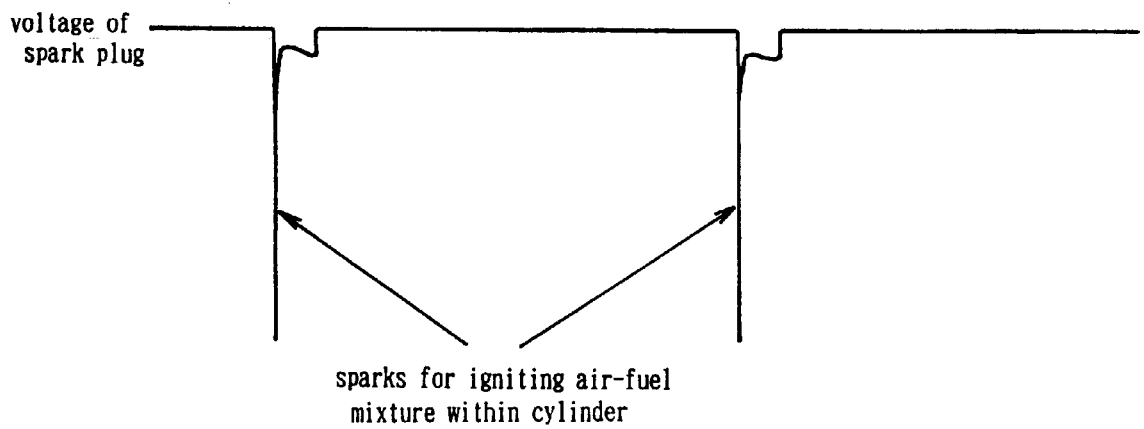
FIG. 33 is a graphical representation showing a timing of voltage across a spark plug applied by an ignition device when the engine is in a normal state.

Under the absence of commands to indicate the spark-wasted ignition from the ignition distinction device 41d, the clock action of the ignition timing timer is cancelled and no spark discharges are induced in the spark plug within the spark-wasted ignition-oriented cylinder (refer to FIG. 33).

In reference to flow charts of FIGS. 1~14, it is described as to how the fuel injection control and the ignition timing control are implemented by the engine control device 40. It is to be noted that each of the flow charts instructs at a predetermined timing after the ignition switch 50 is turned on. Upon turning on the ignition switch 50, all the flags and counted number values are cleared in the flow charts to return back to the initial state so as to initialize the system.

Figure 4:
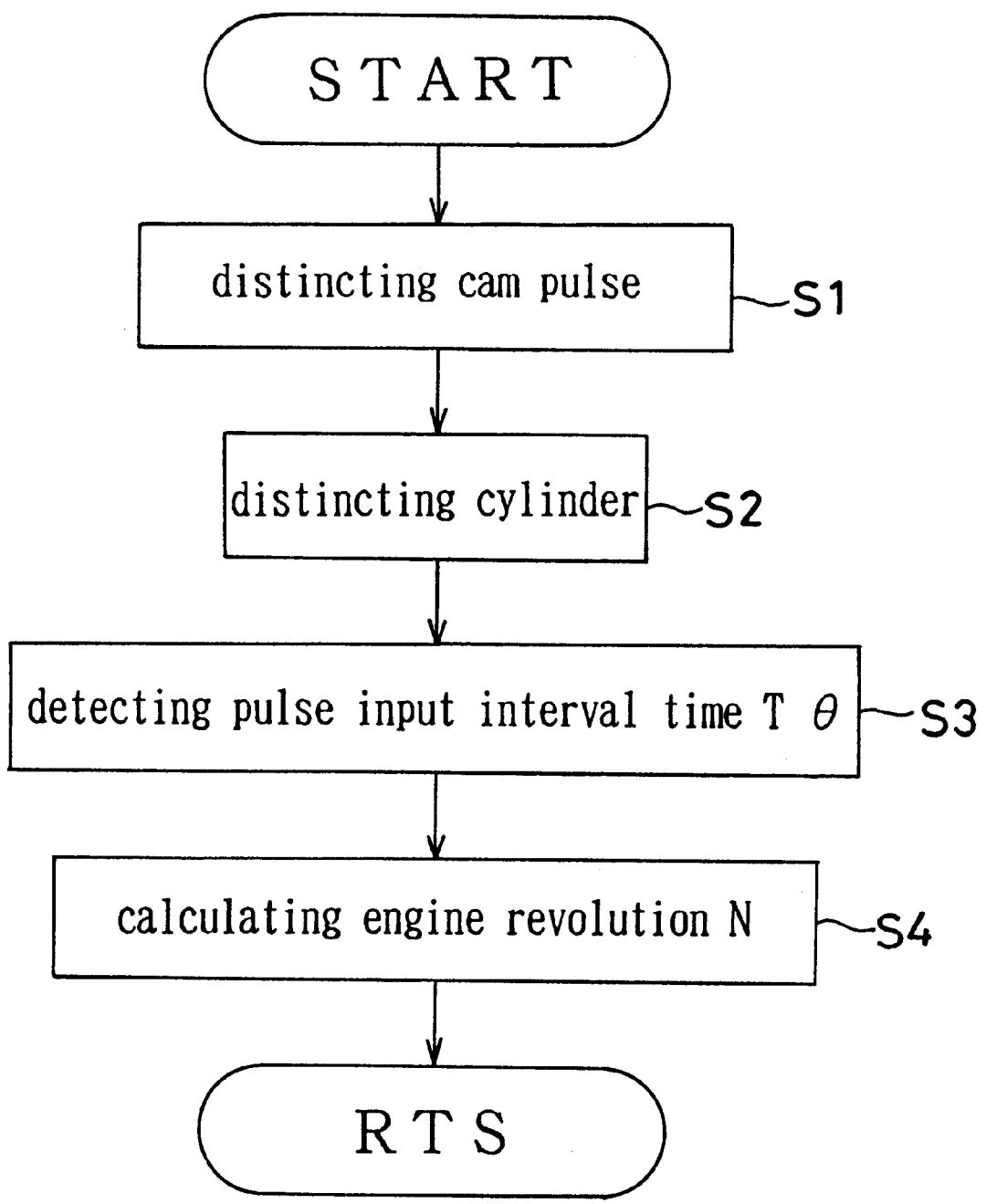
FIG. 4 is a flow chart showing a routine to determine a cylinder distinction and an engine revolution calculation procedure.

The flow chart of FIG. 4 is a routine of calculating the revolution (N) of the engine and interruptively drive the cylinder distinction function each time when the incoming cam pulse is recognized.

After turning on the ignition switch 50, the cam pulse is generated from the cam angle sensor 22a with the start of the engine. At step S1, the cam pulse incoming this time is judged whether it is any of the cam pulse $\theta$ 1~$\theta$ 3 based on a cylinder distinction pulse detection pattern generated from the cylinder distinction sensor 22b. At step S2, it is determined which cylinder F#i occupies the subsequent TDC (Top Dead Center) based on the cylinder distinction pulse detection pattern.

As shown at timing charts of FIGS. 23 and 24, the fuel injection and the ignition procedures are implemented in the order of #1→#4→#3→#2, and the cam pulse $\theta$ 4 is to be detected between the cam pulse $\theta$ 1 and the cam pulse $\theta$ 2 in which the cylinder #1 is yet short of the top dead center, and subsequently the cam pulse $\theta$ 5 is to be detected between the cam pulse $\theta$ 2 and the cam pulse $\theta$ 3. Further, the cam pulse $\theta$ 6 is to be detected between the cam pulse $\theta$ 1 and the cam pulse $\theta$ 2 in which the cylinder #3 is yet short of the top dead center.

Consequently, when the cylinder distinction pulse detection is absent at least between the cam pulse incoming before last and the last cam pulse, and when the cylinder distinction pulse broke in between the last cam pulse and the cam pulse incoming this time around, the incoming cam pulse this time is recognized to be the pulse $\theta$ 2.

When the cylinder distinction pulse detection is present between the cam pulse incoming before last and the last cam pulse, and when the cylinder distinction pulse is also present between the last cam pulse and the cam pulse incoming this time around, the incoming cam pulse this time is determined to be BTDC $\theta$ 3 pulse of the cylinder #1.

On the contrary, when the cylinder distinction pulse detection is present between the cam pulse incoming before last and the last cam pulse, and when the cylinder distinction pulse is absent between the last cam pulse and the cam pulse incoming this time around, the incoming cam pulse this time is determined to be BTDC $\theta$ 3 pulse of the cylinder #3.

With the result of the above recognition, the input of the pulse $\theta$ 3 makes it possible to specify the cylinder F#i which subsequently occupies the top dead center (TDC).

Thereafter, at step S3, a pulse input interval time length (T $\theta$) is detected which means a time taken until the cam pulse incoming this time is inputted after the last cam pulse had generated (refer to FIG. 24).

As shown in FIG. 19, when the teeth 21c is provided around the outer periphery of the cam rotor 21a it is possible to determine the pulse input interval time length (T $\theta$) in terms of real time.

Then, at step S4, the revolution (N) of the engine is determined based on the pulse input interval time length (T $\theta$) so as to go through the routine by storing it at a predetermined address of the RAM 43 in terms of revolution data.

Figure 1:
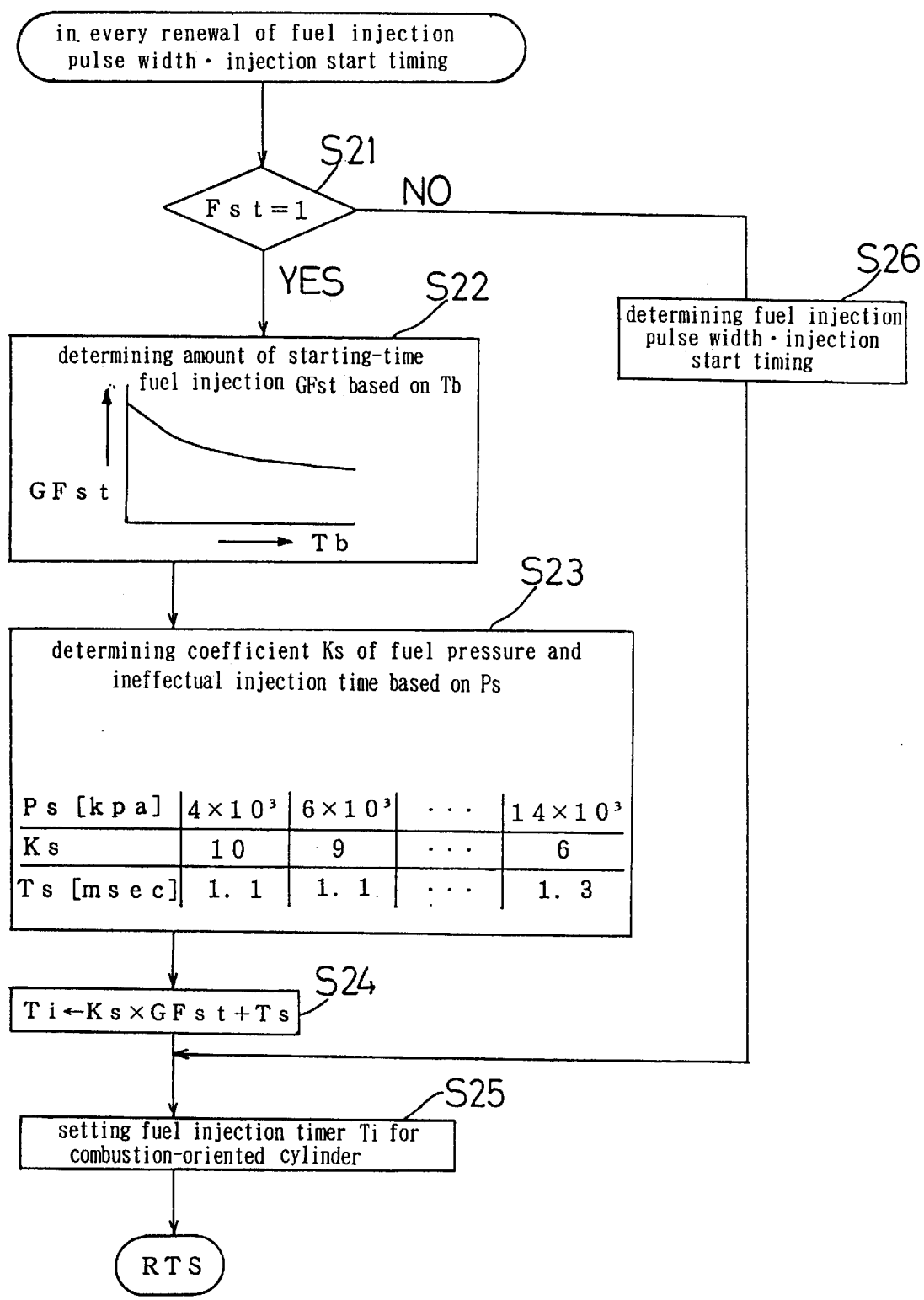
FIG. 1 is a flow chart showing a routine to determine a fuel injection pulse width and a fuel injection initiating timing according to a first embodiment of the invention.
Figure 5:
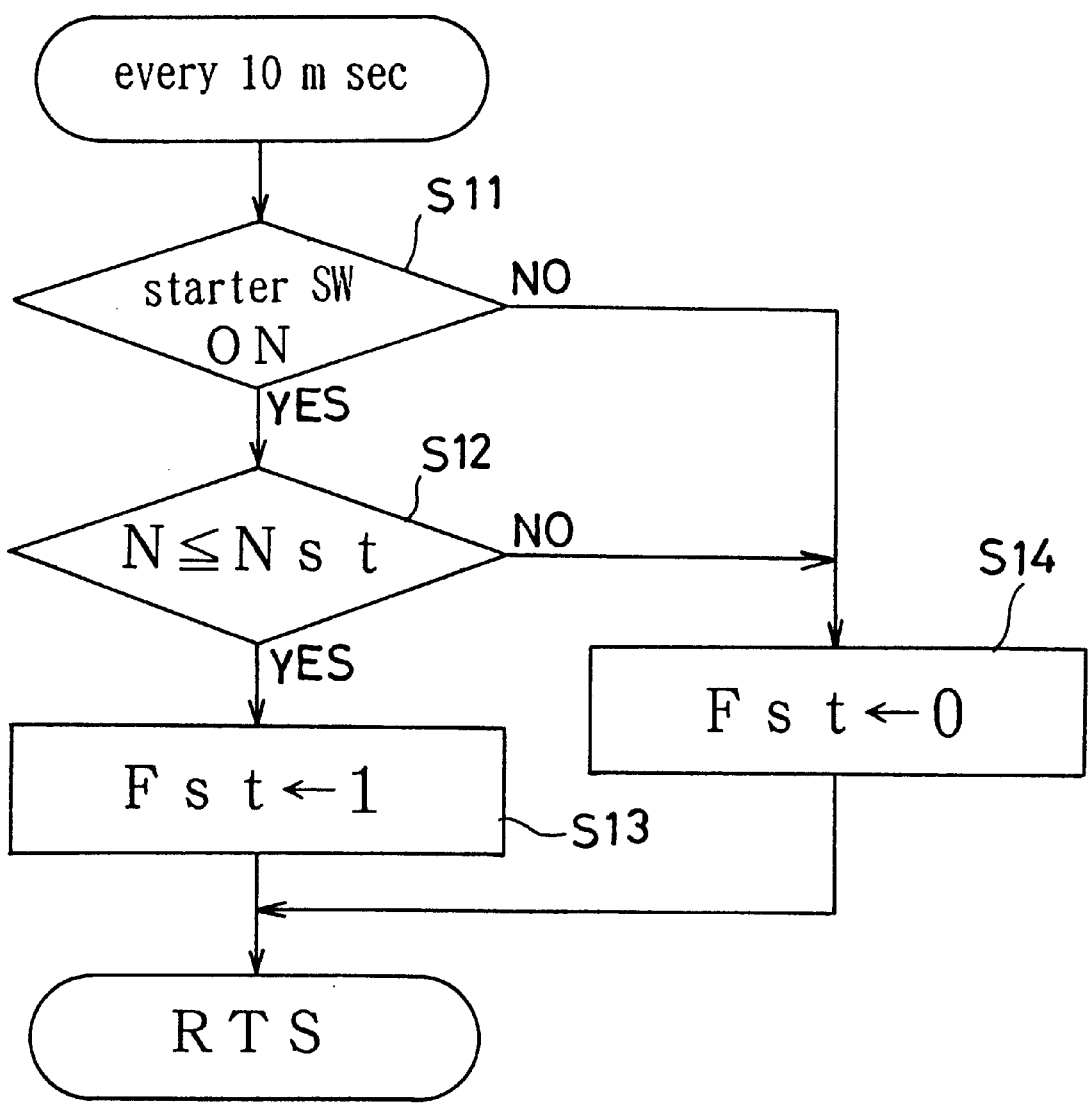
FIG. 5 is a flow chart showing a routine to set a start distinction determinant procedure.
Figure 7:
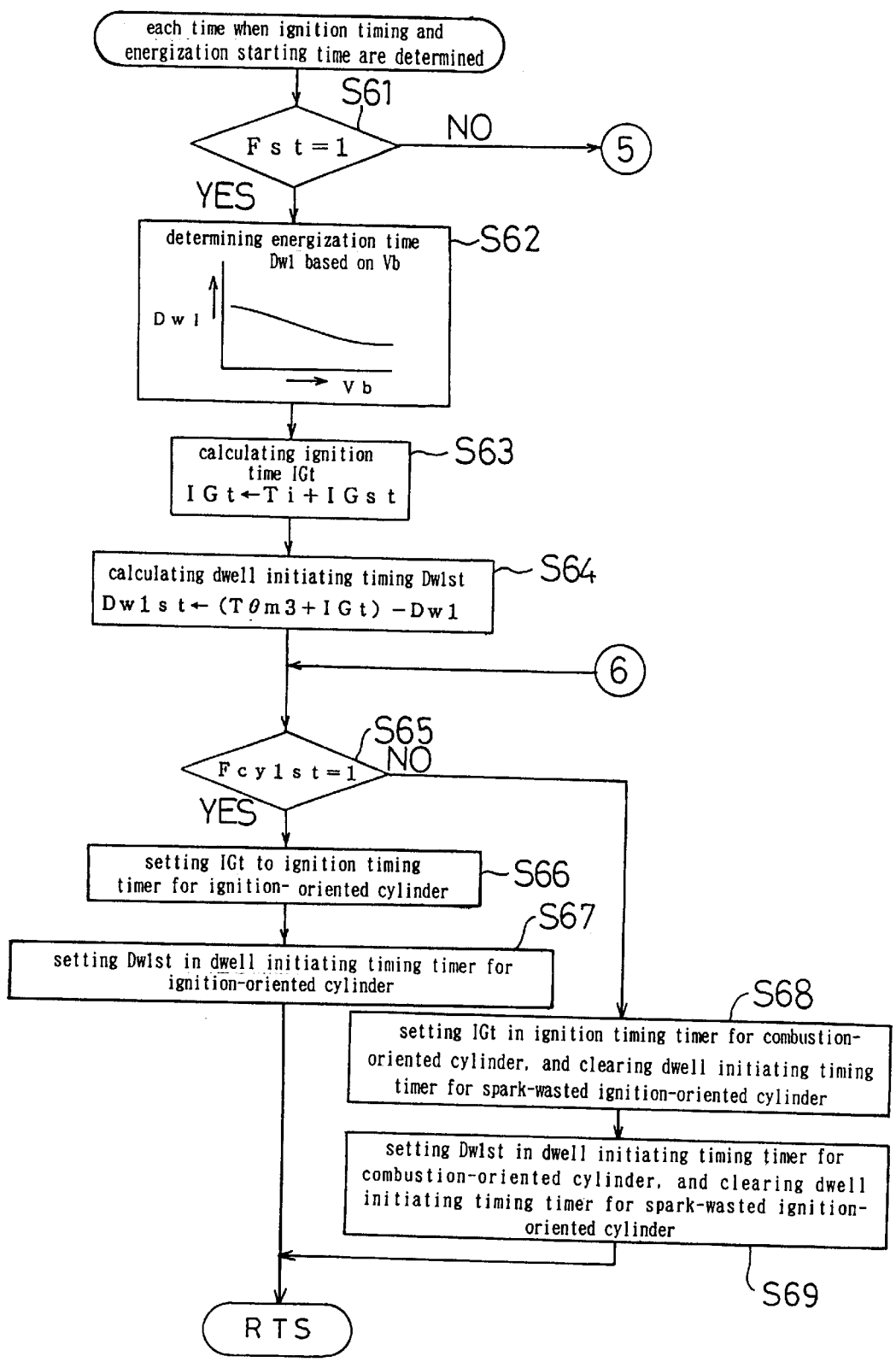
FIG. 7 is a flow chart showing a routine to determine an ignition timing and energization starting time.

The revolution data is read at a routine which works in every 10 msec as described hereinafter to judge whether the engine is in the starting state as shown in FIG. 5, and the revolution data is also read at a routine which works in every cam pulse $\theta$ 2 to determine the fuel injection pulse width and the fuel injection initiating timing as shown in FIG. 1. The revolution data is further read at a routine which works in every cam pulse $\theta$ 2 to determine the ignition timing and the energization initiating time as shown in FIG. 7.

In reference to a flow chart of FIG. 5, procedures are described below as regards the starting distinction routine.

The routine is interruptively driven in every 10 msec by the timer so as to determine whether the engine is in the starting state at steps S11 and S12. In more concrete terms, when it is recognized at step S11 that a starter switch 57 is turned on and it is judged at step S12 that the revolution (N) of the engine is below the starting distinction revolution Nst (e.g. 450 rpm), it is determined that the engine is in the starting state.

It is to be considered that the starting distinction may be judged either when the starter switch 57 is turned on or when the revolution (N) of the engine is below the starting distinction revolution (Nst). The starting distinction revolution (Nst) may be appropriately predetermined as required.

When moved to step S13 after recognized that the engine is in the starting state at steps S11 and S12, a starting distinction flag is set to go through the routine.

On the contrary, when it is judged at step S11 that the starter switch 57 is turned off or it is judged at step S12 that the revolution (N) of the engine is above the starting distinction revolution (Nst), it is recognized that the engine is in the having-started state. Moving then to step S14, the starting distinction flag (Fst) is cleared to go through the routine.

Figure 6:
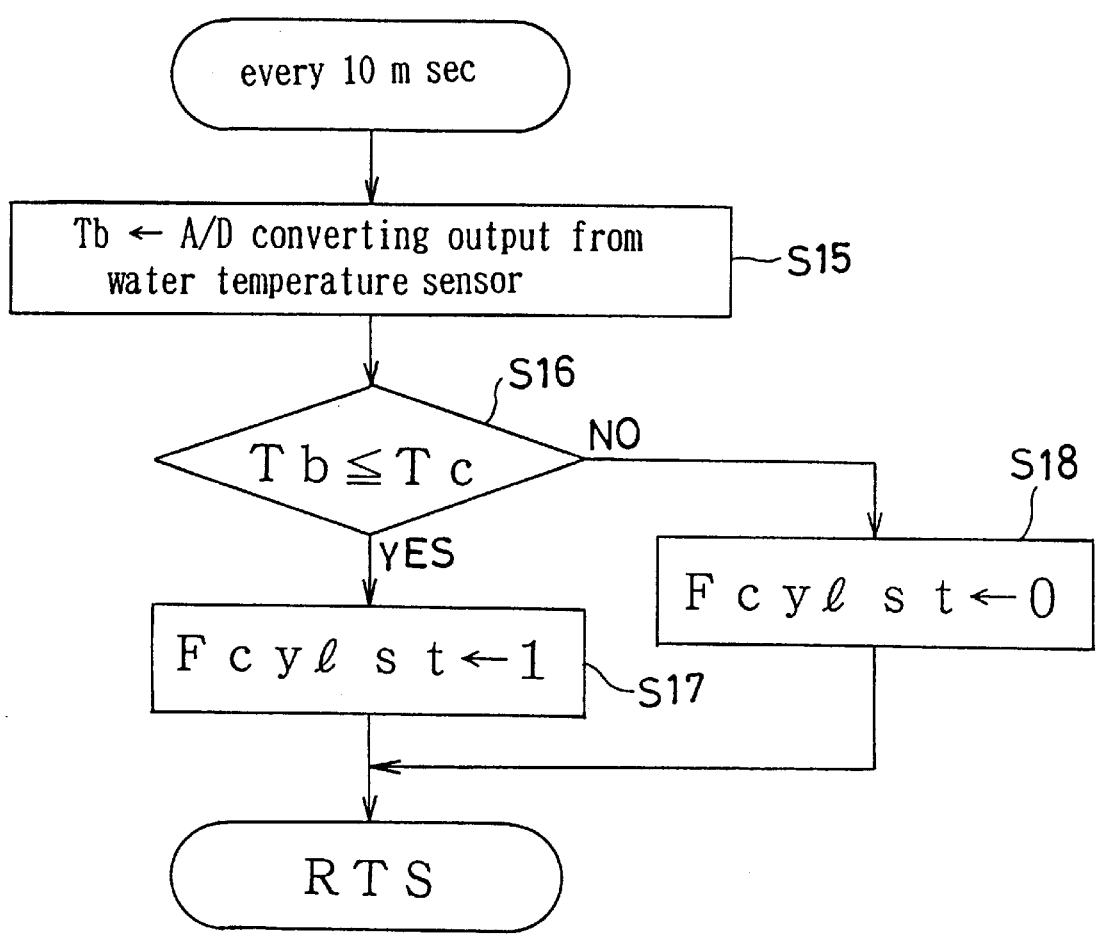
FIG. 6 is a flow chart showing a routine to determine an ineffectively wasted spark distinction procedure.

In reference to a flow chart of FIG. 6, a spark-wasted ignition distinction routine is interruptively driven in every 10 msec by a timer, and the output voltage of the water temperature sensor 9 is A/D converted at step S15 in order to read the cooling water temperature (Tb). It is to be observed that the voltage of the water temperature sensor 9 may be leveled off if necessary.

In subsequent step S16, the cooling water temperature (Tb) is compared with the predetermined threshold cooling water temperature (Tc) to judge that the requirement of establishing the spark-wasted ignition is met when the formula Tb≦Tc is satisfied. Advancing then to step S17 to set a flag (Fcylst) so as to go through the routine.

The threshold cooling water temperature (Tc) is an indicator to cancel increasing the fuel injection quantity after starting the engine. Below the temperature (Tc), it is recognized that the engine is in the cold state so that the fuel injection quantity is increased to stabilize the combustion within the chamber even when the piston is undergoing through the air-intake stroke.

In order to avoid the tendency that the spark plug 7 is likely to be smoldered with the increase of the fuel injection quantity, the threshold cooling water temperature (Tc=10°) which satisfies the requirement of establishing the spark-wasted ignition can be predetermined by design works and experimental test results.

It is to be noted that the spark-wasted ignition can be established more frequently with the rise of the threshold cooling water temperature (Tc) instead of using the fixed cooling water temperature (Tc) to determine whether or not the spark-wasted ignition is established.

In the previous step S16, when the cooling water temperature (Tb) is judged to be more than the threshold cooling water temperature (Tc), then move to step S18 to clear the flag (Fcylst) so as to go through the routine. It is to be noted that lubrication oil or intake air temperature may be used instead of the cooling water temperature to judge whether the engine is in the cold state or normal state.

When the starting distinction flag (Fst) is set, the starting control is implemented in accordance with the subsequent fuel injection pulse width·injection initiating timing determinative routine and ignition timing·energization initiating time determinative routine.

Figure 2:
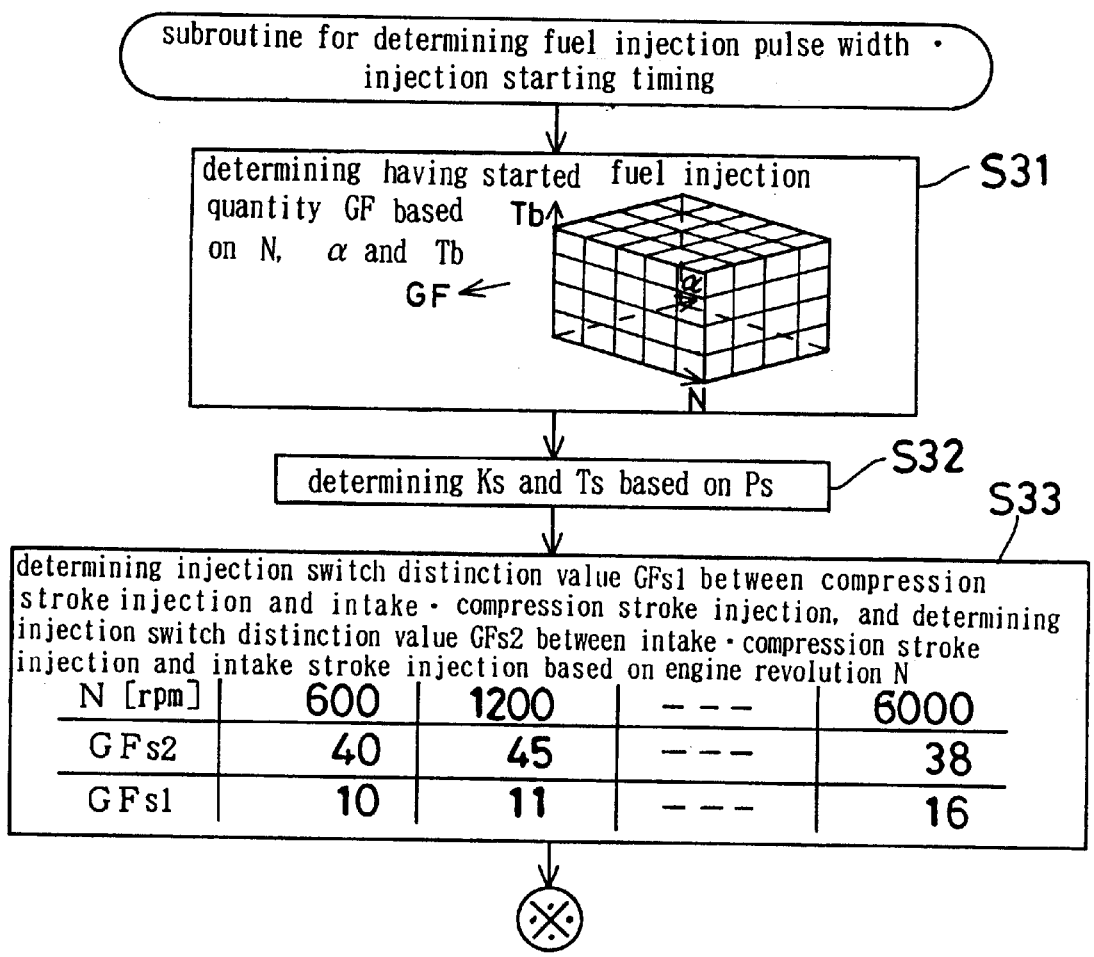
FIG. 2 is a flow chart showing a subroutine to determine the fuel injection pulse width and the fuel injection initiating timing.
Figure 3:
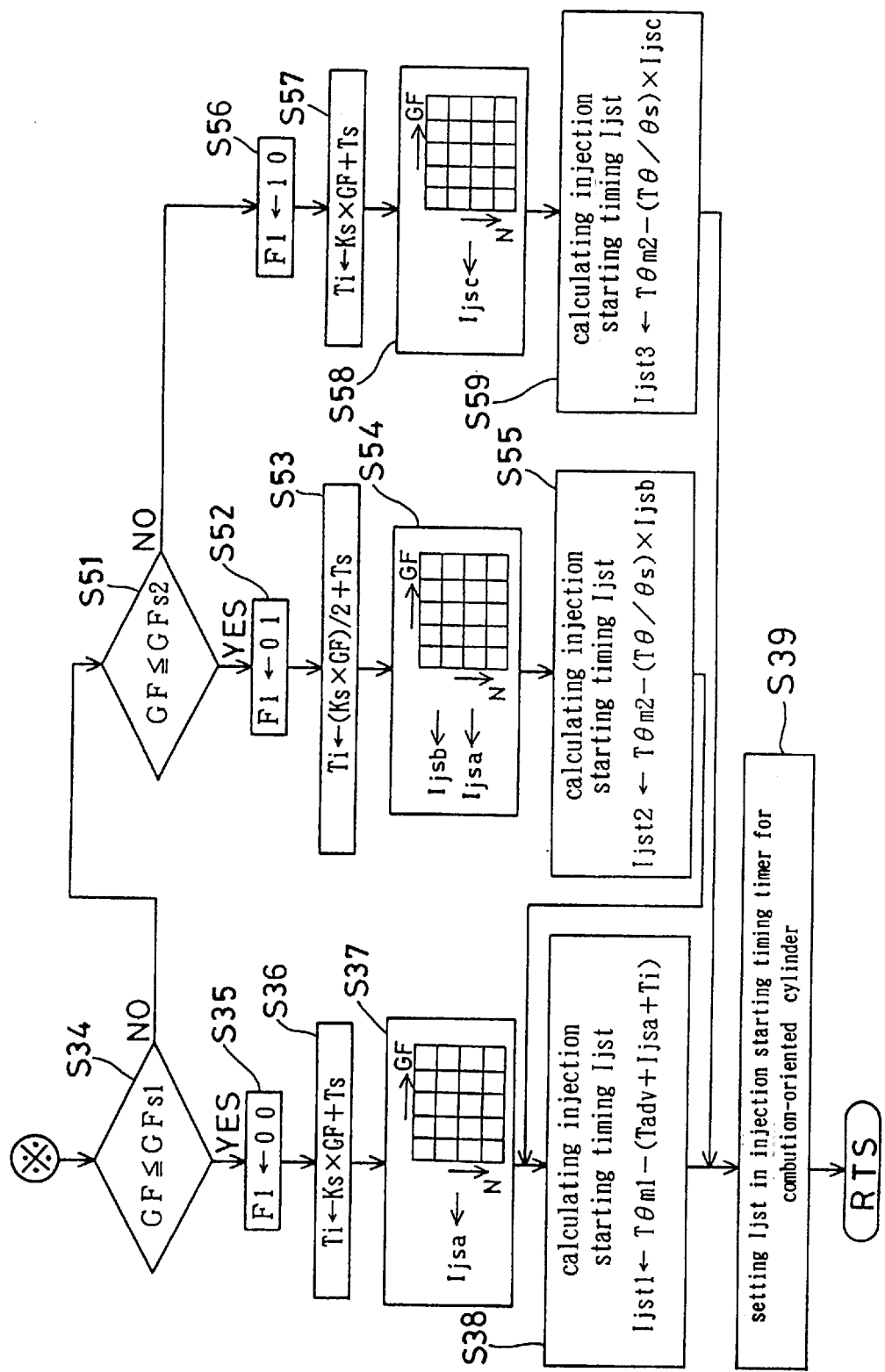
FIG. 3 is a flow chart showing a subroutine to determine the fuel injection pulse width and the fuel injection initiating timing referred to in combination with FIG. 2.
Figure 8:
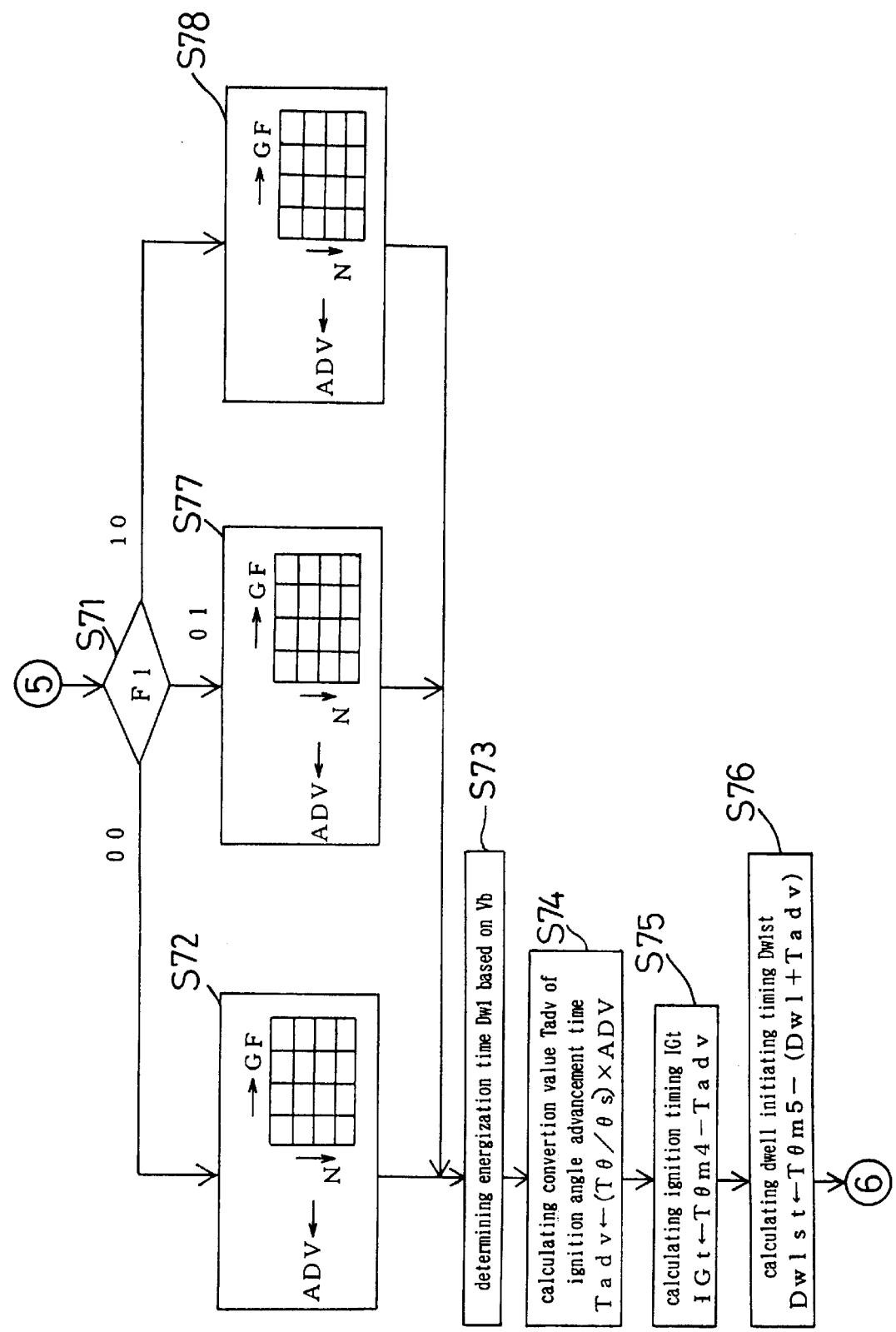
FIG. 8 is a flow chart showing a routine to determine the ignition timing and energization starting time referred to in combination with FIG. 7.

In reference to the flow charts in FIGS. 1~3, the fuel injection pulse width·injection initiating timing determinative routine is described and the ignition timing·energization initiating time determinative routine is described in reference to the flow charts of FIGS. 7 and 8.

These two routines are interruptively driven with an input of the cam pulse θ 2. In the two routines, the fuel injection pulse width·injection initiating timing and the ignition timing·energization initiating time are each determined for the cylinder F#i (i+2) two-rotation later than the cylinder F#i which is to occupy the top dead center (TDC).

As shown in the timing charts in FIGS. 23 and 24, suppose the the cylinder #3 is to occupy TDC and routines are each driven with the detection of the incoming pulse BTDC θ 2 to implement a calculation for the cylinder #1 on the assumption that the fuel injection and ignition are implemented in the order of #1→#4→#3→#2.

In step S21, it is judged whether the present engine is in the starting state or the having-started state in reference to values represented by the starting distinction flag (Fst).

The starting distinction flag (Fst) is predetermined by the starting distinction routine (FIG. 5) implemented in every 10 msec. When the starting distinction flag (Fst) judges that the engine is in the starting state at Fst=1, it is instructed to move to step S22 so as to implement the starting control. When the starting distinction flag (Fst) judges that the engine is in the starting state at Fst=0, it is instructed to advance to step S26 so as to implement the having-started control.

Now, below are description upon implementing a starting time control.

After moving from step S21 to step S22, the starting-time fuel injection quantity GFst(g) (in terms of gram) is determined based on the cooling water temperature (Tb) detected by the water temperature detector device 41a while referring to an interpolation attached table.

In the table, a series of addresses is listed, each domain of which stores the fuel injection quantity to chiefly insure the necessary starting performance in the cold state which has been predetermined by the experimental test results. As indicated within the blank region of steps,the starting-time fuel injection quantity (GFst) occupies high values with the drop of the cooling water temperature (Tb).

In so doing, once the starting-time fuel injection quantity (GFst) is determined in step S22, it is instructed to move to the subsequent step S23 in which the ineffective injection time (Ts msec) is determined by referring to the interpolation-attached table. This holds true in step S23 when determining the fuel pressure coefficient (Ks) based on the fuel pressure (Ps kpa) of the supply line 23b detected by the fuel pressure sensor 32. As indicated within the blank region of steps, the fuel pressure coefficient (Ks) and the ineffective injection time (Ts) are predetermined based on the design works and the experimental test results with the fuel pressure (Ps) as a matrix factor. The fuel pressure coefficient (Ks) signifies an injection characteristics of the injector 8 which changes depending on the fuel pressure (Ps), and amend the starting-time fuel injection quantity (GFst) in proportion to the fuel pressure (Ps) while converting the starting-time fuel injection quantity GFst(g) (in terms of gram) to a time period length unit.

The ineffective injection time (Ts) compensates for an operative delay of the injector 8 which changes in accordance with the fuel pressure (Ps).

When advanced to step S24, the starting-time fuel injection quantity GFst(g) (in terms of gram) is multiplied by the fuel pressure coefficient (Ks) to convert the unit to the time period length. Added to the multiplied value is the ineffective injection time (Ts) to calculate the fuel injection pulse width (Ti) which determines the injection time length duration when starting the engine.

When moved to step S25, the fuel injection pulse width (Ti) calculated in step S24 is set in the fuel injection timer of the spark-oriented cylinder so as to go through the routine. The fuel injection timer set in step S25 starts in accordance with the routine in every cam pulse θ 3 as described in detail hereinafter at a flow chart in FIG. 11.

Once started the engine, the starting distinction flag (Fst) is cleared in step S14 which implements the starting distinction routine in accordance with the flow chart of FIG. 5. Then, it is instructed to move from step S21 to step S26 to implement the having-started control in the fuel injection pulse width·injection initiating timing determinative routine. In step S26, it is instructed to implement the having-started fuel injection pulse width·injection initiating timing determinative subroutine which is in accordance with the flow charts of FIGS. 2 and 3.

When moved to step S31 in FIG. 2, the fuel injection quantity (GF) is determined based on the pressure (α) of the suction pipe detected by the air-intake pressure sensor 17, the revolution (N) of the engine and the cooling water temperature (Tb) while referring to the interpolation-attached table represented by the blank region of the steps.

It is to be observed herein that the table contains the optimal fuel injection quantity (GF) in accordance with the pressure (α) and the revolution (N) of the engine obtained by the design works and the experimental rest results.

When advanced to step S32, determined are the ineffective injection time (Ts) and the fuel pressure coefficient (Ks) based on the fuel pressure (Ps) of the supply line 23b detected by the fuel pressure sensor 32.

Upon determining the ineffective injection time (Ts) and the fuel pressure coefficient (Ks), it is referred to the interpolation-attached table in step S23 (FIG. 1).

In step S33, an injection switching determinative value (GFs1) which is shiftable between the compression stroke injection and the air-intake stroke·compression stroke injection is determined. And an injection switching determinative value (GFs2) which is shiftable between the air-intake stroke injection and the air-intake stroke·compression stroke injection is also determined.

Upon determining the injection switching determinative values (GFs1, GFs2), it is referred to the interpolation-attached table in step S33 (FIG. 2) which contains the values (GFs1, GFs2) derived from the design works and the experimental test results with the revolution (N rpm) of the engine as a matrix factor.

The injection switching determinative values (GFs1, GFs2) serve as reference value levels when shifting the combustion condition depending on the load imposed on the engine. In this instance, the load imposed on the engine is converted to the fuel injection quantity (GF), and the combustion condition is represented by the compression stroke injection system, the air-intake stroke injection system and the air-intake stroke·compression stroke injection system.

In so doing, when operating the engine with the high load (GF>GFs2), the air-intake stroke injection system is adopted (FIG. 21) and the air-intake stroke injection system is adopted (FIG. 22) when operating the engine with the middle load (GF1<GF≦GFs2), while adopting the compression strole injection system when operating the engine with the low load (GF≦GFs1).

After determining the injection switching determinative values (GFs1) and (GFs2) respectively in step S33, it is commanded to move to step S34 in which the fuel injection quantity (GF) (corresponding to the load on the engine) is compared with the injection switching determinative value (GFs1) for shifting from/to the compression stroke injection to/from the air-intake stroke·compression stroke injection.

By way of example, it is recognized in step S34 that the formula GF≦GFs1 is satisfied upon starting the engine because the earlier routine finds that the engine is running with the low load on the way to the idling operation. The formula GF≦GFs1 moves the routine to step S35 in which the injection system distinction flag (F1) is cleared to set it at (00).

The injection system distinction flag (F1) represented by two-bit data indicates the compression stroke injection system and the air-intake stroke injection system in turn by F1=00 and F1=10 while indicating the air-intake stroke·compression stroke injection by F1=01.

When the fuel injection system is set in the compression stroke injection system (F1=00) after starting the engine in step S35, it is commanded to move to step S36 in which the starting-time fuel injection quantity (GF) is multiplied by the fuel pressure coefficient (Ks) to convert the unit to the time period length. Added to the multiplied value is the ineffective injection time (Ts) to calculate the fuel injection pulse width (Ti) which determines the injection time length duration when starting the engine.

When advanced to step S37, while referring to the interpolation-attached table, the injection initiating angle Ijsa (corresponding to injection end timing (msec) in FIG. 24(b)) is determined based on the revolution (N) of the engine and the fuel injection quantity (GF) so as to recognize what preignition cam angle the cam occupies to finish the fuel injection. In order to obtain an optimal combustion condition by the compression stroke injection system, it is necessary to better manage an interval time length duration between the end of the fuel injection and the ignition procedure since it is important to form the thickly concentrated air-fuel mixture in the vicinity of the spark plug 7 at the time of ignition. Upon implementing the compression stroke injection, the injection initiating angle (Ijsa) is predetermined based on the experimental test results as shown in the interpolation-attached table with the fuel injection quantity (GF) and the revolution (N) of the engine as parameters.

In step S38, the injection initiating timing (Ijst) is calculated by the following expressions.

$$Ijst1 \leftarrow T\theta m1-(Tadv+Ijsa+Ti)$$

Where, T θ m1 means a time length taken from the input of the cam pulse until the injection·spark-oriented cylinder reaches the TDC, and the input of the cam pulse θ 1 is designed to serve as a reference cam angle as shown at the timing chart in FIG. 24. The above input of the cam pulse serves as a reference upon determining the fuel injection initiating timing.

When calculating the T θ m1 with the cam pulse θ 1 as the reference cam angle, it is obtained by the formula below.

$$T\theta m1=2.5 \times T\theta$$

Where T θ is calculated by the input interval time length of the newest incoming cam pulse, Tadv is a time-converted value of an ignition advancement angle calculated by an ignition timing energization initiating time determinative routine in FIGS. 7 and 8.

In step S39, the injection initiating timing (Ijst1) calculated in step S38 is set in the injection initiating timing timer of the combustion-oriented cylinder. Then, it is commanded to move back to step S25 (FIG. 1), the fuel injection pulse width (Ti) is set in the fuel injection timer for the corresponding cylinder so as to go through the routine.

Upon perceiving the relationship GF>GFs1 in step S34 by comparing the fuel injection quantity (GF) determined in the step S31 with the injection switching determinative value (GFs1) shiftable between the compression stroke injection and the air-intake stroke·compression stroke injection, it is instructed to advance to step S51 in which the fuel injection quantity (GF) is compared with the injection switching determinative value (GFs2) (determined in the step S33) shiftable between the air-intake stroke injection and the air-intake stroke·compression stroke injection.

For example, upon operating the engine with the middle load (GF≦GFs2) in which the load is not great just like when normally running the engine, it is instructed to move to step S52 in order to set the injection system distinction flag F1 (F1=01) at the air-intake stroke·compression stroke injection system. In step S53, the fuel injection quantity (GF) is multiplied by the fuel pressure coefficient (Ks) to convert the unit to the time period length. Added to the multiplied value is the ineffective injection time (Ts) to arithmetically produce the fuel injection pulse width (Ti) which determines the injection time length duration when starting the engine.

In step S54, the pre-TDC injection initiating angles Ijsa (° cam angle) and Ijsb (° cam angle) are determined respectively to recognize the fuel injection initiating timing based on the fuel injection quantity (GF) and the engine revolution (N) determined in step S31 while referring to the interpolation-attached table. It is to be observed that the pre-TDC injection initiating angle (Ijsb) is predetermined with the TDC of the combustion-oriented cylinder as a reference (FIG. 24(c)).

In step S55, the following formula is produced to determine the ignition initiating timing (Ijst2) of the air-intake stroke·compression stroke injection system which corresponds to the injection initiating angle Ijsb (° cam angle).

$$Ijst2 \leftarrow T\theta m2-(T\theta/\theta s) \times Ijsb$$

In the formula, T θ m2 means a time length taken from the input of the cam pulse until the injection·ignition-oriented cylinder reaches the TDC, and it is designed so that the input of the cam pulse θ 1 incoming from the directly preceding cylinder is a reference cam angle as shown at the timing chart in FIG. 23. The above-mentioned input of the cam pulse is a reference upon determining the fuel injection initiating timing.

When calculating the T θ m2 with the cam pulse θ 1 as the reference cam angle, it is obtained by the formula below.

$$T\ \theta\ m2 = 5.5 \times T\ \theta$$

In the formula, θ s is the cam pulse interval angle (30° cam angle). By using the formula (T θ/θ s)×Ijsb, it is possible to obtain the injection initiating timing (Ijst) with the input of the cam pulse θ 1 incoming from the directly preceding cylinder as the reference cam angle (FIG. 24(c)). This is done by calculating the injection initiating angle from a time length per 1° cam angle, the value of which is deducted from (T θ m2).

Returning to step S38, the injection initiating timing (Ijst1) is determined in the same manner as done in the compression stroke injection system.

In the step S39, the injection initiating timing (Ijst1, Ijst2) of the air-intake stroke·compression stroke injection system is set in the injection initiating timer of the combustion-oriented cylinder. Thereafter, returning to step S25 (FIG. 1) again, the fuel injection pulse width (Ti) determined in step S53 is set in the fuel injection timer of the combustion-oriented cylinder so as to go through the routine.

Upon implementing the routine when operating the engine at transitionary acceleration period, the fuel injection quantity (GF) determined in step S31 is compared to the injection switching determinative value (GFs2) determined in step S33 to recognize the high load operation (GF>GFs2) so as to move to step S56. In step S56, the combustion system distinction flag (F1) is set in the uniformly mixed combustion system (F1=10) to advance to step S57 in which the fuel injection quantity (GF) is multiplied by the fuel pressure coefficient (Ks) to convert the unit to the time period length. Added to the multiplied value is the ineffective injection time (Ts) to arithmetically produce the fuel injection pulse width (Ti) which determines the injection time length duration when starting the engine.

In the step S58, the pre-TDC injection initiating angle Ijsc (° cam angle) is determined to recognize the fuel injection initiating timing calculated based on the fuel injection quantity (GF) and the engine revolution (N) in step S31 while referring to the interpolation-attached table. In this instance, the pre-TDC injection initiating angle (Ijsc) is predetermined with the TDC of the injection·spark-oriented cylinder as (FIG. 24(d)).

Upon implementing the air-intake stroke injection, it is desirable to complete the fuel injection at an earlier period when considering the advantage of sufficiently mixing the fuel component with the aerial component. It is, however, in reality to start the fuel injection at an earlier stage after closing the exhaust port 2b by monitoring the fuel injection initiating time in terms of cam angle when considering that if starting the fuel ignition prematurely before closing the exhaust port 2b, the fuel leakage may occur through the port.

In step S59, the following formula is used to determine the ignition initiating timing (Ijst3) which corresponds to the ignition initiating angle Ijsc (° cam angle).

$$Ijst3 \leftarrow T\ \theta\ m2 - (T\ \theta/\theta\ s) \times Ijsc$$

In the formula, T θ m2 means a time length counted from the input of the cam pulse until the combustion-oriented cylinder reaches the TDC, and it is designed so that the input of the cam pulse θ 1 incoming from the directly preceding cylinder is a reference cam angle as shown at the timing chart in FIG. 24. The time length is obtained by the relation of T θ m2=5.5×T θ. Where θ s signifies the interval time length (30° cam angle).

With the formula (T θ/θ s)×Ijsc in mind, it is possible to obtain the injection initiating timing (Ijst3) with the input of the cam pulse θ 1 incoming from the directly preceding cylinder as the reference cam angle (FIG. 24(d)). This is tangibly done by calculating the injection initiating angle from a time length per 1° cam angle, the value of which is deducted from (T θ m2).

Reverting to step S39, the injection initiating timing (Ijst3) of the air-intake stroke injection system is set in the injection initiating timer of the combustion-oriented cylinder. Thereafter, returning again to step S25 (FIG. 1), the fuel injection pulse width (Ti) calculated in step S57 is set in the fuel injection timer of the combustion-oriented cylinder so as to go through the routine.

It is designed that the fuel injection initiating timing timer set in step 39 starts in accordance with the routine in every incoming cam pulse θ 1 as described in detail hereinafter in FIG. 9.

In reference to flow charts of FIG. 7 and 8, the ignition time·energization initiating time determinative routine is described below.

In step S61, it is judged whether the present condition of the engine is in the starting or having-started state in view of the starting distinction flag (Fst).

The starting distinction flag (Fst) is determined in accordance with the routine (FIG. 5) implemented in every 10 msec, and it is commanded to move to step S62 to implement the starting control when recognized that the engine is the starting state at Fst=1. Upon recognizing that the engine is in the having-started state at Fst=0, it is instructed to move to step S71 to implement the having-started control.

The starting control is first described, and then the having-started control is described below.

Upon shifting from step S61 to S62 when the engine is in the starting state, the energization time duration Dw1 (msec) is determined based on the voltage level (Vb) of the battery cell while referring to the interpolation-attached table. As observed from the blank region of the steps in the table, the the energization time duration Dw1 (msec) is predetermined to increase with the drop of the battery voltage level (Vb).

Once the energization time duration Dw1 (msec) is determined, it is instructed to move to step S63 to obtain the ignition timing (IGt) from the formula below.

$$IGt \leftarrow Ti + IGst.$$

In the formula, IGst means a predetermined time length (msec) counted from the end of the injection to the time of the ignition initiated (stored as ROM data). IGt decides what time (msec) the ignition is to be initiated after the end of the fuel injection with the cam pulse θ 3 as the reference cam angle.

As shown in FIG. 23(b), the time length (IGst) is calculated by adding the injection pulse width (Ti) to the predetermined time length (IGst) since the fuel injection starts with the cam pulse θ 3 as the reference cam angle in the starting fuel injection pulse width (Ti)

In the step S64, the dwell initiating timing (Dw1st) is determined by the formula below.

$$Dm1st \leftarrow (T\ \theta\ m3 + IGt) - Dw1$$

In the formula, T θ m3 means a time length counted from the input of the cam pulse which serves as a dwell initiating timing determinative reference to the input of the cam pulse which serves as an ignition time determinative reference.

As shown at the timing charts in FIG. 23(b), the cam pulse θ 1 is taken as a reference cam angle when determining the starting dwell initiating timing, and the cam pulse θ 3 is regarded as a reference cam angle when determining the ignition time determinative timing.

In step S65, the value of the spark-wasted ignition flag (Fcy1st) is referred to. The spark-wasted ignition flag (Fcy1st) is predetermined by the spark-wasted ignition flag distinction routine (FIG. 6) in which the requirement of the establishing the spark-wasted ignition is met when the cooling water temperature (Tb) is low at Fcy1st=1. Thereafter, the ignition timing (IGt) is set in the ignition time timer of the spark-oriented cylinder in the subsequent step S66. In the step S67, the dwell initiating timing (Dw1st) is set in the dwell initiating timing timer to go through the routine.

It is to be observed that the spark-wasted ignition may be established through either the expansion stroke or exhaust stroke instead of both the expansion and exhaust strokes.

It is to be further observed that the spark-wasted ignition can be established at a specified timing with the use of an individual signal, or otherwise at a specified timing several times during a single stroke instead of establishing the spark-wasted ignition in synchronization with the ignition timing in the spark-oriented cylinder.

It is to be still observed that since the thickly concentrated air-fuel mixture is injected generally when starting the engine, the spark-wasted ignition may be established regardless of the cooling water temperature instead of establishing the spark-wasted ignition depending on the cooling water temperature when starting the engine.

It is to be noted that the spark-wasted ignition-oriented cylinder may be identical to the combustion-oriented cylinder without distinguishing the former from the latter. In this instance, the command of establishing the spark-wasted ignition is directed to the common single cylinder.

While it is judged in step S65 that the cooling water temperature (Tb) is normal at Fcy1st=0, it is instructed to move to step S68 in which the ignition timing (IGt) is set in the ignition timing timer of only the combustion-oriented cylinder so as to clear the ignition timing timer for the spark-wasted ignition-oriented cylinder.

In step S69, the dwell initiating timing (Dw1st) is set in the dwell initiating timing timer of the combustion-oriented cylinder, and at the same time, clearing the dwell initiating timing timer of the spark-wasted ignition-oriented cylinder so as to go through the routine.

This is the case in which the ignition timing timer and the dwell initiating timing timer are not driven for the spark-wasted ignition-oriented cylinder, and consequently no spark-wasted ignition is established therefor.

The dwell initiating timing timer for the corresponding cylinder set in steps S67 or S69 starts with the pulse BTDC θ 1 as a reference cam angle. On the other hand, the ignition timing timer set in steps S66 or S68 starts with the pulse BTDC θ 3 as a reference cam angle as described in detail hereinafter.

When having started the engine, the starting distinction flag (Fst) is cleared in step S14 in which the starting distinction routine is implemented in accordance with the flow chart in FIG. 5. Then, moving the procedure from step S61 to step S71 in which the ignition timing·energization initiating time determinative routine is implemented.

Upon moving to step S71 after recognized that the engine is the having-started state in step S61, it is judged first what system the present fuel injection adopts while referring to the value of the fuel injection system distinction flag (F1). This is to determine the advancement angle ADV (° cam angle) in correspondence to the individual fuel injection systems.

The fuel injection system distinction flag (F1) is determined in accordance with the load imposed on the engine in the fuel injection pulse width·injection initiating timing determinative routine. The compression stroke injection system is represented by F1=00, the air-intake stroke injection system represented by F1=10, and the air-intake stroke·compression stroke injection system represented by F1=01.

When the present system is judged to be the compression stroke injection system represented by F1=00 in step S71, it is instructed to move to step S72 in which the advancement angle ADV (° cam angle) is determined based on the engine revolution (N) and the fuel injection quantity (GF) while referring to the interpolation-attached table. In addition to the table for storing the advancement angle (ADV) of the compression stroke injection system, the ROM 42 has a series of addresses to store the the advancement angle (ADV) predetermined from the experimental test results for the compression stroke injection system and the air-intake stroke·compression stroke injection system as described hereinafter.

After determining the advancement angle (ADV) of the compression stroke injection system in step S72 by referring to the interpolation-attached table, the energization time duration (Dw1) based on the battery voltage level (Vb) is determined in step S73 by referring to the interpolation-attached table. It is instructed to move to step S74 in which the advancement angle (ADV) is converted to the ignition advancement time reduction value (Tadv) in terms of time unit with the time length per 1° cam angle in mind.

$$Tadv \leftarrow (T\theta/\theta\ s) \times ADV$$

Where T θ:input interval time period length of newest incoming cam pulse,

θ s:angle between cam pulses (e.g., 30° cam angle).

Thereafter, upon moving to step S75, the ignition timing (IGt) is determined based on the ignition advancement time reduction value (Tadv) as follows:

$$IGt \leftarrow T\theta\ m4 - Tadv$$

In the formula, T θ m4 signifies a time length counted from the input of the cam pulse which serves as a reference to determine the ignition time (msec) until reaching the TDC of the spark-oriented cylinder. In this instance, the cam pulse is substituted by the pulse BTDC θ 2 of the spark-oriented cylinder. As shown at the timing chart in FIG. 23, the time length is obtained by the formula below.

$$T\theta\ m4 = 1.5 \times T\theta$$

In step 76, the dwell initiating timing (Dw1st) is obtained by the following expression.

$$Dw1st \leftarrow T\theta\ m5 - (Dw1 + Tadv)$$

Where T θ m5 means a time length counted from the incoming input of the cam pulse which serves as a dwell initiating timing determinative reference until reaching the TDC of the combustion-oriented cylinder. The above incoming input of the cam pulse means a pulse BTDC θ 3 of the cylinder preceding one from the combustion-oriented cylinder. As shown at the timing chart in FIG. 24, the time length (T θ m5) is obtained by the formula below.

$$T\theta\ m5 = 3.5 \times T\theta$$

Returning to step S65, when detected that the requirement of establishing the spark-wasted ignition is met because the cooling water temperature (Tb) is low at Fcy1st=1, it is instructed to move to step S66 in which the ignition timing (IGt) is set not only in the ignition timing timer of the corresponding cylinder in which the air-fuel mixture is to be ignited through the compression stroke, but also in the timer of the spark-oriented cylinders undergoing in turn through the expansion stroke and exhaust stroke to ignite to effectuate the self-cleaning action. Then, the dwell initiating timing (Dw1st) is set in the dwell initiating timing timer to go through the routine in step S67.

When judged that the cooling water temperature (Tb) is normal at Fcy1st=0, it is instructed to move to step S68 in which the ignition timing (IGt) is set in the ignition timing timer only for the combustion-oriented cylinder undergoing through the compression stroke.

In the step S69, the dwell initiating timing (Dw1st) is set in the dwell initiating timing timer for the combustion-oriented cylinder so as to go through the routine.

When moved to step S77 after judged that the present system is the air-intake stroke·compression stroke injection system represented by F1=01 in step S71, the advancement angle (ADV) at the time of ignition is determined based on the engine revolution (N) and the fuel injection quantity (GF) while referring to the interpolation-attached table in terms of the air-intake stroke·compression stroke injection.

Moving back to step S73, the calculations are implemented relating to the energization period length (Dw1), the ignition advancement time reduction value (Tadv), the ignition timing (IGt) and the dwell initiating timing (Dw1st) in the same manner as described hereinbefore.

Returning again to step S65, when the requirement is met at Fcy1st=1 by referring to the value of the spark-wasted ignition flag (Fcy1st), it is instructed to move to step S66 in which the ignition timing (IGt) is set in the ignition timing timer for the spark-oriented cylinder, and the dwell initiating timing (Dw1st) is set in the dwell initiating timing timer for the spark-oriented cylinder so as to go through the routine.

When judged that the cooling water temperature (Tb) is normal at Fcy1st=0, the ignition timing (IGt) is set in the ignition timing timer only for the combustion-oriented cylinder in the step S68 so as to clear the ignition timing timer for the spark-wasted spark-oriented cylinder.

In the subsequent step S69, the dwell initiating timing (Dw1st) is set in the dwell initiating timing timer for the combustion-oriented cylinder, and clearing the dwell initiating timing timer for the spark-wasted ignition-oriented cylinder so as to go through the routine.

When advanced to step S78 after judged that the present system is the air-intake stroke injection system represented by F1=10 in step S71, the advancement angle (ADV) at the time of ignition is determined based on the engine revolution (N) and the fuel injection quantity (GF) while referring to the interpolation-attached table in terms of the air-intake stroke injection.

Moving back again to step S73, the calculations are implemented in relation to the energization time duration (Dw1), the ignition advancement time reduction value (Tadv), the ignition timing (IGt) and the dwell initiating timing (Dw1st) in the same manner as described hereinbefore.

Returning further to step S65, when the requirement is met at Fcy1st=1 by referring to the value of the spark-wasted ignition flag (Fcy1st), it is instructed to move to step S66 in which the ignition timing (IGt) is set in the ignition timing timer for the spark-oriented cylinder while setting the dwell initiating timing (Dw1st) in the dwell initiating timing timer for the spark-oriented cylinder so as to go through the routine.

Upon recognizing the normal cooling water temperature (Tb) at Fcy1st=0, the ignition timing (IGt) is set in the ignition timing timer only for the combustion-oriented cylinder in the step S68 while clearing the ignition timing timer for the spark-wasted ignition-oriented cylinder. In the subsequent step S69, the dwell initiating timing (Dw1st) is set in the dwell initiating timing timer for the combustion-oriented cylinder, and clearing the dwell initiating timing timer for the spark-wasted ignition-oriented cylinder so as to go through the routine.

As described above, the having-started dwell initiating timing is triggered with the incoming cam pulse BTDC θ 3 of the cylinder preceding one from the present ignition-oriented cylinder as the reference cam angle. The ignition timing (IGt) starts with the incoming cam pulse BTDC θ 3 of the spark-oriented cylinder as the reference cam angle as observed at the timing charts in FIG. 24.

In reference to flow charts in FIGS. 9~14, the starting-time fuel injection control and ignition control are first described and then the having-started fuel injection control and the ignition control are described below.

Figure 9:
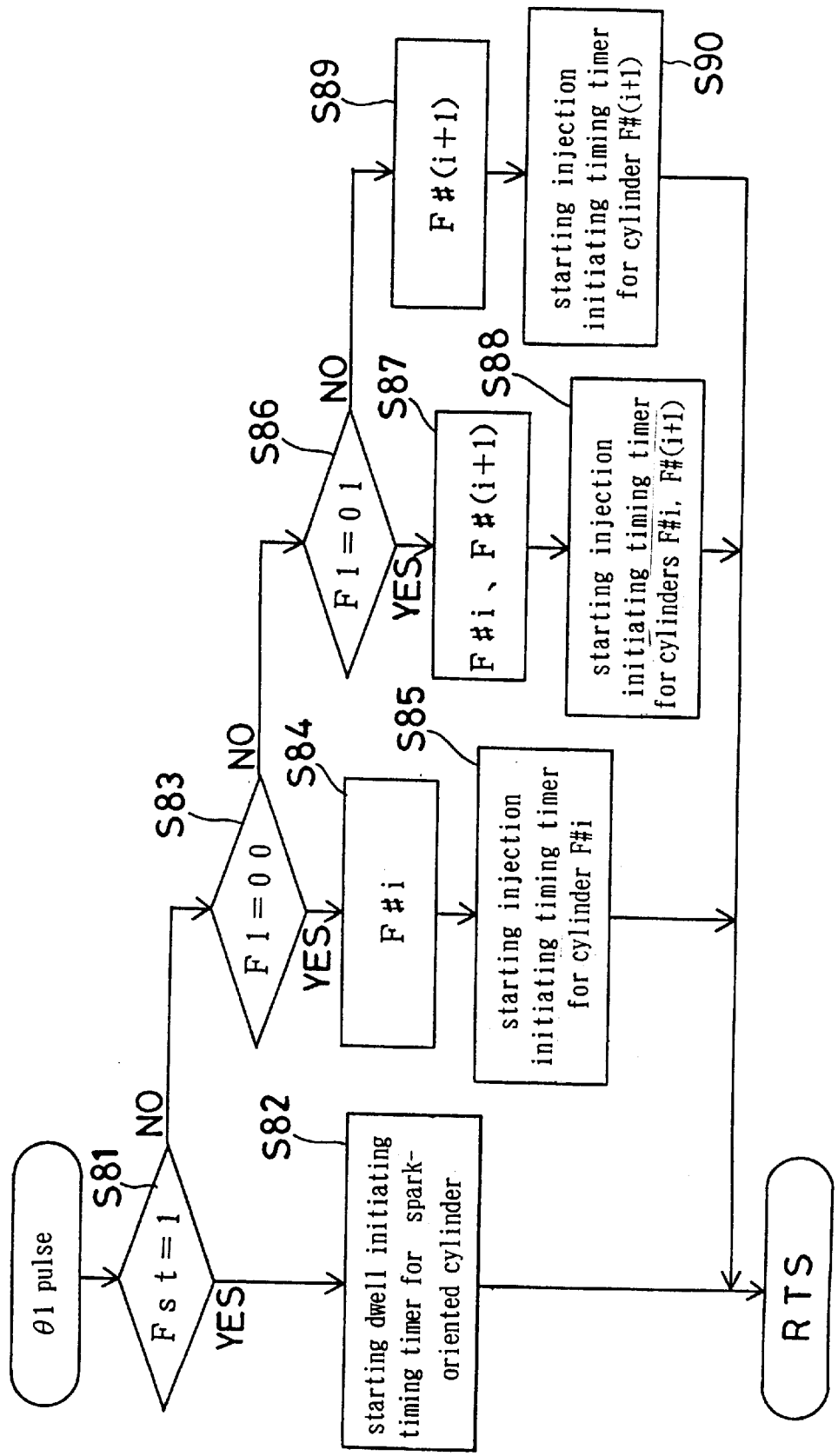
FIG. 9 is a flow chart showing a routine to start a starting-time dwell initiating timing timer and having-started fuel injection starting timing timer.

When the cam pulse θ 1 is inputted at the time of starting the engine, implemented is a starting-time dwell initiating timing timer·having-started injection initiating timer start routine in accordance with the flow chart in FIG. 9.

In step S81, it is judged whether or not the present engine is in the starting state by referring to the value of the starting distinction flag (Fst).

When the starting time relationship is recognized by the formula Fst=1, it is instructed to move to step S82 which starts the dwell initiating timing timer of the dwell initiating timing (Dw1st) for the spark-oriented cylinder so as to go through the routine. That is to say, the dwell initiating timing timer starts for the combustion-oriented cylinder and the spark-wasted ignition-oriented cylinder.

As a result, a clock counting action is initiated for the dwell initiating timing Dw1st (msec) previously set in the dwell initiating timing timer (FIG. 23(b)). When the clock counting action has ended, the dwell initiating timing routine (FIG. 13) is interruptively driven to go through the routine by setting the dwell cutting procedure for the present spark-oriented cylinder in step S111.

Figure 10:
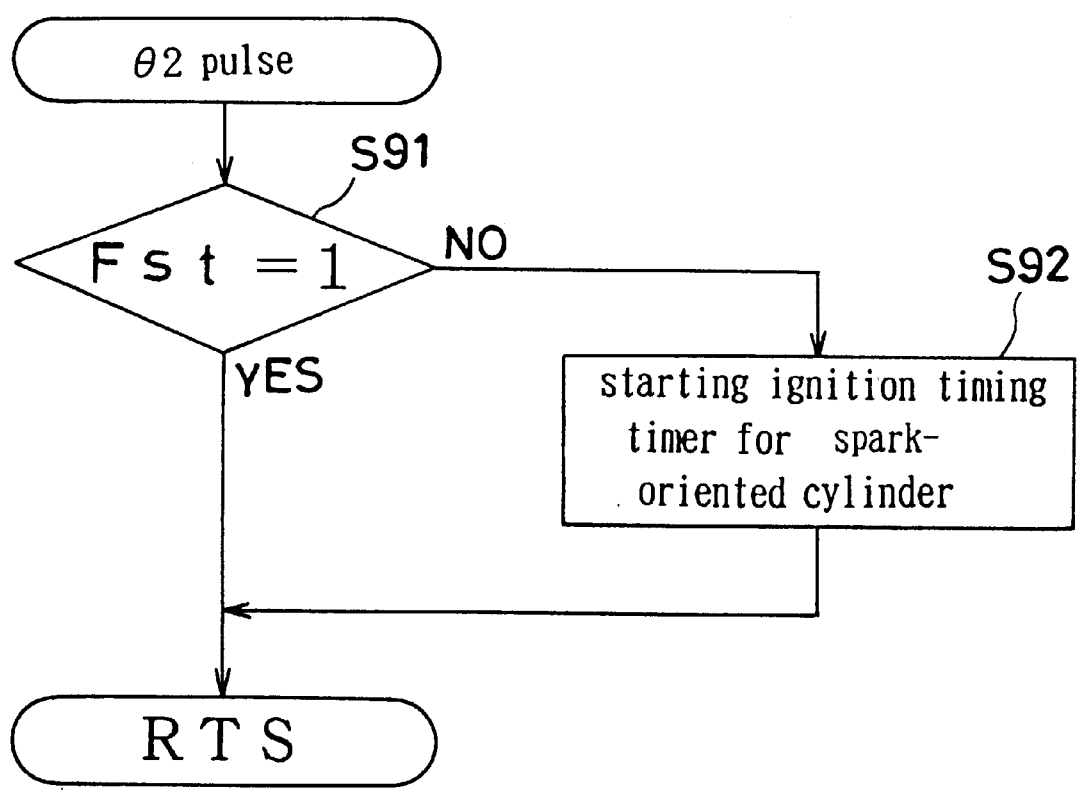
FIG. 10 is a flow chart showing a routine to start a having-started ignition timing timer.

With the input of the cam pulse θ 2, driven is the post-starting ignition timing timer initiating routine in accordance with the flow chart in FIG. 10.

Namely, in step S91, it is instructed to go through the routine when the present starting relationship Fst=1 is recognized by referring to the value of the starting distinction flag (Fst).

Figure 11:
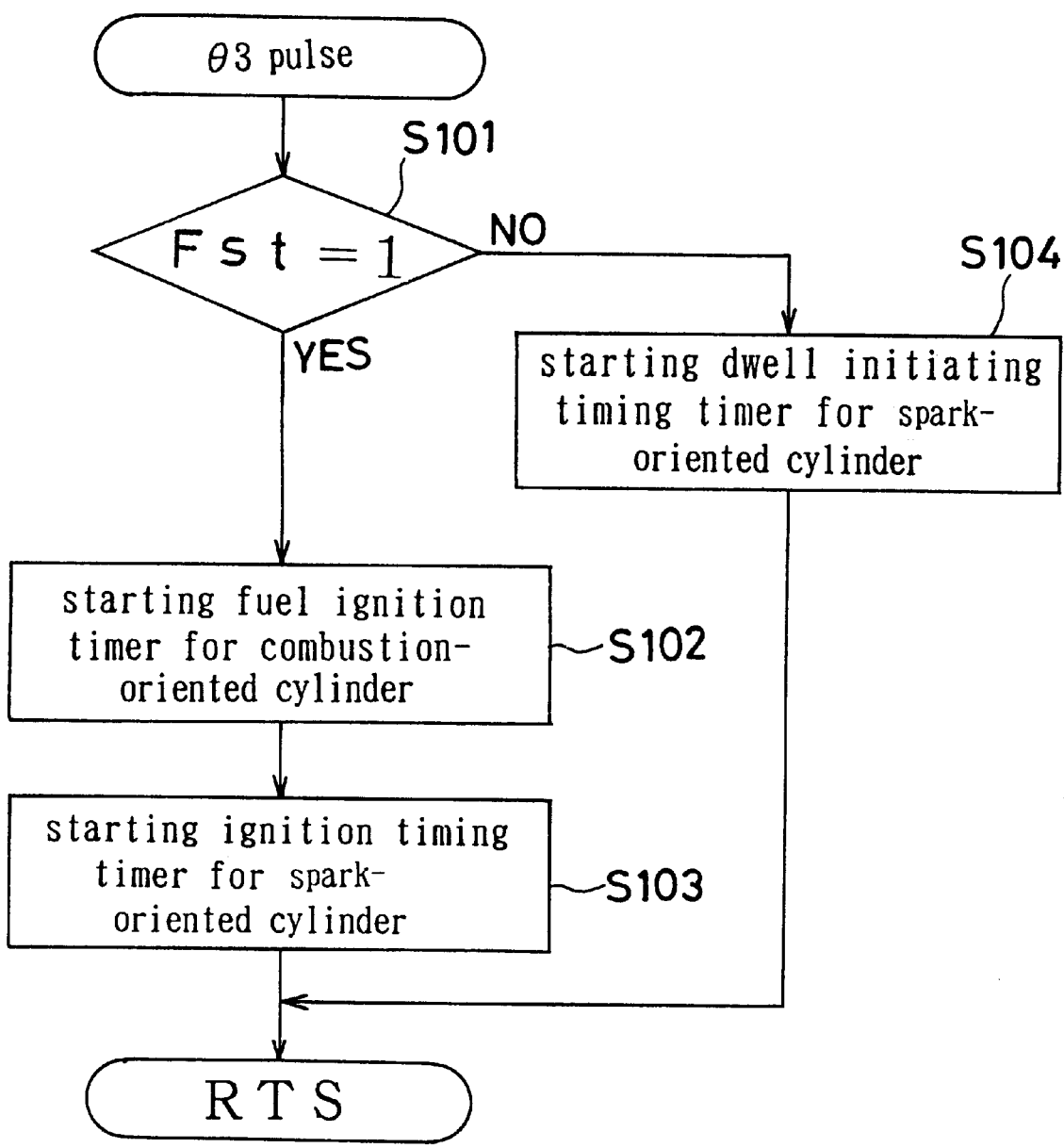
FIG. 11 is a flow chart showing a routine to start a starting-time fuel injection initiating timer, ignition timing timer and having-started dwell initiating timing timer.

When the cam pulse θ 3 is inputted, driven is the starting-time injection initiating timer and the ignition timing timer·having-started dwell initiating timing timer starting routine in accordance with the flow chart in FIG. 11. When the present starting relationship Fst=1 is recognized in step S101 by referring to the value of the starting distinction flag (Fst), it is instructed to advance two-step S102 which starts the starting-time fuel injection timer for the combustion-oriented cylinder.

Then, a clock counting action starts for the fuel injection pulse width (Ti) which has previously been set in the fuel injection timer (FIG. 23(b)) during which the injector 8 receives a jet signal to inject the predetermined amount of fuel into the corresponding cylinder.

Moving further to step S103, started is the ignition timing timer for the spark-oriented cylinder to go through the routine.

As a result, a clock counting action is initiated for the ignition timing IGt (msec) which has previously been set in the ignition timing timer (FIG. 23(*b*)). When the clock counting action has ended, the ignition timing routine (flow chart in FIG. 14) is interruptively driven. In step S121, the dwell cutting procedure is implemented for the spark-oriented cylinder to go through the routine.

As a result, ignition occurs for the combustion-oriented cylinder in which air-fuel mixture is ignited at the compression sroke, and for the cylinders undergoing the expansion and exhaust strokes so as to burningly remove the unfavorable smoldering by the facilitated self-cleaning action.

On the other hand, when the routine starts in accordance with the flow chart in FIG. 9 after receiving the cam pulse θ 1 after starting the engine, it is instructed to move to step S83 when recognized in step S81 that the engine is in the having-started state (Fst=0). In step S83, it is judged whether or not the present fuel injection system is the compression stroke injection system by referring to the value of the ignition system distinction flag (F1).

As shown at the timing charts in FIG. 24, the fuel injection initiating timing timer starts with the incoming cam pulse BTDC θ 1 of the combustion-oriented cylinder in the compression stroke injection system. And the fuel injection initiating timing timer starts with the incoming cam pulse BTDC θ 1 of the cylinder preceding one from the present combustion-oriented cylinder in the air-intake stroke injection system.

In the air-intake stroke·compression stroke injection, the fuel injection initiating timing timer starts with the incoming cam pulse BTDC θ 1 of the combustion-oriented cylinder and the incoming cam pulse BTDC θ 1 of the cylinder preceding one from the present cylinder.

In step S83, it is judged whether or not the presently adopting system is the compression stroke injection system by referring to the value of the injection system distinction flag (F1) so as to determine the combustion-oriented cylinder in which the injection initiating timing timer is to start.

When the compression stroke injection system is recognized by the relationship F1=00 in the step S83, it is instructed to move to step S84 which starts the injection initiating timing timer for the combustion-oriented cylinder F#i in the step S85 when it is recognized that the combustion-oriented cylinder is the cylinder F#i which is yet to occupy the TDC.

When it is judged that injection·spark-oriented cylinder is a cylinder #1, for example, in the compression stroke injection system, the injection initiating timing timer starts with the input of the cam pulse BTDC θ 1 of the cylinder #1.

Figure 12:
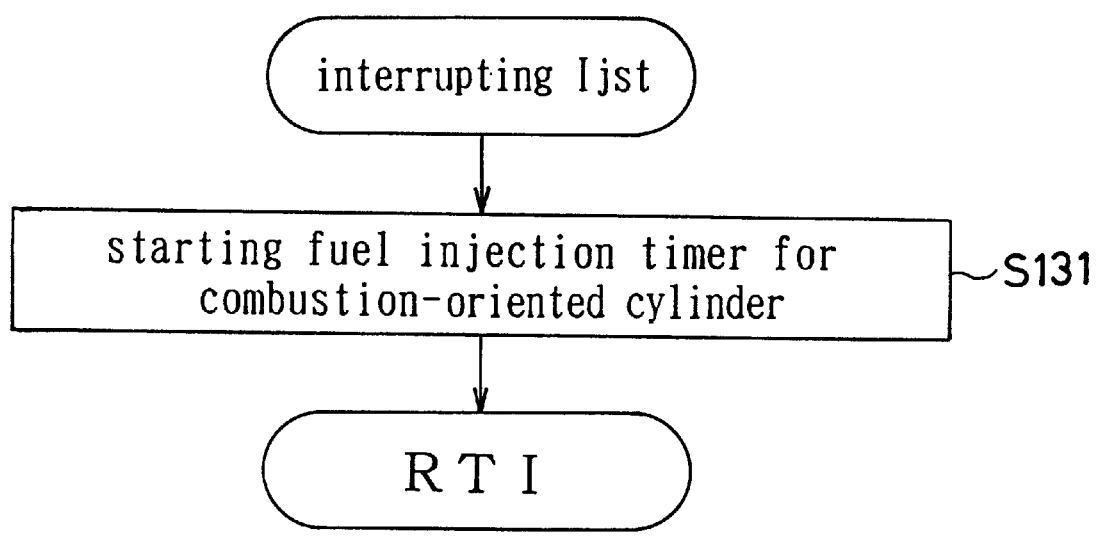
FIG. 12 is a flow chart showing a routine of the fuel injection starting timing.
Figure 13:
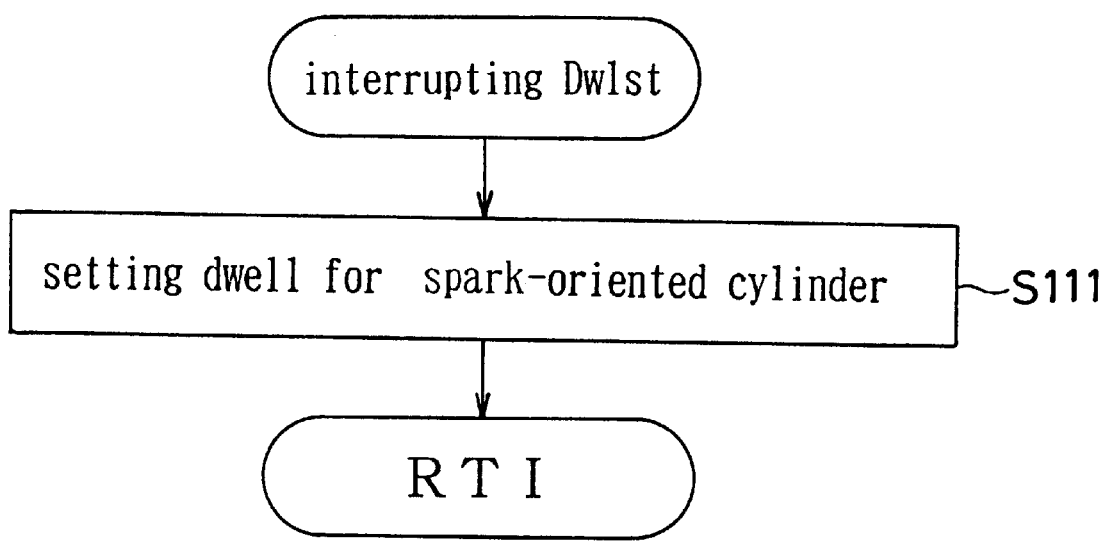
FIG. 13 is a flow chart showing a routine of the dwell starting timing.
Figure 14:
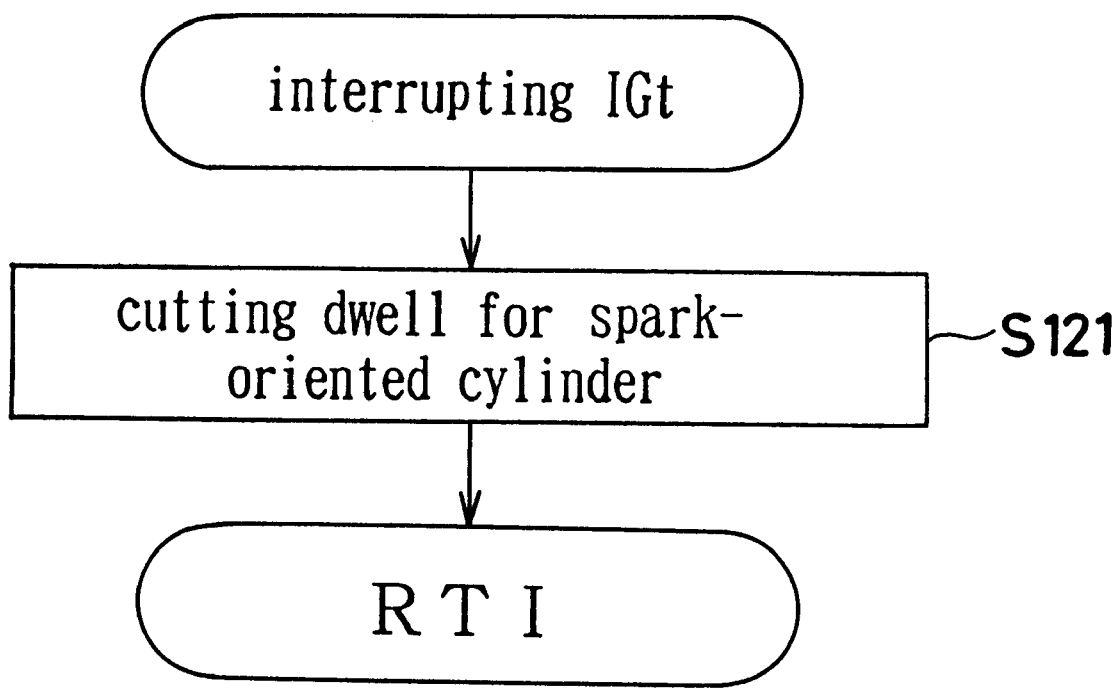
FIG. 14 is a flow chart showing a routine of the ignition timing.

At the expiration of the injection initiating timing Ijst1 (msec) which has been set in the injection initiating timing timer, the injection initiating timing routine is interruptively driven in accordance with the flow chart in FIG. 12. In step S131, the fuel injection timer starts to generate the jet signal so that the injector 8 injects the fuel into the corresponding cylinder during the time period until the fuel injection timer of the fuel injection pulse width (Ti) expires.

In step S83, it is judged that the presently adopting system is other than the compression stroke injection system by the relationship (F1=00), it is instructed to move to step S86 which advances the procedure to step S87 when judged that the presently adopting system is the air-intake stroke·compression stroke injection system (F1=01). In step S87, among the cylinders F#(i) and F#(i+1), it is determined which is to occupy the combustion-oriented cylinder this time around, then started is the injection initiating timing (Ijst1, Ijst2) of the injection initiating timing timers for the cylinders F#(i) and F#(i+1) to go through the routine in step S88.

Then, initiated is the clock counting action of the injection initiating timing (Ijst1, Ijst2) of the injection initiating timing timers for the cylinders F#(i) and F#(i+1). When the clock counting action expires, the injection initiating timing routine is interruptively driven in accordance with the flow chart in FIG. 12.

In step S131 of the injection initiating timing routine, the fuel injection timer starts to generate the jet signal to inject the fuel into the cylinders F#(i) and F#(i+1) during the time period length until the fuel injection timer of the fuel injection pulse width (Ti) expires.

On the assumption that the cylinder #2 is the cylinder F#i which is yet to occupy the TDC, by way of example, as shown by the flow chart in FIG. 24, the routine driven by the incoming cam pulse θ 1 this time is for the cylinder #2 which in turn corresponds to the combustion-oriented cylinder F#(i) and the cylinder #1 which in turn corresponds to the combustion-oriented cylinder F#(i+1) succeeding one behind the cylinder #2.

In step S86, it is judged that the system is the air-intake stroke injection system (F1=10) instead of the compression stroke injection system (F1=01) so as to advance the procedure to step S89 which recognizes the combustion-oriented cylinder F#(i+1) which is to be the cylinder F#i this time around. In the step S90, the injection initiating timing timer starts for the combustion-oriented cylinder F#(i+1) to go through the routine.

As a result, started is the clock counting action of the injection initiating timing (Ijst3) of the injection initiating timing timer for the combustion-oriented cylinder F#(i+1). When the clock counting action has ended, the injection initiating timing routine is interruptively driven in accordance with the flow chart in FIG. 12.

In step S131 of the injection initiating timing routine, the fuel injection timer starts to generate the jet signal so that the injector 8 injects the fuel into the combustion-oriented cylinder F#(i+1) during the time period length until the fuel injection timer of the fuel injection pulse width (Ti) expires.

On the assumption that the cylinder #2 is e.g., the cylinder F#i which is yet to occupy the TDC (the flow chart in FIG. 24), the routine driven by the incoming cam pulse θ 1 this time is in the case in which the cylinder #1 succeeding one behind the cylinder #2 is the combustion-oriented cylinder #(i+1).

Upon implementing the having-started ignition system control as shown at the timing charts in FIG. 24, it is designed so that the dwell initiating timing (Dw1st) is clock counted with the incoming cam pulse BTDC θ 3 of the cylinder preceding one from the spark-oriented cylinder. For this reason, firstly described below is the routine interruptively driven by the incoming cam pulse θ 3 in accordance with the flow chart in FIG. 11.

With the input of the cam pulse θ 3, the flow chart of FIG. 11 is driven. When judged that the present engine is in the having-started state (Fst=0) in step S101, it is instructed to move to step S104 which starts the dwell initiating timing timer for the spark-oriented cylinder to go through the routine.

Then, initiated is the clock counting action of the swell initiating timing (Dw1st) which has been set in the dwell initiating timing timer. When the clock counting action have ended, the dwell initiating timing routine is interruptively driven in accordance with the flow chart in FIG. 13.

In step S111 of the dwell initiating timing routine, the dwell is set for the spark-oriented cylinder this time around to go through the routine.

Upon recognizing the input of the cam pulse θ 2 thereafter, the ignition timing timer start routine is interruptively driven as shown in FIG. 10. In step S91, it is instructed to move step S92 when recognized that the present engine is in the having-started state (Fst=0) by referring to the value of the starting distinction flag (Fst) to start clock counting the ignition timing IGt (msec) which has been set in the ignition timing timer for the spark-oriented cylinder.

When the clock counting action has ended, the ignition timing routine (flow chart in FIG. 14) is interruptively driven. In step S121, the dwell cutting procedure is implemented for the spark-oriented cylinder to go through the routine.

As a result, the ignition is implemented based on the ignition timing IGt (msec) after started the engine with the pulse BTDC θ 2 of the corresponding cylinder as the reference cam angle.

Figure 34:
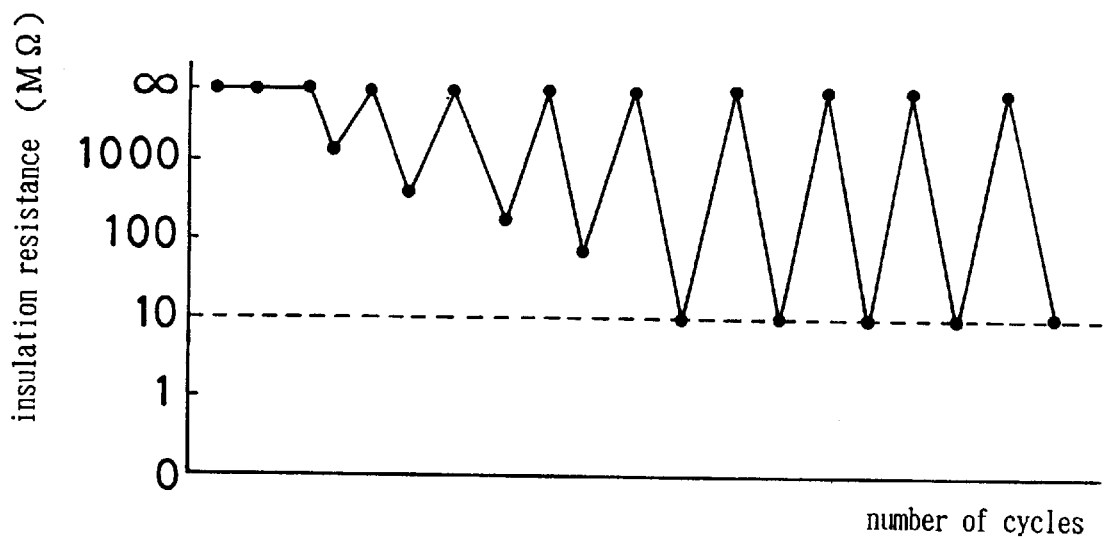
FIG. 34 is a graphical representation showing a relationship between number of cycles and insulation resistance obtained when carrying out a pre delivery carbon fouling experimental test with the use of the ignition device.

This apparently makes it possible to facilitate the self-cleaning action by using the spark-wasted ignition under the circumstances that the spark plug is likely to be smoldered while serving its inherent role. This action prevents the carbon fouling from inadvertently progressing without dropping the insulation resistance (M Ω) as evidenced by the graphical representation in FIG. 34.

When the state distinction device recognizes that the engine is in the normal state, the ignition signal is generated to instruct the spark plug to induce spark discharges at the predetermined time period only in the cylinder undergoing through the compression stroke. This reverts the spark discharging timing to the normal condition, and thus preventing the endurance of the spark plug from accidentally deteriorating.

It is to be observed that the present invention is not applied to the above embodiment alone, by way of illustration, an air-intake manifold injection type engine may be used instead of the in-cylinder direct injection type engine.

Figure 35:
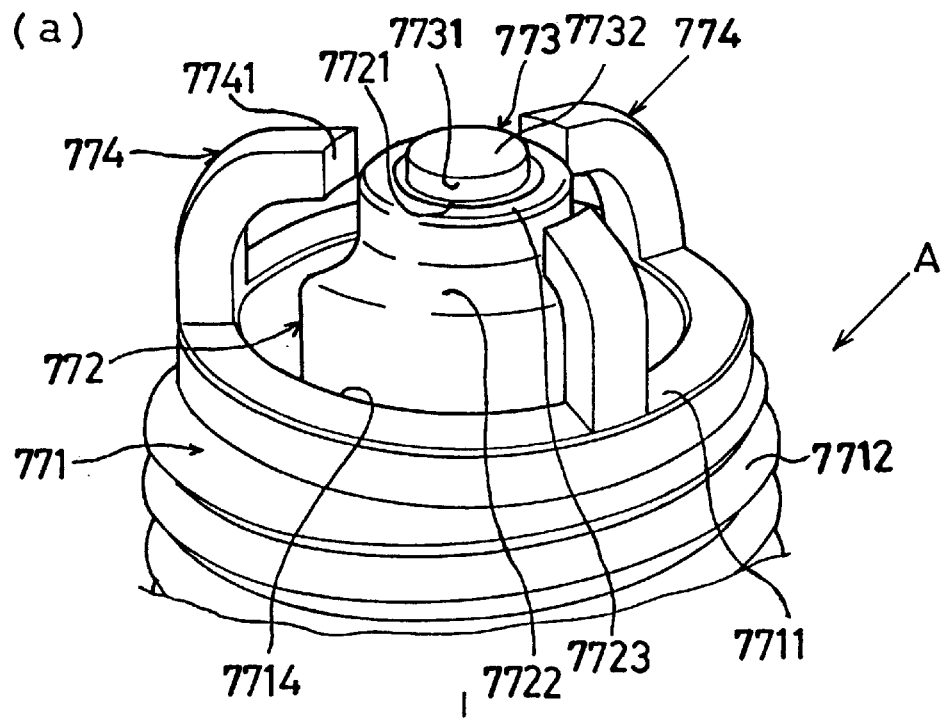
FIG. 35(a) is an enlarged perspective view of a main portion of a semi-creeping discharge type spark plug.
FIG. 35(b) is a longitudinal cross sectional view of the main portion of the semi-creeping discharge type spark plug.
Figure 35:
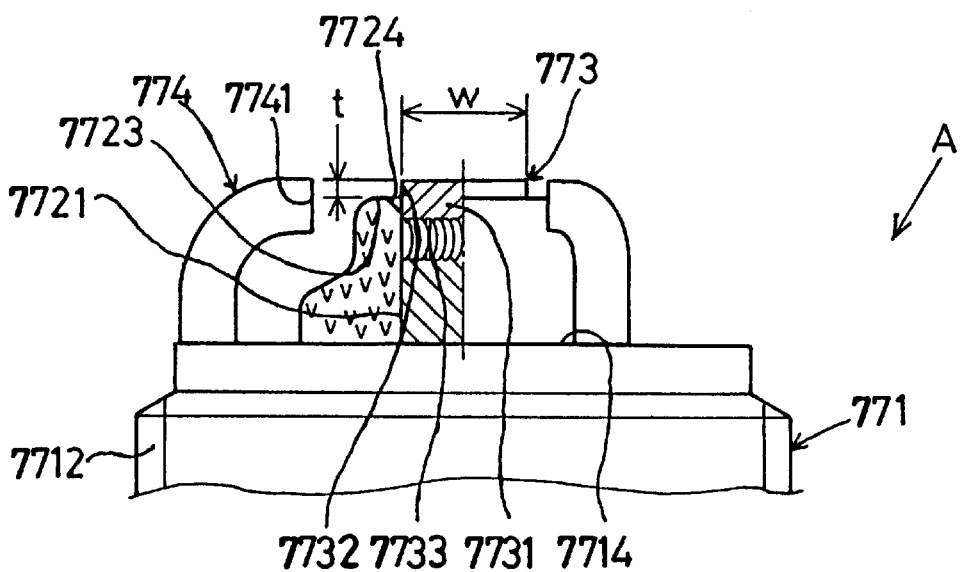

As for the spark plug 7, the semi-creeping discharge type spark plug (A) has a cylindrical metal shell 771 and an insulator 772 firmly placed within the metal shell 771 as shown in FIG. 35. The insulator 772 has an axial bore 7721 in which a center electrode 773 is provided, a front end of which has a noble metal tip 7731 by means of a welding procedure. To a front end 7711 of the metal shell 771, ground electrodes 774 are connected, each firing end 7741 of which is bent to face the noble metal tip 7731.

The metal shell 771 is made of a low-carbon steel, and the three ground electrodes (all designated by numeral 774) are welded to the front end 7711 of the metal shell 771.

On a front portion of an outer surface of the metal shell 771, a male-threaded portion 7712 is provided which is to be secured to a cylinder head (not shown) of the engine by way of a gasket (not shown).

The insulator 772 is made of a ceramic material with alumina as a main constituent. The insulator 772 has a seat rested on a shoulder portion of the metal shell 771 by way of a packing (not shown). By caulking a rear tail of a hex nut portion (not shown) of the metal shell 771, the insulator 772 is fixed with its front end 7722 extended beyond an front open end 7714 of the front end 7711 of the metal shell 771. A front end surface 7723 of the insulator 772 is flat-shaped to introduce the semi-creeping discharges therealong. Circumferentially bevelled is an inner edge of the front open end of the insulator 772 to have a chamfer portion 7724 by 0.1 mm (C 0.1 mm).

The center electrode 773 (w=1.0~2.5 mm in dia.) has a composite metal including a nickel-alloyed metal (e.g., Inconel 600) and a heat conductor copper core embedded in the nickel-alloyed metal. To a front end of the composite metal, the noble metal tip 7731 is laser welded. In this instance, a welding portion 7733 is located 0.3 mm or more inward from the front end surface 7723 of the insulator 772.

The center electrode 773 has a front end surface 7732 (corresponding to a front end surface of the noble metal tip 7731) which extends by a predetermined length (t=0~0.5 mm) beyond the front end surface 7723 of the insulator 772.

Considering that it is advantageous to readily induce the spark discharges by ionization with a relatively low spark voltage when serving a thinned portion as a negative side (−), a negative high voltage is applied to the center electrode 773 against the metal shell 771.

The disc-shaped noble metal tip 7731 (e.g., Pt–20Ir) measures 1.0~2.0 mm in diameter (w) and 0.3~1.0 mm in thickness (P) before applying the welding. It stands as a matter of of course that the center electrode 773 may be the nickel-alloyed metal itself devoid of the noble metal tip 7731.

The following advantages are obtained when the spark plug (A) is incorporated into the ignition device.

[a] With the diameter (w) of the center electrode 773 (i. e., diameter of the noble metal tip 7731) specified as 1.0~2.0 mm, it is possible to ameliorate the spark plug (A) in ignitability.

With the length (t) of the front end of the center electrode extended beyond a front end of the insulator 772 as specified by 0.5 mm or less, it is possible to significantly improve the carbon fouling because the spark discharges creeping along the front end surface 7723 of the insulator 772.

With the chamfer portion 7724 provided at the inner edge of the front open end of the insulator 772 by 0.1 mm (C 0.1 mm), it is possible to dominantly jump the spark discharges over the front end of the insulator 772 so as to retard the channeling phenomenon.

[b] With the three ground electrodes 774 provided to the spark plug (A), it is possible to effectuate the self-cleaning action so as to uniformly burn the carbon deposit due to the spark discharges induced through the exhaust stroke.

Instead of the spark plug (A), the following semi-creeping discharge type spark plug (B) can be used as a modification form of the present invention.

Figure 36:
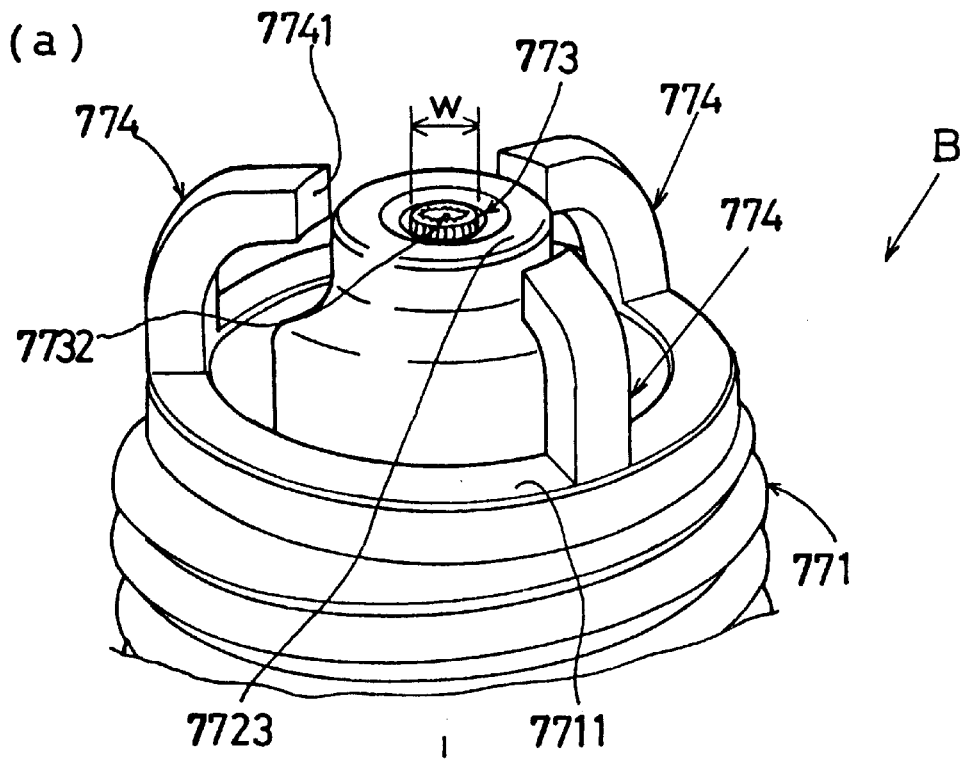
FIG. 36(a) is an enlarged perspective view of a main portion of another semi-creeping discharge type spark plug.
FIG. 36(b) is a longitudinal cross sectional view of the main portion of the semi-creeping discharge type spark plug.
Figure 36:
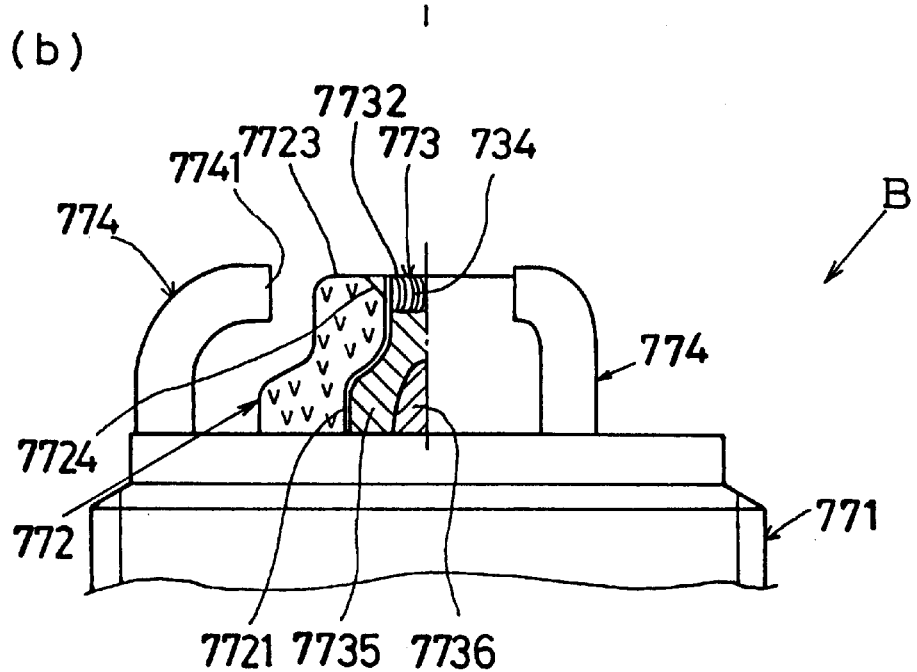

As shown in FIG. 36, the spark plug (B) has the cylindrical metal shell 771 and the insulator 772 firmly placed within the metal shell 771. The insulator 772 has the axial bore 7721 in which the center electrode 773 is provided, the front end of which has a noble metal alloy portion 7734 by means of the welding procedure. To the front end 7711 of the metal shell 771, the ground electrodes 774 are connected, each firing end 7741 of which is bent to face the noble metal alloy portion 7734. Except for the structure described below, the spark plug (B) is structurally identical to the semi-creeping discharge type spark plug (A).

The center electrode 773 increases its diametrical dimension (e.g., 2.5 mm) to strengthen the heat-drawing effect except for its front end area, a diameter (w) of which is decreased (w=1.0~2.0 mm) to improve the ignitability. In this instance, the center electrode 773 has the nickel-alloyed metal 7735 (e.g., Inconel 600) and the heat conductor copper core 7736 embedded in the nickel-alloyed metal 7735.

In the semi-creeping discharge type spark plug (B), the center electrode 773 has the front end surface 7732 positioned in flush with the front end surface 7723 of the insulator 772. In this situation, the center electrode 773 may locate its the front end surface 7732 retracted inward the axial bore 7721 by a predetermined length (t'=0~0.5 mm) from the front end surface 7723 of the insulator 772.

The following advantages are obtained when the spark plug (B) is incorporated into the ignition device.

[c] When locating the retracted length (t') of the center electrode 773 by the relationship (t'=0~0.5 mm), it is possible to improve the carbon fouling resistance by introducing the spark discharges along the front end surface 7723 of the insulator 772.

In addition, with the chamfer portion 7724 formed at the inner edge of the front open end of the insulator 772, it is possible to delay the unfavorable channeling phenomenon.

[d] With the front end of the center electrode 773 sufficiently thinned, it is possible to improve the carbon fouling resistance with a good spark erosion resistance.

[e] It is possible to dissolve the unfavorable condition when cold starting the engine by preventing the insulation resistance (M Ω) from dropping more than unnecessary.

Instead of the spark plug (A, B), the following full creeping discharge type spark plug (C) can be used as another modification form.

Figure 37:
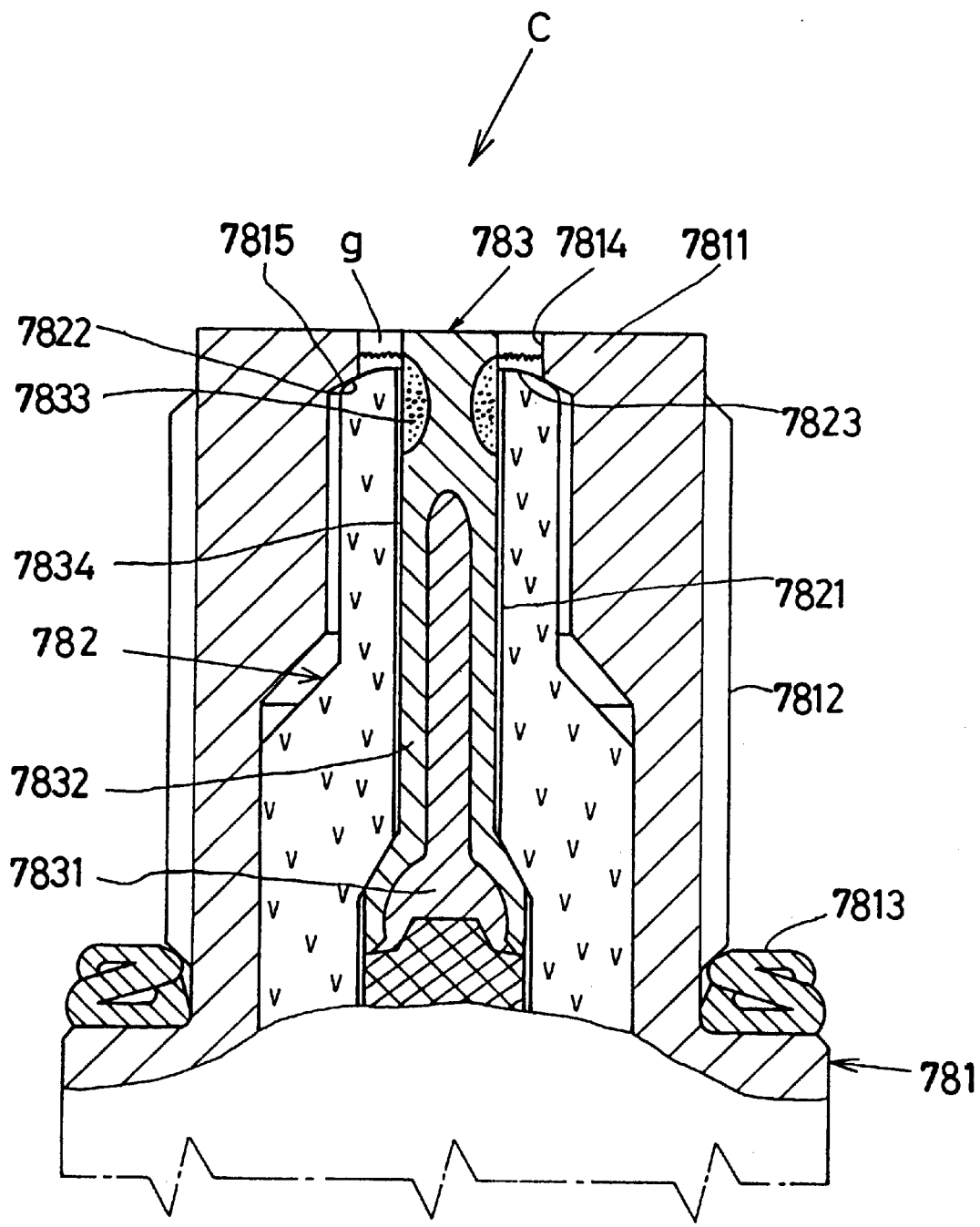
FIG. 37 is a longitudinal cross sectional view of a main portion of a full creeping discharge type spark plug.
Figure 38:
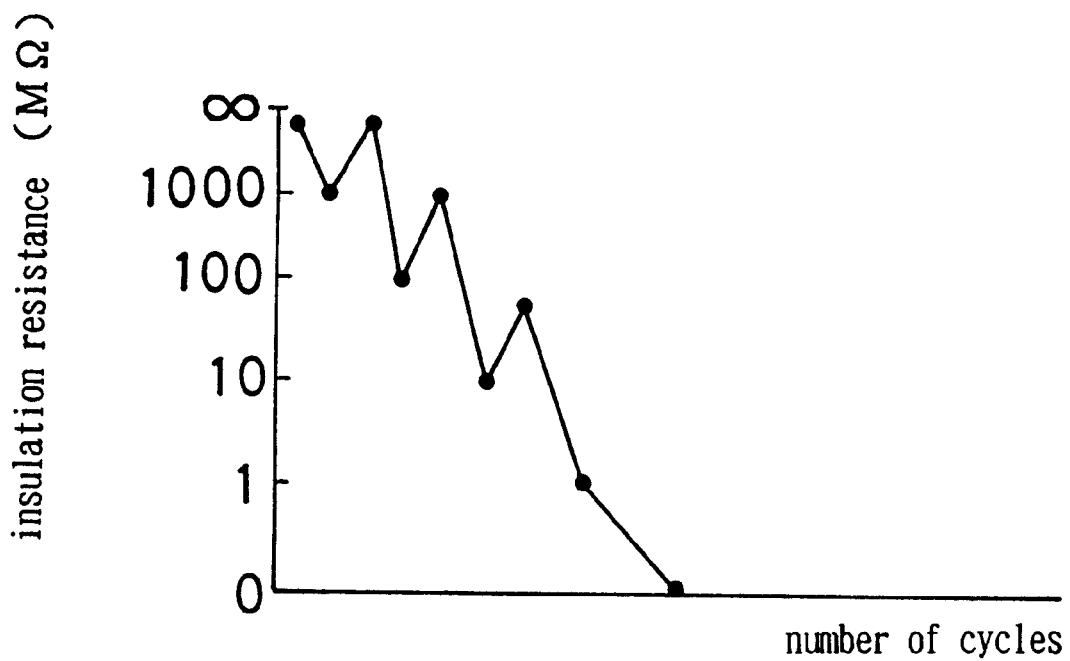
FIG. 38 is a graphical representation showing a relationship between number of cycles and insulation resistance obtained when carrying out a pre delivery carbon fouling experimental test with the use of a prior art ignition device.

As shown in FIG. 37, the full creeping discharge type spark plug (C) has an annular ground electrode 7811 provided in integral with a cylindrical metal shell 781 and an insulator 782 firmly placed within the metal shell 781. The insulator 782 has an axial bore 7821 in which the center electrode 783 is placed.

The metal shell 781 is made of a low-carbon steel, an outer surface of which has a male-threaded portion 7812 to be secured to a cylinder head (not shown) of the engine.

Around a barrel portion of the metal shell 781, a gasket 7813 encircles to air-tightly shield the cylinder head.

A creeping discharge gap (g) is formed between an inner surface 7814 of the ground electrode 7811 and an outer surface of the front end of the center electrode 783.

The insulator 782 is made of a sintered ceramic material with alumina as a main constituent. The insulator 782 has a seat portion 7822 rested on a shoulder portion 7815 of the metal shell 781.

The center electrode 783 measures 2.5 mm in diameter, and having the front end extended through the axial bore 7821 beyond the front end surface 7823 of the insulator 782. The center electrode 783 forms a composite structure having a nickel-alloyed metal 7832 (Inconel 600) in which a heat conductor core 7831 is embedded. A noble metal alloy portion 7833 is provided at an outer wall 7834 of a front portion of the center electrode 783 by solidifying molten platinum to the nickel-alloyed metal 7832 in the manner to form a flush surface in the elevational direction as a whole.

With the use of the full creeping discharge type spark plug (C) for the ignition device, it is possible to dissolve the unfavorable condition when cold starting the engine by preventing the insulation resistance (M Ω) from dropping unnecessarily in the same manner as described regarding to the semi-creeping discharge type spark plug (A, B).

[Second Embodiment of the Invention]

Figure 30:
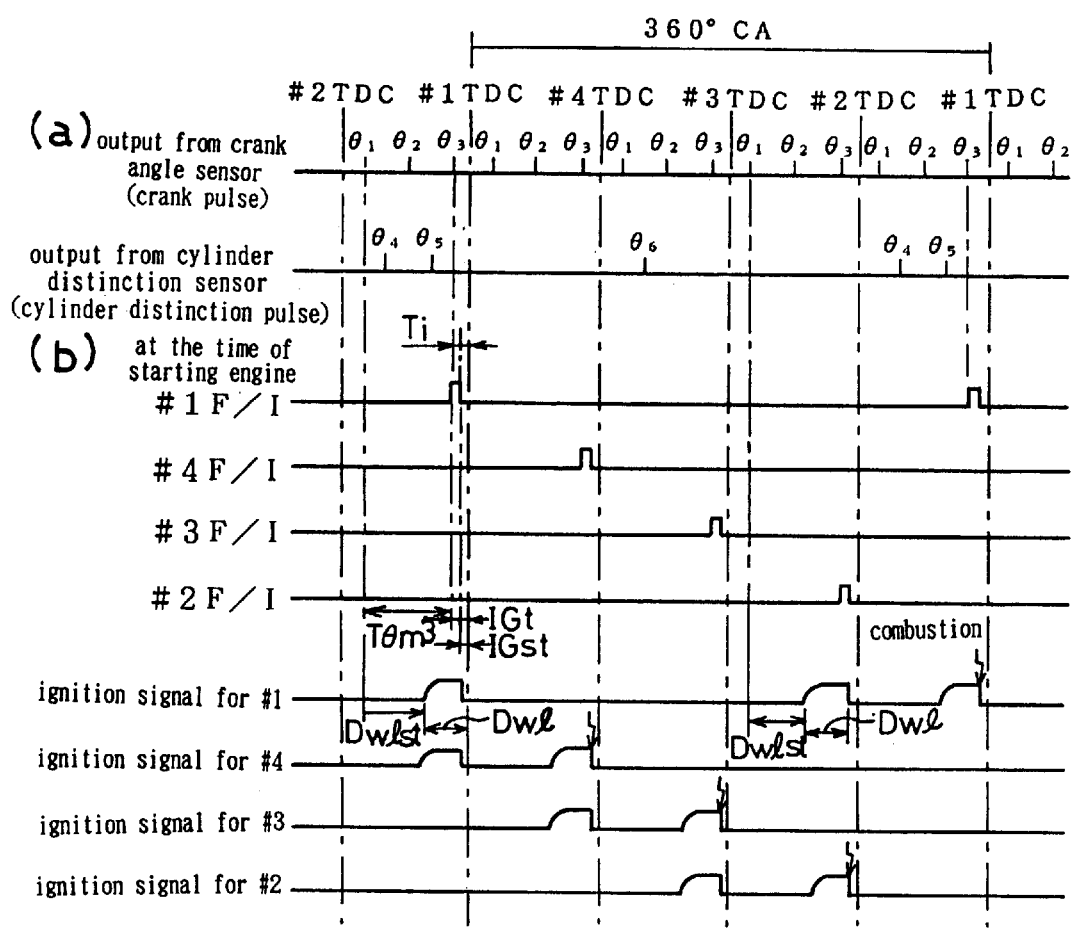
FIG. 30 is a timing chart showing a fuel injection and ignition procedures at the time when starting the engine.
Figure 31:
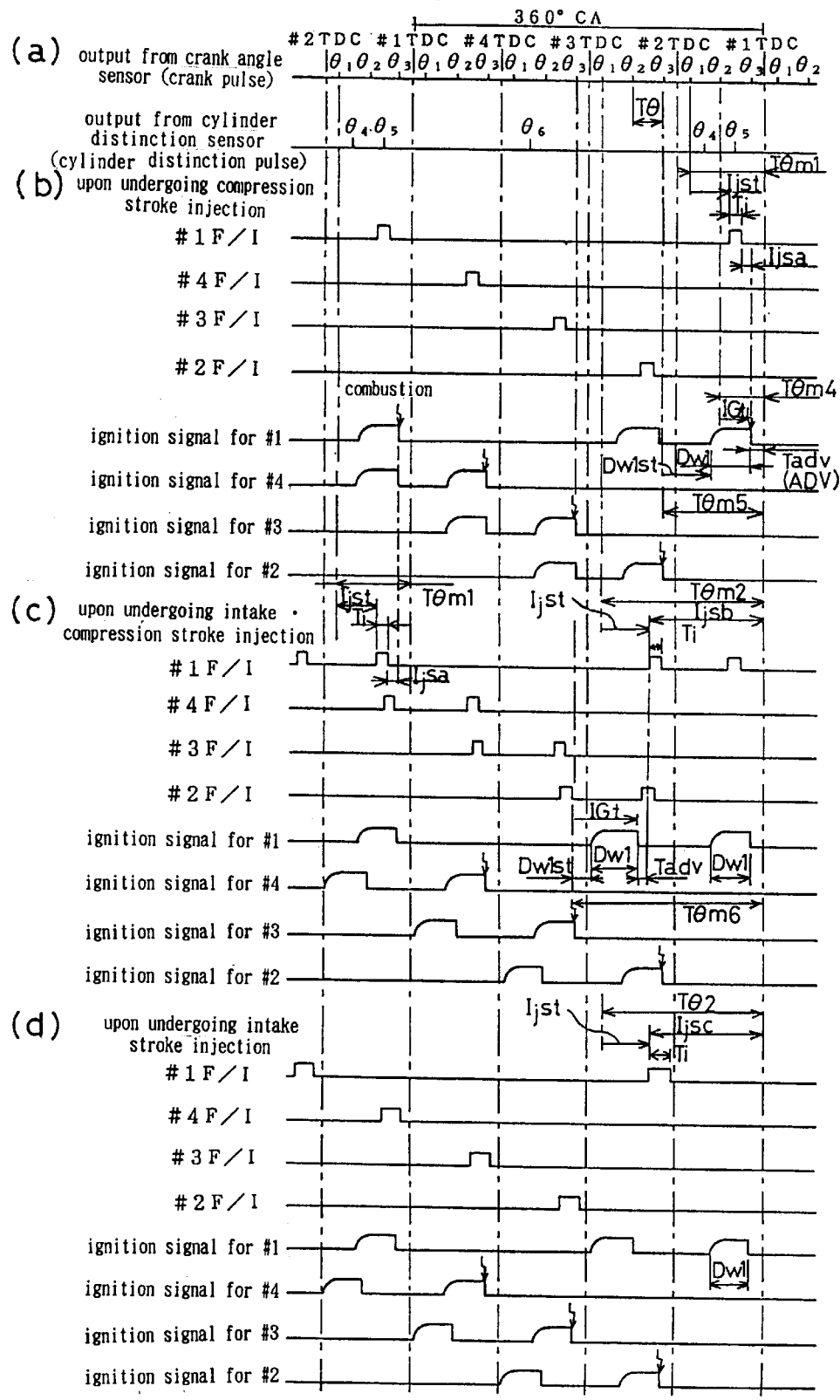
FIG. 31 is a timing chart showing a having-started fuel injection and ignition procedures.

The timing chart in FIG. 30 shows the starting-time fuel injection and ignition signal when the requirement of establishing the spark-wasted ignition is met according to the second embodiment of the invention. The timing chart in FIG. 31 shows the having-started fuel injection and ignition signal when the requirement of establishing the spark-wasted ignition is met. The cam pulse θ 1 serves as the reference cam angle when the dwell initiating timing timer starts upon starting the engine, and it acts as the reference cam angle when the fuel injection initiating timing timer starts after having started the engine.

The cam pulse θ 2 serves as the reference cam angle when the ignition timing starts after having started the engine.

The cam pulse θ 3 serves as the reference cam angle when the fuel injection initiating procedure and the ignition timing timer starts respectively upon starting the engine, and it acts as the reference cam angle when the dwell initiating timing timer starts after having started the engine.

The following are description with the ignition signal as a central matter since the fuel ignition of the second embodiment is substantially identical to that of the first embodiment of the invention.

When the ignition distinction device 41*d* recognizes that the requirement of establishing the spark-wasted ignition is met, it is commanded to establish the spark-wasted ignition to the spark-wasted ignition-oriented cylinder by means of the ignition timing/energization time calculation-determinative device 41*f*. It is noted that when commanded to establish the spark-wasted ignition by means of the ignition distinction device 41*d*, the ignition signal is generated to the spark-wasted ignition-oriented cylinder which undergoes through the air-intake stroke. This results in the spark discharges being induced at the oxygen-rich environment stroke as opposed to the oxygen-consumed expansion and exhaust strokes, thus making it possible to readily burn the carbon deposit so as to dissolve the unfavorable condition by the improved self-cleaning action particularly when cold starting the engine.

In the ignition timing/energization time calculation-determinative device 41*f*, the ignition timing and energization time period length are calculated individually in each cylinder upon starting the engine and after having started the engine.

Upon starting the engine, the ignition timing is calculated with the cam pulse θ 3 as the reference cam angle while adding the predetermined ignition time length to the fuel injection pulse width (Ti).

After having started the engine, the ignition timing is calculated based on the engine revolution (N) and the fuel injection quantity (GF) individually in each fuel injection system.

In the compression stroke injection system, the ignition timing is set in the ignition timing timer for the spark-oriented cylinder with the cam pulse θ 2 as the reference cam angle.

In the compression stroke injection system and the air-intake stroke·compression stroke injection system, the ignition timing is set in the ignition timing timer for the combustion-oriented cylinder with the cam pulse θ 2 as the reference cam angle. For the spark-wasted ignition-oriented cylinder, the ignition timing is set in the ignition timing timer with the cam pulse θ 3 as the reference cam angle. The energization time period length is determined based on the voltage level (Vb) of the battery cell.

In so doing, the dwell initiating timing timer starts with the incoming cam pulse θ 1 upon starting the engine, and thereafter the ignition timing timer starts with the incoming cam pulse θ 3.

As a result, the ignition signal is generated to the igniter 6*b* via the ignition output transistor circuit 45*a* of the I/O interface 45 during the time length from the expiration of the dwell initiating timing timer to the termination of the ignition timing timer. And the ignition coil 6*a* of the spark-oriented cylinder is energized via its primary terminal.

When the clock counting action of the ignition timing timer has ended, the spark plug 7 is energized to induce the spark discharges in the corresponding spark-oriented cylinder.

The dwell initiating timing timer starts with the incoming cam pulse θ 3 after having started the engine, and thereafter the ignition timing timer starts with the incoming cam pulse θ 2 in the compression stroke injection system.

In the air-intake stroke injection system and the air-intake stroke-compression stroke injection system, the ignition timing timer starts upon detecting the incoming cam pulse θ 3.

Then, the ignition signal is fed to the igniter 6b via the ignition output transistor circuit 45a of the I/O interface 45 during the time length from the expiration of the dwell initiating timing timer to the termination of the ignition timing timer. And the ignition coil 6a of the spark-oriented cylinder is energized via its primary terminal.

Upon terminating the clock counting action of the ignition timing timer, the spark plug 7 is energized to induce the spark discharges in the corresponding spark-oriented cylinder.

When no instruction is directed to establish the spark-wasted ignition by the ignition distinction device 41d, no spark discharge is produced in the spark plug for the spark-wasted ignition-oriented cylinder by cancelling the timer set thereof.

Figure 25:
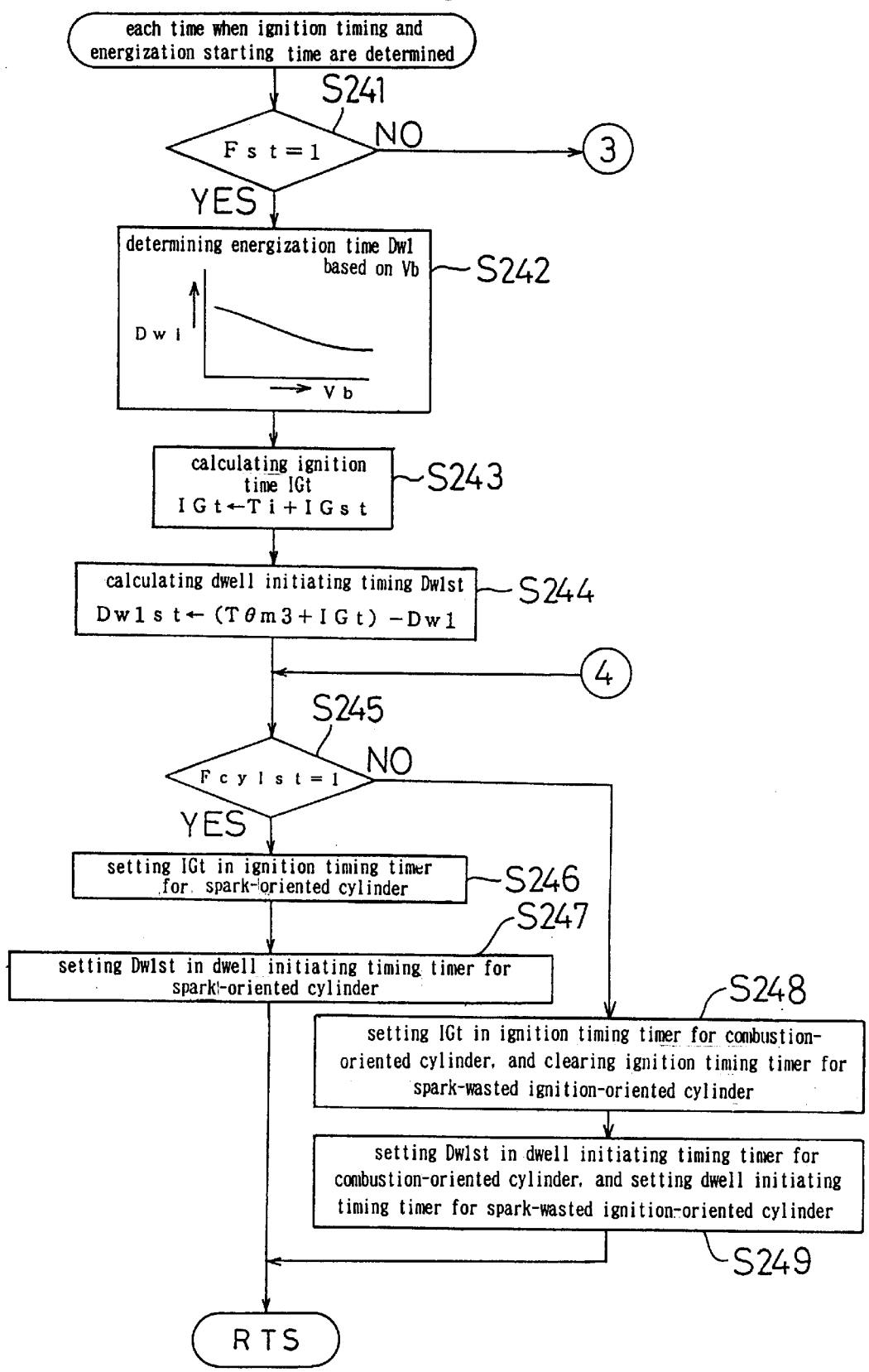
FIG. 25 is a flow chart showing a routine to determine an ignition timing and energization starting timing according to a second embodiment of the invention.
Figure 26:
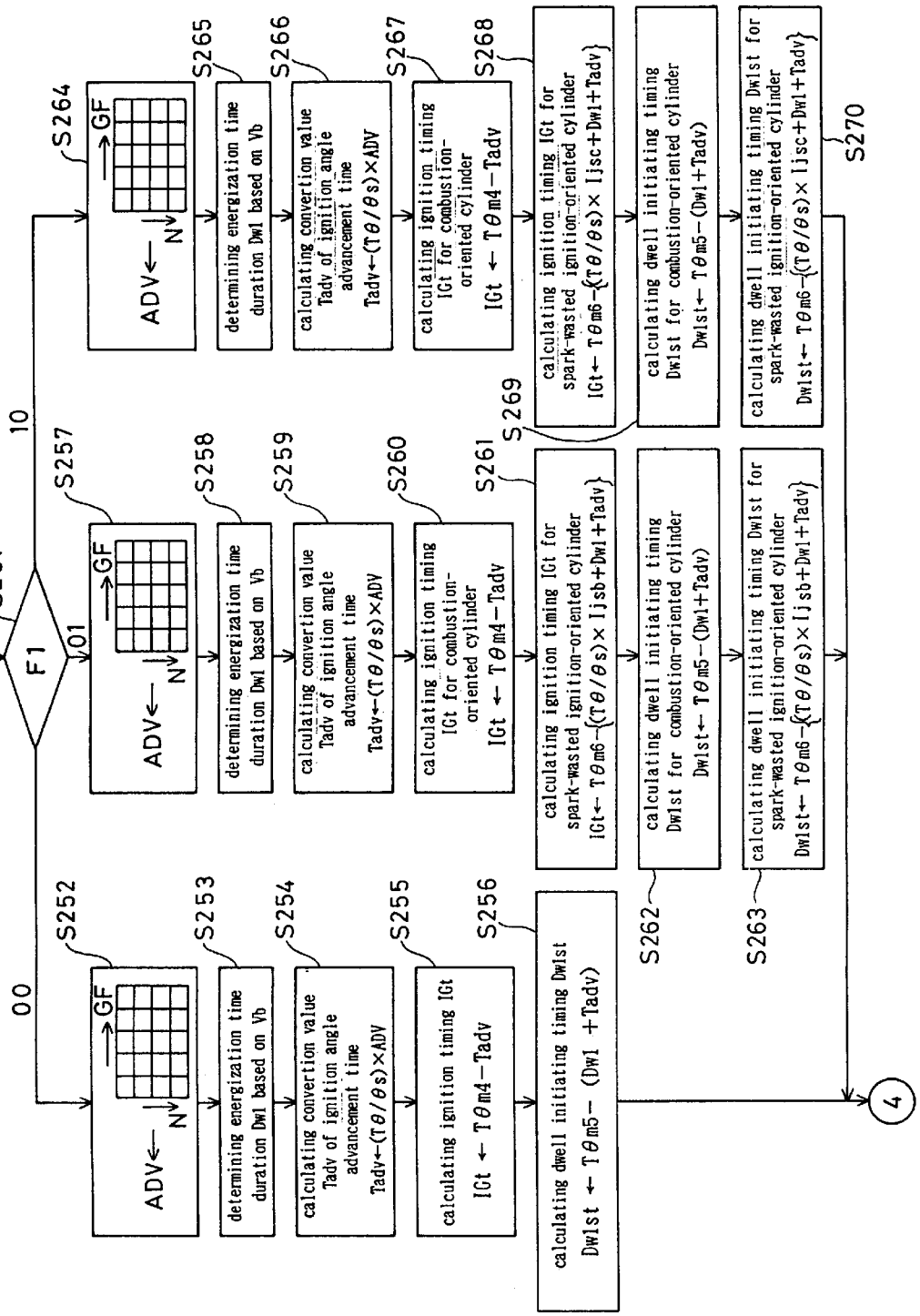
FIG. 26 is a flow chart showing a routine to determine an ignition timing and energization starting timing referred to in combination with FIG. 25.

In reference to the flow charts in FIGS. 25 and 26 the ignition time-energization initiating time determinative routine is described below.

In step S241, it is judged whether the present condition of the engine is in the starting or having-started state in view of the value listed in the starting distinction flag (Fst).

The starting distinction flag (Fst) is determined by the routine (FIG. 5) implemented in every 10 msec, and it is commanded to move to step S242 to implement the starting control when recognized that the engine is the starting state at Fst=1. Upon recognizing that the engine is in the having-started state at Fst=0, it is instructed to move to step S251 to implement the having-started control.

The starting control is first described, and then the having-started control is described below.

Upon moving from step S241 to S242 when the engine is in the starting state, the energization time duration Dw1 (msec) is determined based on the voltage level (Vb) of the battery cell by referring to the interpolation-attached table. As observed from the blank region of the steps in the table, the energization time duration Dw1 (msec) is predetermined to decrease with the increase of the voltage level (Vb) of the battery cell.

Once the energization time duration Dw1 (msec) is determined in step S242, it is instructed to move to step S243 so as to obtain the ignition timing (IGt) from the formula below.

IGt←Ti+IGst.

In the formula, IGst means a predetermined time length (msec) counted from the end of the injection to the time that the ignition is initiated (stored as ROM data). IGt decides when the ignition (msec) starts after the end of the fuel injection with the cam pulse θ 3 as the reference cam angle.

As shown in FIG. 30(b), the time length (IGt) is calculated by adding the injection pulse width (Ti) to the predetermined time length (IGst) since the fuel injection starts with the cam pulse θ 3 as the reference cam angle in the starting-time fuel injection pulse width (Ti).

In the step S244, the dwell initiating timing (Dw1st) is determined by the formula below.

Dw1st←(T θ m3+IGt)−Dw1

In the formula, T θ m3 means a time length counted from the input of the cam pulse which serves as a dwell initiating timing determinative reference to the input of the cam pulse which serves as an ignition time determinative reference.

As shown at the timing charts in FIG. 30(b), the cam pulse θ 1 is regarded as the reference cam angle when determining the starting dwell initiating timing, and the cam pulse θ 3 is regarded as the reference cam angle when determining the ignition time determinative timing. Therefore, the time length (T θ m3) is determined by the relation T θ m3=2×T θ.

In step S245, the value of the spark-wasted ignition flag (Fcy1st) is referred to. The spark-wasted ignition flag (Fcy1st) is predetermined by the spark-wasted ignition flag distinction routine (FIG. 6) in which the requirement of the establishing the spark-wasted ignition is judged to meet when the cooling water temperature (Tb) is low at Fcy1st=1. Thereafter, the ignition timing (IGt) is set in the ignition time timer of the spark-oriented cylinder in the subsequent step S246. In the step S247, the dwell initiating timing (Dw1st) is set in the dwell initiating timing timer to go through the routine.

It is to be observed that instead of the air-intake stroke, the spark-wasted ignition may be established through both the expansion and exhaust strokes by combining the control of the first embodiment of the invention.

It is to be further observed that the spark-wasted ignition can be established at a discrete timing with an individual signal, or otherwise established several times while undergoing a single stroke instead of establishing spark-wasted ignition in synchronization with the ignition timing in which air-fuel mixture is to be normally ignited in the spark-oriented cylinder.

In the meanwhile, it is judged in step S245 that the cooling water temperature (Tb) is normal at Fcy1st=0, it is instructed to move to step S248 in which the ignition timing (IGt) is set in the ignition timing timer only for the combustion-oriented cylinder so as to clear the ignition timing timer for the spark-wasted ignition-oriented cylinder.

In step S249, the dwell initiating timing (Dw1st) is set in the dwell initiating timing timer for the combustion-oriented cylinder, and at the same time, clearing the dwell initiating timing timer for the spark-wasted ignition-oriented cylinder to go through the routine.

This is the case in which the ignition timing timer and the dwell initiating timing timer are not driven for the spark-wasted ignition-oriented cylinder, and consequently no spark-wasted ignition is established therefor.

The dwell initiating timing timer of the corresponding cylinder which has been set in steps S247 or S249 starts with the pulse BTDC θ 1 as the reference cam angle. On the other hand, the ignition timing timer set in steps S246 or S248 starts with the pulse BTDC θ 3 as the reference cam angle as described in detail hereinafter.

When having started the engine, the starting distinction flag (Fst) is cleared to advance the procedure from step S241 to step S251 in which the ignition timing-energization initiating time determinative routine is implemented for the having-started control.

When moved to step S251 after recognized that the engine is the having-started state in step S241, it is judged first what system the present fuel injection adopts by referring to the value of the fuel injection system distinction flag (F1) in order to determine the advancement angle ADV (° cam angle) which corresponds to the individual fuel injection system.

When it is judged that the present system adopts the compression stroke injection system represented by F1=00 in step S251, it is instructed to move to step S252 in which the advancement angle ADV (° cam angle) is determined based on the engine revolution (N) and the fuel injection quantity (GF) while referring to the interpolation-attached table.

Advancing to step S253, the energization time duration (Dw1) based on the voltage level (Vb) of the battery cell is determined by referring to the interpolation-attached table in step S242. Moving further to step S254, the advancement angle (ADV) is converted to the ignition advancement time reduction value (Tadv) in terms of time unit with the time length per 1° cam angle in mind.

$$Tadv \leftarrow (T\,\theta/\theta\,s) \times ADV$$

Where T θ:input interval time period length of newest incoming cam pulse,

θ s:angle between cam pulses (e.g., 30° cam angle).

Thereafter, upon moving to step S255, the ignition timing (IGt) is determined based on the ignition advancement time reduction value (Tadv) by the relationship below.

$$IGt \leftarrow T\,\theta\,m4 - Tadv$$

In the relationship, the time length (T θ m4) signifies the time length counted from the input of the cam pulse which serves as the reference to determine the ignition time (msec) until reaching TDC of the spark-oriented cylinder. In this instance, the cam pulse is substituted by the pulse BTDC θ 2 of the spark-oriented cylinder. As shown at the timing chart in FIG. 31, the time length is obtained by the formula below.

$$T\,\theta\,m4 = 1.5 \times T\,\theta$$

In step S246, the dwell initiating timing (Dw1st) is obtained by the following expression.

$$Dw1st \leftarrow T\,\theta\,m5 - (Dw1 + Tadv)$$

Where T θ m5 means a time length taken from the incoming input of the cam pulse which serves as a dwell initiating timing determinative reference until reaching TDC of the combustion-oriented cylinder. The above incoming input of the cam pulse means a pre-top-dead-center pulse BTDC θ 3 of the cylinder preceding one from the combustion-oriented cylinder. As shown at the timing chart in FIG. 31, the time length (T θ m5) is obtained by the formula below.

$$T\,\theta\,m5 = 3.5 \times T\,\theta$$

Upon returning to step S245 to detect that the requirement of establishing the spark-wasted ignition is met because the cooling water temperature (Tb) is low at Fcy1st=1, it is instructed to move to step S246 in which the ignition timing (IGt) is set not only in the ignition timing timer of the corresponding cylinder in which the air-fuel mixture is to be ignited through the compression stroke, but also in the timer of the spark-oriented cylinder which undergoes through the air-intake stroke to ignite the spark plug for effecting the self-cleaning action. Then, the dwell initiating timing (Dw1st) is set in the dwell initiating timing timer to go through the routine in step S247.

On the other hand, when judged that the cooling water temperature (Tb) is normal at Fcy1st=0, it is instructed to move to step S248 in which the ignition timing (IGt) is set in the ignition timing timer only for the combustion-oriented cylinder which undergoes through the compression stroke.

In step S249, the dwell initiating timing (Dw1st) is set in the dwell initiating timing timer for the combustion-oriented cylinder to go through the routine.

When moved to step S257 after judging that the present system adopts the air-intake stroke·compression stroke injection system represented by F1=01 in step S251, the advancement angle ADV (° cam angle) at the time of ignition is determined based on the engine revolution (N) and the fuel injection quantity (GF) by referring to the interpolation-attached table.

Advancing to step S258, the energization time duration (Dw1) based on the voltage level (Vb) of the battery cell is determined by referring to the interpolation-attached table in step S242. Moving further to step S259, the advancement angle ADV (° cam angle) is converted to the ignition advancement time reduction value (Tadv) in terms of time unit with the time length per 1° cam angle in mind.

$$Tadv \leftarrow (T\,\theta/\theta\,s) \times ADV$$

Where T θ:input interval time period length of newest incoming cam pulse,

θ s:angle between cam pulses (e.g., 30° cam angle).

Upon moving to step S260 thereafter, the ignition timing (IGt) is determined for the combustion-oriented cylinder based on the ignition advancement time reduction value (Tadv) by the relationship below.

$$IGt \leftarrow T\,\theta\,m4 - Tadv$$

In step S261, the ignition timing (IGt) is determined for the spark-wasted ignition-oriented cylinder based on the ignition advancement time reduction value (Tadv) by the relation below.

$$IGt \leftarrow T\,\theta\,m6 - \{(T\,\theta/\theta\,s) \times Ijsb + Dw1 + Tadv\}$$

In the relationship, the time length (T θ m6) signifies the time length taken from the input of the cam pulse which serves as the reference to determine the ignition timing (msec) until reaching TDC of the spark-wasted ignition-oriented cylinder. In this instance, the cam pulse means the pulse BTDC θ 3 of the cylinder preceding two from the spark-wasted ignition-oriented cylinder. As shown at the timing chart in FIG. 31, the time length is obtained by the formula below.

$$T\,\theta\,m6 = 6.5 \times T\,\theta$$

Where Ijsb means the injection initiating angle (° cam angle) formed from the starting of the the fuel injection through the air-intake stroke until the combustion-oriented cylinder reaches TDC in the air-intake stroke·compression stroke injection system as described in the first embodiment of the invention.

In step 262, the dwell initiating timing (Dw1st) of the combustion-oriented cylinder is obtained by the following expression.

$$Dw1st \leftarrow T\,\theta\,m5 - (Dw1 + Tadv)$$

Then, the dwell initiating timing (Dw1st) of the spar-wasted ignition-oriented cylinder is obtained in step 263 by the following expression.

$$Dw1st \leftarrow T\,\theta\,m6 - \{(T\,\theta/\theta\,s) \times Ijsb + Dw1 + Tadv\}$$

Upon returning to step S245 to detect that the requirement of establishing the spark-wasted ignition is met because the cooling water temperature (Tb) is low at Fcy1st=1, it is instructed to move to step S246 in which the ignition timing (IGt) is set not only in the ignition timing timer of the corresponding cylinder in which the air-fuel mixture is to be ignited through the compression stroke, but also in the timer of the spark-oriented cylinder which undergoes through the air-intake stroke to ignite the spark plug for effecting the self-cleaning action. Then, the dwell initiating timing (Dw1st) is set in the dwell initiating timing timer to go through the routine in step S247.

When judged that the cooling water temperature (Tb) is normal at Fcy1st=0, it is instructed to move to step S248 in which the ignition timing (IGt) is set in the ignition timing timer only for the combustion-oriented cylinder which undergoes through the compression stroke in which the air-fuel mixture is to be ignited.

In the subsequent step S249, the dwell initiating timing (Dw1st) is set in the dwell initiating timing timer for the combustion-oriented cylinder to go through the routine.

When moved to step S264 after judging that the present system adopts. the air-intake stroke injection system represented by F1=10 in step S251, the advancement angle ADV (° cam angle) at the time of ignition is determined based on the engine revolution (N) and the fuel injection quantity (GF) by referring to the interpolation-attached table.

Moving to step S265, the energization time duration (Dw1) based on the voltage level (Vb) of the battery cell is determined by referring to the interpolation-attached table in step S242. Moving further to step S266, the advancement angle ADV (° cam angle) is converted to the ignition advancement time reduction value (Tadv) in terms of time unit with the time length per 1° cam angle in mind.

$$Tadv \leftarrow (T\theta/\theta s) \times ADV$$

Where T θ:input interval time period length of newest incoming cam pulse,

θ s:angle between cam pulses (e.g., 30° cam angle).

Upon moving to step S267 thereafter, the ignition timing (IGt) is determined for the combustion-oriented cylinder based on the ignition advancement time reduction value (Tadv) by the relationship below.

$$IGt \leftarrow T\theta\, m4 - Tadv$$

In step S268, the ignition timing (IGt) is determined for the spark-wasted ignition-oriented cylinder based on the ignition advancement time reduction value (Tadv) by the relationship below.

$$IGt \leftarrow T\theta\, m6 - \{(T\theta/\theta s) \times Ijsc + Dw1 + Tadv\}$$

Where Ijsc means the injection initiating angle (° cam angle) formed from the starting of the fuel injection through the air-intake stroke until the combustion-oriented cylinder reaches TDC in the air-intake stroke injection system as described in the first embodiment of the invention.

In step 269, the dwell initiating timing (Dw1st) of the combustion-oriented cylinder is obtained by the following expression.

$$Dw1st \leftarrow T\theta\, m5 - (Dw1 + Tadv)$$

Then, the dwell initiating timing (Dw1st) of the spark-wasted ignition-oriented cylinder is obtained in step 270 by the following expression.

$$Dw1st\, T\theta\, m6 - \{(T\theta/\theta s) \times Ijsc + Dw1 + Tadv\}$$

Upon returning to step S245 to detect that the requirement of establishing the spark-wasted ignition is met because the cooling water temperature (Tb) is low at Fcy1st=1, it is instructed to move to step S246 in which the ignition timing (IGt) is set not only in the ignition timing timer of the corresponding cylinder in which the air-fuel mixture is to be ignited through the compression stroke, but also in the timer of the spark-oriented cylinder which undergoes through the air-intake stroke to ignite the spark plug for effecting the self-cleaning action. Then, the dwell initiating timing (Dw1st) is set in the dwell initiating timing timer to go through the routine in step S247.

When judged that the cooling water temperature (Tb) is normal at Fcy1st=0, it is instructed to move to step S248 in which the ignition timing (IG t) is set in the ignition timing timer only for the combustion-oriented cylinder in which the air-fuel mixture is to be ignited through the compression stroke.

In the subsequent step S249, the dwell initiating timing (Dw1st) is set in the dwell initiating timing timer of the combustion-oriented cylinder to go through the routine.

As apparent from the timing chart in FIG. 31, the having-started dwell initiating timing unexceptionally starts its timer with the incoming pulse BTDC θ 3 of the cylinder preceding one from the present spark-oriented cylinder as the reference cam angle. In the compression stroke injection system, the ignition timing (IGt) starts its timer with the incoming pulse BTDC θ 2 of the cylinder preceding one from the combustion-oriented cylinder as the reference cam angle for the spark plug in the combustion-oriented cylinder. And the timer starts with the incoming pulse BTDC θ 2 of the cylinder preceding one from the combustion-oriented cylinder as the reference cam angle for the spark plug within the spark-wasted ignition-oriented cylinder. In the air-intake stroke injection system and the air-intake stroke·compression stroke injection system, the timer of the ignition timing (IGt) starts with the incoming pulse BTDC θ 2 of the combustion-cylinder for the spark plug within the combustion-oriented cylinder. And the timer starts with the incoming pulse BTDC θ 3 of the cylinder preceding two from the combustion-oriented cylinder as the reference cam angle for the spark plug within the spark-wasted ignition-oriented cylinder.

In reference to flow charts in FIGS. 12~14 and FIGS. 27~29, each routine is described below which drives the corresponding timers with the input of the cam pulse, and thereafter described are the fuel injection control and the ignition control upon starting the engine together with the having-started fuel injection control and ignition control.

Figure 27:
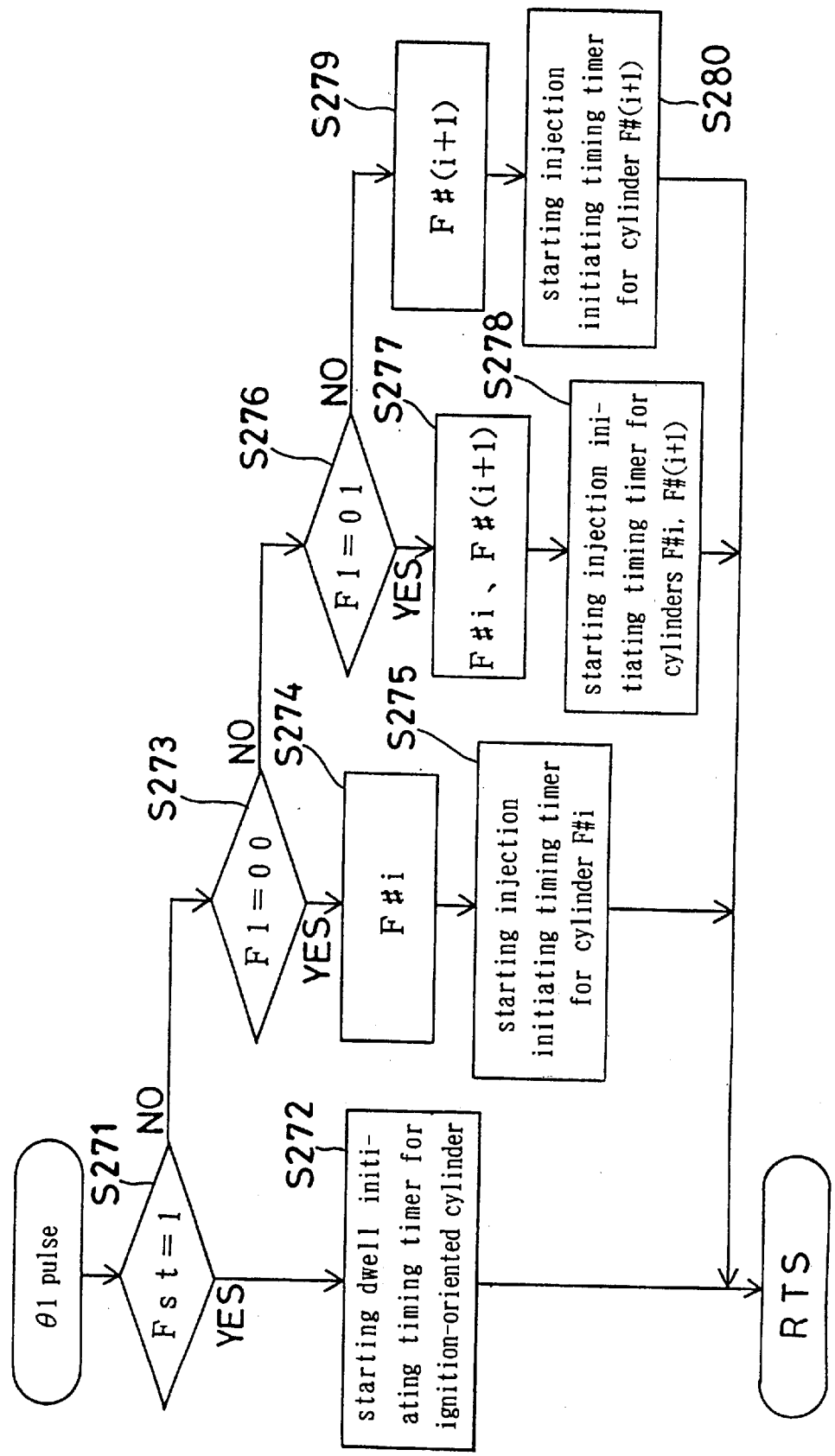
FIG. 27 is a flow chart showing a routine to set a starting-time dwell initiating timing timer and having-started fuel injection initiating timing timer.

With the input of the cam pulse θ 1 at the starting of the engine, driven is the starting dwell initiating timing timer·having-started injection initiating timing timer start routine in accordance with the flow chart in FIG. 27.

In step S271, it is judged whether the present engine is in the starting state or having-started state by referring to the value of the starting distinction flag (F st).

When judged that the present engine is in the starting state by the relation (Fst=1), advancing to step S272 to start the dwell initiating timing timer for the spark-oriented cylinder in which the dwell initiating timing (Dw1st) is set to go through the routine. Namely, this procedure starts the dwell initiating timing timer for the spark-wasted ignition-oriented cylinder and the combustion-oriented cylinder.

As a result, the clock counting action starts for the dwell initiating timing Dw1st (msec) which has been previously set in the dwell initiating timing timer (FIG. 30(b)). When the clock counting action has ended, the dwell initiating timing routine (FIG. 13) is interruptively driven to go through the routine by setting the dwell cutting procedure for the spark-oriented cylinder in step S111.

Figure 28:
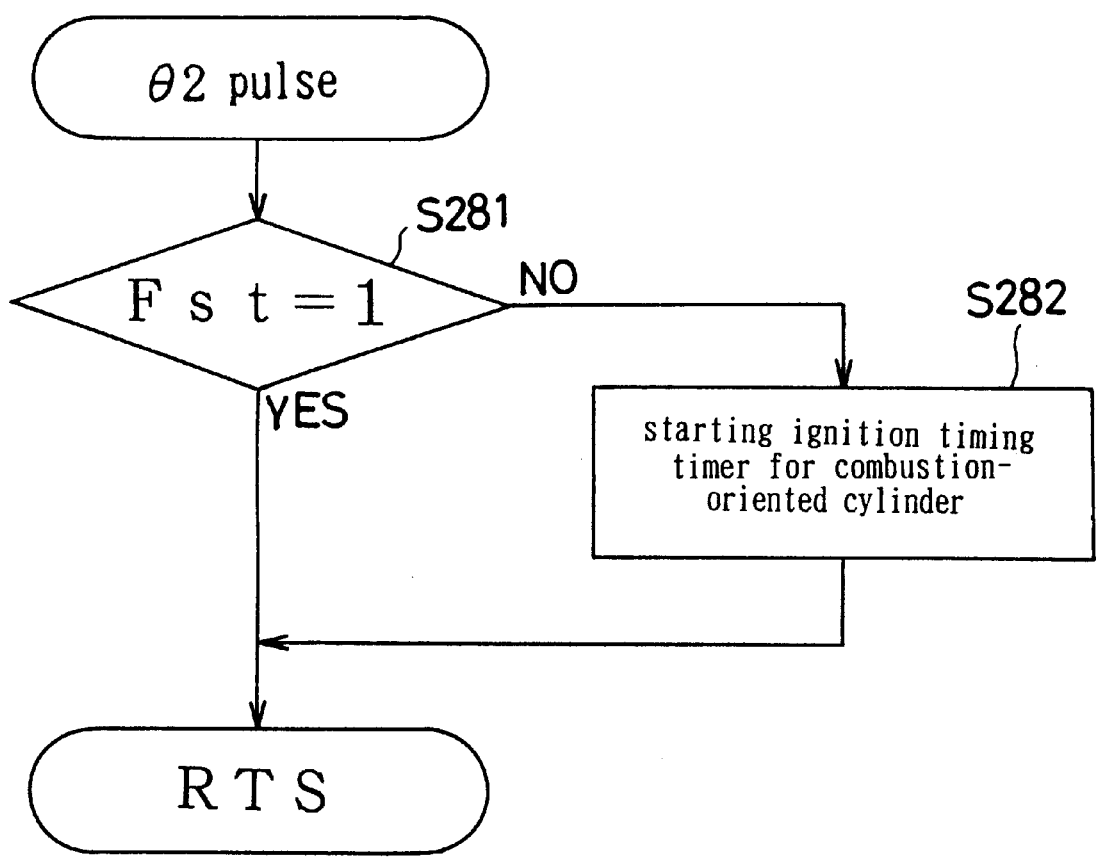
FIG. 28 is a flow chart showing a routine to set a having-started ignition timing timer.

With the input of the cam pulse θ 2, driven is the having-started ignition timing timer initiating routine in accordance with the flow chart in FIG. 28. Namely, in step S281, it is instructed to go through the routine when the present starting relation Fst=1 is recognized by referring to the value of the starting distinction flag (Fst).

Figure 29:
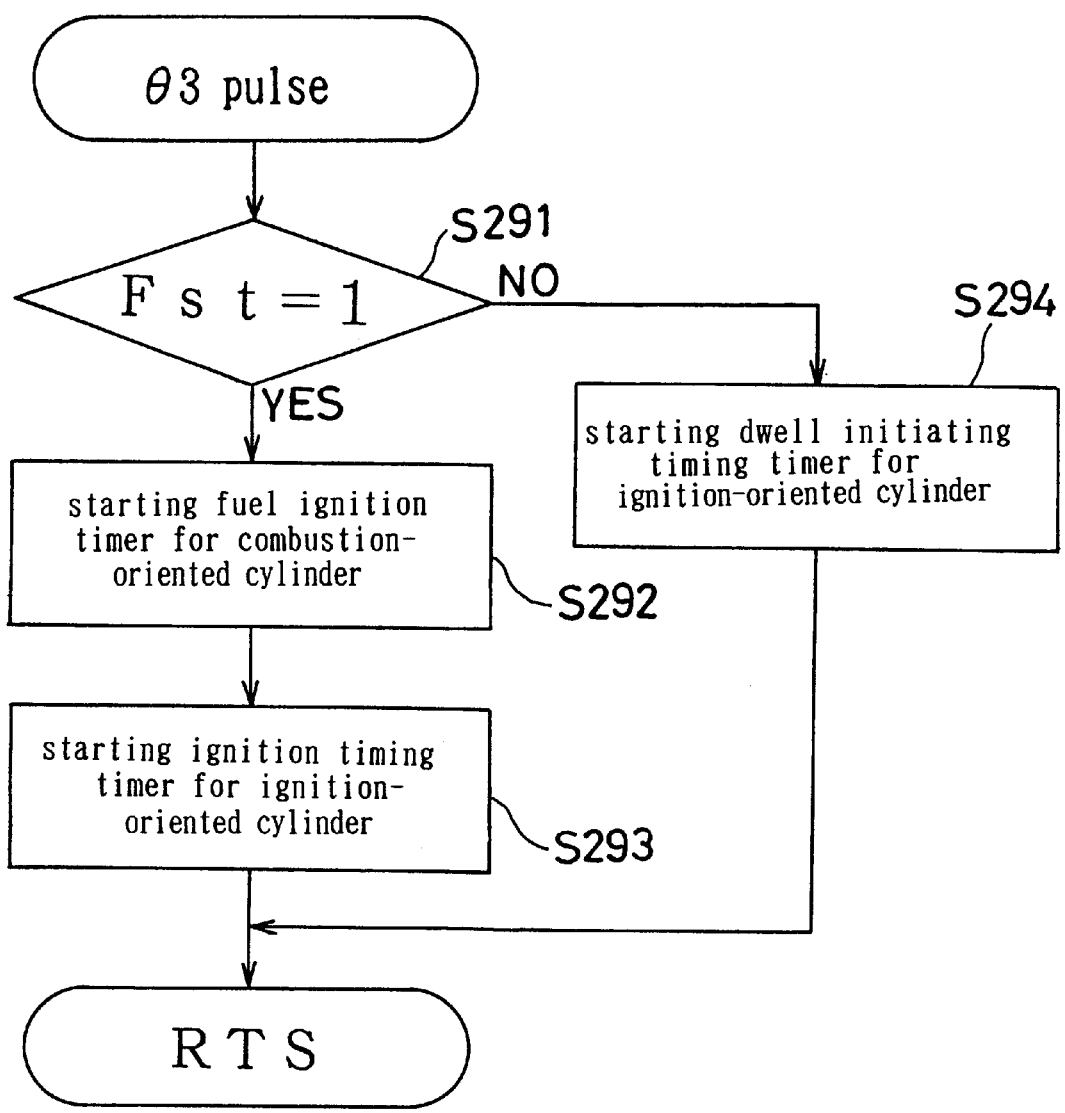
FIG. 29 is a flow chart showing a routine to set a starting-time fuel injection initiating timer, ignition timing timer and having-started dwell initiating timing timer.

With the input of the cam pulse θ 3, driven are the starting injection initiating timer and the ignition timing timer-having-started dwell initiating timing timer start routine in accordance with the flow chart in FIG. 29. When the present starting relationship Fst=1 is recognized in step S291 by referring to the value of the starting distinction flag (Fst), it is instructed to advance to step S292 which starts the starting-time fuel injection timer for the combustion-oriented cylinder.

Then, the clock counting action starts for the fuel injection pulse width (Ti) which has been previously set in the fuel injection timer (FIG. 30(b)) during which the injector 8 receives the jet signal to inject the predetermined amount of fuel to the corresponding cylinder.

Moving further to step S293, initiated is the ignition timing timer for the spark-oriented cylinder to go through the routine.

Then, the clock counting action starts for the ignition timing IGt (msec) which has been previously set in the ignition timing timer (FIG. 30(b)). When the clock counting action has ended, the ignition timing routine (flow chart in FIG. 14) is interruptively driven. In step S121 of the ignition timing routine, the dwell cutting procedure is implemented for the spark-oriented cylinder to go through the routine.

This results in occurring the spark discharges in the spark plug for the corresponding cylinder which undergoes through the air-intake stroke to burningly removes the carbon fouling induced by the previous stroke in which the air-fuel mixture is to be ignited. With the subsequent ignition of the spark plug for the combustion-oriented cylinder, the air-fuel mixture is ignited in the combustion-oriented cylinder.

On the other hand, when the routine is driven in accordance with the flow chart in FIG. 27 with the input of the cam pulse θ 1 after having started the engine, it is instructed to move to step S273 when recognized in step S271 that the engine is in the having-started state (Fst=0). In step S273, it is judged whether or not the present fuel injection system is the compression stroke injection system by referring to the value of the ignition system distinction flag (F1).

As shown by the timing charts in FIG. 31, the fuel injection initiating timing timer starts with the incoming cam pulse BTDC θ 1 of the combustion-oriented cylinder in the compression stroke injection. And the fuel injection initiating timing timer starts with the incoming cam pulse BTDC θ 1 of the cylinder preceding one from the present combustion-oriented cylinder in the air-intake stroke injection.

In the air-intake·compression stroke injection,the fuel injection initiating timing timer starts with the incoming cam pulse BTDC θ 1 of the combustion-oriented cylinder and the incoming cam pulse BTDC θ 1 of the cylinder preceding one from the present cylinder.

In step S273, the procedure is directed to specify the combustion-oriented cylinder for starting the injection initiating timing timer by judging the presently adopting injection system.

When the compression stroke injection system is recognized by the relationship F1=00 in the step S273, it is instructed to move to step S274 which starts the injection initiating timing timer for the combustion-oriented cylinder F#i in the step S275 when recognized that the combustion-oriented cylinder is an incoming cylinder F#i which is yet to occupy TDC.

When judged that injection·spark-oriented cylinder is a cylinder #1, for example, in the compression stroke injection system, the injection initiating timing timer starts with the input of the incoming cam pulse BTDC θ 1 of the cylinder #1.

At the end of the injection initiating timing Ijst1 (msec) which is set in the injection initiating timing timer, the injection initiating timing routine is interruptively driven in accordance with the flow chart in FIG. 12. In step S131, the fuel injection timer starts to generate the jet signal so that the injector 8 injects the fuel to the corresponding cylinder during the time period until the fuel injection timer of the fuel injection pulse width (Ti) expires.

In step S273, when judged that the presently adopting system is other than the compression stroke injection system by the formula (F1=00), it is instructed to move to step S276 which further advances the procedure to step S277 when judged that the presently adopting system is the air-intake stroke·compression stroke injection system by the relation (F1=01).

In step S277, the cylinders F#(i) and F#(i+1) are designated respectively to occupy the combustion-oriented cylinder this time around, then started are the injection initiating timing timer for the cylinders F#(i) and F#(i+1) to go through the routine in step S278.

Then, initiated is the clock counting action of the injection initiating timing (Ijst1, Ijst2) of the injection initiating timing timers for the cylinders F#(i) and F#(i+1). When the clock counting action has ended, the injection initiating timing routine is interruptively driven in accordance with the flow chart in FIG. 12.

In step S131 of the injection initiating timing routine, the fuel injection timer starts to generate the jet signal so as to inject the fuel into the cylinders F#(i) and F#(i+1) during the time period length until the fuel injection timer of the fuel injection pulse width (Ti) ends.

On the assumption that the cylinder #2 is the cylinder F#i which is yet to occupy the TDC, by way of example, as shown by the timing chart in FIG. 31, the routine driven by the incoming cam pulse θ 1 this time is for the cylinder #2 and the cylinder #1 succeeding one behind the cylinder #2 which in turn corresponds to the combustion-oriented cylinder F#(i) and another combustion-oriented cylinder F#(i+1).

In step S276, it is judged that the system is the air-intake stroke injection system (F1=10) in lieu of the compression stroke injection system (F1=01) so as to advance the procedure to step S279.

In step S279, the combustion-oriented cylinder F#(i+1) is recognized this time around. In the step S280, the injection initiating timing timer starts for the combustion-oriented cylinder F#(i+1) to go through the routine.

Then, started is the clock counting action of the injection initiating timing (Ijst3) of the injection initiating timing timer for the combustion-oriented cylinder F#(i+1). When the clock counting action has ended, the injection initiating timing routine is interruptively driven in accordance with the flow chart in FIG. 12.

In step S131 of the injection initiating timing routine, the fuel injection timer starts to generate the jet signal so that the injector 8 injects the fuel into the combustion-oriented cylinder F#(i+1) during the time period length until the fuel injection timer of the fuel injection pulse width (Ti) has completed.

On the assumption that the cylinder #2 is e.g., the cylinder F#i which is yet to occupy TDC as shown by the timing chart in FIG. 31, the routine driven by the incoming cam pulse θ

1 this time is in the case in which the cylinder #1 succeeding one behind the cylinder #2 is the combustion-oriented cylinder F#(i+1).

Upon implementing the having-started ignition system control as shown by the timing charts in FIG. 31, it is designed so that the dwell initiating timing (Dw1st) is clock counted with the incoming cam pulse BTDC θ 3 of the cylinder preceding one from the spark-oriented cylinder. For this reason, firstly described below is the routine interruptively driven by the incoming cam pulse θ 3 in accordance with the flow chart in FIG. 29.

With the input of the cam pulse θ 3, the flow chart in FIG. 29 is driven. When judged that the present engine is in the having-started state (Fst=0) in step S291, it is instructed to move to step S294 which starts the dwell initiating timing timer for the spark-oriented cylinder to go through the routine.

Then, initiated are the clock counting action of the swell initiating timing (Dw1st) which has been set in the dwell initiating timing timer. When the clock counting action have ended, the dwell initiating timing routine is interruptively driven in accordance with the flow chart in FIG. 13.

In step S111 of the dwell initiating timing routine, the dwell is set for the spark-oriented cylinder this time around to go through the routine.

When the input of the cam pulse θ 2 is recognized thereafter, and the ignition timing timer start routine is interruptively driven as shown in FIG. 28, it is instructed to move to step S281 which further advances to step S282 when recognized that the present engine is in the having-started state (Fst=0) by referring to the value of the starting distinction flag (Fst) in order to start counting the ignition timing IGt (msec) which has been set in the ignition timing timer for the spark-oriented cylinder.

When the clock counting action has ended, the ignition timing routine (flow chart in FIG. 14) is interruptively driven. In step S121, the dwell cut is implemented for the spark-oriented cylinder to go through the routine.

Then, the ignition is implemented based on the ignition timing IGt (msec) after started the engine with the pulse BTDC θ 2 of the corresponding cylinder as the reference cam angle as shown by the timing chart in FIG. 31.

[Modification Forms]

In the present invention, the following modification forms are included.

One or two ignition coils 6a may be used for two cylinders or four cylinders instead of using the same number of the ignition coil 6a to each of the cylinders.

The ignition coil 6a may have two or more secondary coils for a single spark plug.

[Advantages of the Invention]

As understood from the foregoing description, it is possible to burningly remove or fall off the carbon deposit by the self-cleaning action of the spark plug at the time of starting, particularly cold starting the engine. This holds true at the time of immediately after cold starting the engine and running the engine along the streets in the cold district areas.

This avoids the insulation resistance (M Ω) from accidentally dropping, thus making it possible to dissolve the unfavorable starting of the engine such as, for example, engine stall, poor idling, poor driveability and starting failure.

What is claimed is:

1. An ignition device comprising:
 an ignition coil provided to each cylinder of a multi-cylindered engine;
 a state distinction means provided for judging whether it is necessary to produce at least one spark wasted discharge in order to burningly remove a carbon deposit on a spark plug which is electrically connected one-on-one to said each ignition coil;
 said at least one spark wasted discharge being produced at a time except for when an air-fuel mixture is to be ignited, when said state distinction means judges that said at least one spark wasted discharge is to be produced; and
 a starting distinction means provided to judge whether said engine is in a starting state or a having-started state,
 said ignition device having a means provided to establish at least one spark wasted discharge in the spark plug between a time of igniting the air-fuel mixture and a time of beginning to inject fuel, said at least one spark wasted discharge being established when said starting distinction means judges that said engine is in said starting state.

2. An ignition device as recited in claim 1, further comprising means provided to establish said at least one spark wasted discharge in the spark plug between a time of igniting the air-fuel mixture and a time of beginning to inject fuel when said state distinction means judges that said at least one spark wasted discharge is to be produced.

3. An ignition device as recited in claim 2, further comprising a fuel injection control device which determines a timing of an injector which directly injects the fuel into a combustion chamber, said ignition device having means provided to establish at least one spark wasted discharge in the spark plug between the time of igniting the air-fuel mixture and a time of beginning to inject fuel when said injector injects the fuel through an air-intake stroke by means of said fuel injection control device.

4. An ignition device as recited in claim 1, further comprising a fuel injection control device which determines a timing of an injector which directly injects the fuel into a combustion chamber, said ignition device having means provided to establish at least one spark wasted discharge in the spark plug between the time of igniting the air-fuel mixture and a time of beginning to inject fuel when said injector injects the fuel through an air-intake stroke by means of said fuel injection control device.

5. An ignition device as recited in claim 1, wherein said at least one spark wasted discharge in the spark plug is between a time of igniting the air-fuel mixture and an end of an exhaust stroke.

6. An ignition device as recited in claim 5, having a means provided to establish said at least one spark wasted discharge in the spark plug between the time of igniting the air-fuel mixture and the end of the exhaust stroke when said start distinction means judges that said engine is in said starting state.

7. An ignition device as recited in claim 1, further comprising means provided to establish plural spark wasted discharges.

8. An ignition device as recited in claim 1, wherein said state distinction means judges a cold state during which said at least one spark wasted discharge is to be produced said judgment based on cooling water temperature of said engine to determine whether the engine is in said cold state or normal state.

9. An ignition device as recited claim 1, wherein said spark plug comprises:
 a cylindrical metal shell;
 an insulator fixedly provided within said metal shell;
 said insulator having an axial bore in which a center electrode is fixedly placed;

a ground electrode provided to form a spark gap with a front end of said center electrode;

said spark gap extending at least partially to a front end surface of said insulator so as to form a semi-creeping discharge type spark plug.

10. An ignition device as recited in claim 9, wherein the semi-creeping discharge type spark plug has three or more ground electrodes.

11. An ignition device as recited in claim 9 or 10, wherein the semi-creeping discharge type spark plug comprises a front end surface of said center electrode extending beyond a front end surface of said insulator by 0.5 mm or less, or a front end surface of said center electrode retracting behind a front end surface of said insulator by 0.5 mm or less.

12. An ignition device comprising:

an ignition coil provided to each cylinder of a multi-cylindered engine;

a state distinction means provided for judging whether it is necessary to produce at least one spark wasted discharge in order to burningly remove a carbon deposit on a spark plug which is electrically connected one-on-one to said each ignition coil; and said at least one spark wasted discharge being produced at a time except for when an air-fuel mixture is to be ignited, when said state distinction means judges that said at least one spark wasted discharge is to be produced, wherein said spark plug comprises:

a cylindrical metal shell;

an insulator fixedly provided within said metal shell;

said insulator having an axial bore in which a center electrode is fixedly placed;

an annular-shaped ground electrode provided in electrical contact with said metal shell so as to face a front end of said center electrode, said at least one spark wasted discharge creeping along a front end surface of said insulator across a spark gap which is formed between said center electrode and a ground electrode so as to form a full-creeping discharge type spark plug.

* * * * *